(12) United States Patent
Audet

(10) Patent No.: US 9,262,381 B2
(45) Date of Patent: Feb. 16, 2016

(54) ARRAY OF DOCUMENTS WITH PAST, PRESENT AND FUTURE PORTIONS THEREOF

(71) Applicant: Mathieu Audet, Montreal (CA)

(72) Inventor: Mathieu Audet, Montreal (CA)

(73) Assignee: 9224-5489 QUEBEC INC., Montreal (CA)

( * ) Notice: Subject to any disclaimer, the term of this patent is extended or adjusted under 35 U.S.C. 154(b) by 41 days.

(21) Appl. No.: 13/799,154

(22) Filed: Mar. 13, 2013

(65) Prior Publication Data

US 2013/0290897 A1    Oct. 31, 2013

Related U.S. Application Data

(63) Continuation of application No. 12/192,286, filed on Aug. 15, 2008, now abandoned.

(60) Provisional application No. 60/971,214, filed on Sep. 10, 2007, provisional application No. 60/957,444, filed on Aug. 22, 2007, provisional application No. 61/034,625, filed on Mar. 7, 2008.

(51) Int. Cl.
*G06F 17/21* (2006.01)
*G06F 3/0481* (2013.01)
*G06F 3/0482* (2013.01)
(Continued)

(52) U.S. Cl.
CPC ............ *G06F 17/211* (2013.01); *G06F 3/0482* (2013.01); *G06F 3/0485* (2013.01); *G06F 3/04815* (2013.01); *G06F 17/30011* (2013.01);
(Continued)

(58) Field of Classification Search
CPC ........................ G06Q 10/109; G06F 17/30994

USPC .......................................................... 715/835
See application file for complete search history.

(56) References Cited

U.S. PATENT DOCUMENTS 4,386,410 A * 5/1983 Pandya et al. ................. 715/201
4,616,336 A  10/1986 Robertson
(Continued)

FOREIGN PATENT DOCUMENTS

JP    07-013971    1/1995
JP    07-085080    3/1995
(Continued)

OTHER PUBLICATIONS

The lifestream approach to reorganizing the information world; Nicolas Carriero, Scott Fertig; Eric Freeman and David Gelernter; Apr. 1995; Yale University.
(Continued)

*Primary Examiner* — Tuyetlien T Tran
*Assistant Examiner* — David S Posigian
(74) *Attorney, Agent, or Firm* — Mathieu Audet

(57) ABSTRACT

A method, apparatus practicing the method, a system and an interface for displaying an array of computer-readable files having time portions thereof is described. The time portions are configured to display computer-readable files associated with respective time periods to order the computer-readable files along a timeline. The time portions being configured to define at least one of a past portion adapted to display computer-readable files associated with a time before a present time, a present portion adapted to display computer-readable files associated with the present time, and a future portion adapted to display computer-readable files associated with a time past the present time.

20 Claims, 38 Drawing Sheets

(51) Int. Cl.
*G06F 3/0485* (2013.01)
*G06Q 10/10* (2012.01)
*G06F 17/30* (2006.01)

(52) U.S. Cl.
CPC .... *G06F 17/30716* (2013.01); *G06F 17/30994* (2013.01); *G06Q 10/109* (2013.01)

(56) References Cited

U.S. PATENT DOCUMENTS

| | | |
|---|---|---|
| 4,653,021 A | 3/1987 | Takagi |
| 5,115,504 A | 5/1992 | Belove |
| 5,148,154 A | 9/1992 | MacKay |
| 5,241,624 A | 8/1993 | Torres |
| 5,398,074 A | 3/1995 | Duffield |
| 5,524,195 A | 6/1996 | Clanton |
| 5,535,063 A | 7/1996 | Lamming |
| 5,546,528 A | 8/1996 | Johnston |
| 5,581,752 A | 12/1996 | Inoue |
| 5,598,519 A | 1/1997 | Narayanan |
| 5,602,596 A | 2/1997 | Claussen |
| 5,606,374 A | 2/1997 | Bertram |
| 5,621,456 A | 4/1997 | Florin |
| 5,621,874 A | 4/1997 | Lucas |
| 5,623,613 A | 4/1997 | Rowe |
| 5,634,064 A | 5/1997 | Warnock |
| 5,649,182 A | 7/1997 | Reitz |
| 5,659,742 A | 8/1997 | Beattie |
| 5,663,757 A | 9/1997 | Morales |
| 5,671,381 A | 9/1997 | Strasnick et al. |
| 5,673,401 A | 9/1997 | Volk |
| 5,677,708 A | 10/1997 | Mattews |
| 5,680,605 A | 10/1997 | Torres |
| 5,682,511 A | 10/1997 | Sposato |
| 5,701,500 A | 12/1997 | Ikeo |
| 5,713,031 A | 1/1998 | Saito |
| 5,740,815 A | 4/1998 | Alpins |
| 5,781,188 A | 7/1998 | Amiot |
| 5,781,785 A | 7/1998 | Rowe |
| 5,794,178 A | 8/1998 | Caid |
| 5,812,124 A | 9/1998 | Eick |
| 5,822,751 A | 10/1998 | Gray |
| 5,832,504 A | 11/1998 | Tripathi |
| 5,838,317 A | 11/1998 | Bolnick |
| 5,838,326 A | 11/1998 | Card |
| 5,847,707 A | 12/1998 | Hayashida |
| 5,850,218 A | 12/1998 | Lajoie |
| 5,878,410 A | 3/1999 | Zbikowski |
| 5,900,879 A | 5/1999 | Berry |
| 5,903,271 A | 5/1999 | Bardon |
| 5,905,992 A | 5/1999 | Lucas |
| 5,933,843 A | 8/1999 | Takai |
| 5,982,369 A | 11/1999 | Sciammarella |
| 6,003,034 A | 12/1999 | Thli |
| 6,005,601 A | 12/1999 | Ohkura |
| 6,006,227 A | 12/1999 | Freeman |
| 6,009,442 A | 12/1999 | Chen |
| 6,012,072 A | 1/2000 | Lucas |
| 6,020,930 A | 2/2000 | Legrand |
| 6,023,703 A | 2/2000 | Hill |
| 6,028,600 A | 2/2000 | Rosin |
| 6,029,164 A | 2/2000 | Birrell |
| 6,037,933 A | 3/2000 | Blonstein |
| 6,064,384 A | 5/2000 | Ho |
| 6,067,554 A | 5/2000 | Hohensee |
| 6,081,817 A | 6/2000 | Taguchi |
| 6,088,032 A | 7/2000 | Mackinlay |
| 6,108,657 A | 8/2000 | Shoup |
| 6,111,578 A | 8/2000 | Tesler |
| 6,119,120 A | 9/2000 | Miller |
| 6,149,519 A | 11/2000 | Osaki |
| 6,151,059 A | 11/2000 | Schein |
| 6,151,604 A | 11/2000 | Wlaschin |
| 6,151,702 A | 11/2000 | Overturf |
| 6,163,345 A | 12/2000 | Noguchi |
| 6,175,362 B1 | 1/2001 | Harms |
| 6,175,845 B1 | 1/2001 | Smith |
| 6,185,551 B1 | 2/2001 | Birrell |
| 6,188,406 B1 | 2/2001 | Fong |
| 6,189,012 B1 | 2/2001 | Mital |
| 6,202,068 B1 | 3/2001 | Kraay |
| 6,211,873 B1 | 4/2001 | Moyer |
| 6,236,994 B1 | 5/2001 | Swartz |
| 6,237,004 B1 | 5/2001 | Dodson |
| 6,240,421 B1 | 5/2001 | Stolarz |
| 6,243,093 B1 | 6/2001 | Czerwinski |
| 6,243,724 B1 | 6/2001 | Mander |
| 6,253,218 B1 | 6/2001 | Aoki |
| 6,262,722 B1 | 7/2001 | Allison |
| 6,266,059 B1 | 7/2001 | Mattews |
| 6,266,098 B1 | 7/2001 | Cove |
| 6,281,898 B1 | 8/2001 | Nikolovska |
| 6,281,940 B1 | 8/2001 | Sciammarella |
| 6,289,362 B1 | 9/2001 | Van Der Meer |
| 6,295,639 B1 | 9/2001 | Van Der Meer |
| 6,308,187 B1 | 10/2001 | Destefano |
| 6,313,851 B1 | 11/2001 | Matthews |
| 6,337,698 B1 | 1/2002 | Keely, Jr. |
| 6,344,880 B1 | 2/2002 | Takahashi |
| 6,366,299 B1 | 4/2002 | Lanning |
| 6,388,665 B1 | 5/2002 | Linnett |
| 6,392,651 B1 | 5/2002 | Stradley |
| 6,418,556 B1 | 7/2002 | Bennington |
| 6,425,129 B1 | 7/2002 | Sciammarella |
| 6,456,938 B1 | 9/2002 | Barnard |
| 6,457,017 B2 | 9/2002 | Watkins |
| 6,463,431 B1 | 10/2002 | Schmitt |
| 6,466,236 B1 * | 10/2002 | Pivowar et al. ............... 715/835 |
| 6,491,585 B1 | 12/2002 | Miyamoto |
| 6,501,469 B1 | 12/2002 | MacPhail |
| 6,507,858 B1 | 1/2003 | Kanerva |
| 6,538,672 B1 | 3/2003 | Dobbelaar |
| 6,553,310 B1 | 4/2003 | Lopke |
| 6,556,225 B1 | 4/2003 | MacPhail |
| 6,577,350 B1 | 6/2003 | Proehl |
| 6,594,673 B1 | 7/2003 | Smith |
| 6,598,043 B1 | 7/2003 | Baclawski |
| 6,600,501 B1 | 7/2003 | Israel |
| D478,090 S | 8/2003 | Nguyen |
| 6,604,144 B1 | 8/2003 | Anders |
| 6,613,100 B2 | 9/2003 | Miller |
| 6,636,246 B1 | 10/2003 | Gallo |
| 6,638,313 B1 | 10/2003 | Freeman |
| 6,642,939 B1 | 11/2003 | Vallone |
| 6,650,343 B1 | 11/2003 | Fujita |
| 6,662,357 B1 | 12/2003 | Bowman-Amuah |
| 6,668,102 B2 | 12/2003 | Chiba |
| 6,671,692 B1 | 12/2003 | Marpe et al. |
| 6,671,693 B1 | 12/2003 | Marpe |
| 6,675,158 B1 | 1/2004 | Rising |
| 6,678,671 B1 | 1/2004 | Petrovic |
| 6,678,694 B1 | 1/2004 | Zimmermann |
| 6,678,891 B1 | 1/2004 | Wilcox |
| 6,690,391 B1 | 2/2004 | Proehl et al. |
| 6,691,127 B1 | 2/2004 | Bauer |
| 6,694,326 B2 | 2/2004 | Mayhew |
| 6,694,335 B1 | 2/2004 | Hopmann |
| 6,694,486 B2 | 2/2004 | Frank |
| 6,701,318 B2 | 3/2004 | Fox |
| 6,704,727 B1 | 3/2004 | Kravets |
| 6,704,744 B1 | 3/2004 | Williamson |
| 6,725,232 B2 | 4/2004 | Bradley |
| 6,725,427 B2 | 4/2004 | Freeman |
| 6,735,591 B2 | 5/2004 | Khan |
| 6,738,787 B2 | 5/2004 | Stead |
| 6,754,660 B1 | 6/2004 | MacPhail |
| 6,768,999 B2 | 7/2004 | Prager |
| 6,772,148 B2 | 8/2004 | Baclawski |
| 6,859,803 B2 | 2/2005 | Dagtas |
| 6,862,027 B2 | 3/2005 | Andrews |
| 6,879,946 B2 | 4/2005 | Rong |
| 6,889,220 B2 | 5/2005 | Wolff |
| 6,915,254 B1 | 7/2005 | Heinze |
| 6,915,489 B2 | 7/2005 | Gargi |

(56) References Cited

U.S. PATENT DOCUMENTS

| | | |
|---|---|---|
| 6,922,699 B2 | 7/2005 | Schuetze |
| 6,925,611 B2 | 8/2005 | SanGiovanni |
| 6,948,124 B2 | 9/2005 | Combs |
| 6,987,220 B2 | 1/2006 | Holcombe |
| 7,007,034 B1 | 2/2006 | Hartman |
| 7,020,848 B2 | 3/2006 | Rosenzweig |
| 7,055,104 B1 | 5/2006 | Billmaier |
| 7,080,394 B2 | 7/2006 | Istvan |
| 7,107,531 B2 | 9/2006 | Billmaier |
| 7,107,532 B1 | 9/2006 | Billmaier |
| 7,113,975 B2 | 9/2006 | Nakayama |
| 7,117,199 B2 | 10/2006 | Frank |
| 7,137,067 B2 | 11/2006 | Yanase |
| 7,139,006 B2 | 11/2006 | Wittenburg |
| 7,149,983 B1 | 12/2006 | Robertson |
| 7,155,675 B2 | 12/2006 | Billmaier |
| 7,159,177 B2 | 1/2007 | Billmaier |
| 7,199,809 B1 | 4/2007 | Lacy |
| 7,234,114 B2 | 6/2007 | Kurtz |
| 7,266,768 B2 | 9/2007 | Ferlitsch |
| 7,289,981 B2 | 10/2007 | Chang |
| 7,334,191 B1 | 2/2008 | Sivan |
| 7,346,600 B2 | 3/2008 | Nakao |
| 7,346,850 B2 | 3/2008 | Swartz |
| 7,350,157 B1 | 3/2008 | Billmaier |
| 7,353,461 B2 | 4/2008 | Davidsson |
| 7,380,260 B1 | 5/2008 | Billmaier |
| 7,418,674 B2 | 8/2008 | Robbins |
| 7,444,598 B2 | 10/2008 | Horvitz |
| 7,448,950 B2 | 11/2008 | Matsumoto |
| 7,502,819 B2 | 3/2009 | Alonso |
| 7,594,246 B1 | 9/2009 | Billmaier |
| 7,606,819 B2 | 10/2009 | Audet |
| 7,629,527 B2 | 12/2009 | Hiner |
| 7,650,569 B1 | 1/2010 | Allen |
| 7,661,075 B2 | 2/2010 | Lahdesmaki |
| 7,680,817 B2 | 3/2010 | Audet |
| 7,681,128 B2 | 3/2010 | Yamamoto |
| 7,681,149 B2 | 3/2010 | Lahdesmaki |
| 7,703,040 B2 | 4/2010 | Cutrell |
| 7,735,102 B1 | 6/2010 | Billmaier |
| 7,757,253 B2 | 7/2010 | Rappaport |
| 7,761,471 B1 | 7/2010 | Lee |
| 7,765,184 B2 | 7/2010 | Makela |
| 7,765,195 B2 | 7/2010 | Miller |
| 7,770,117 B1 | 8/2010 | Uy |
| 7,788,247 B2 | 8/2010 | Wang |
| 7,788,592 B2 | 8/2010 | William |
| 7,822,735 B2 | 10/2010 | Suda |
| 7,870,489 B2 | 1/2011 | Serita |
| 7,899,818 B2 | 3/2011 | Stonehocker |
| 7,902,741 B2 | 3/2011 | Iwanaga |
| 7,991,720 B2 | 8/2011 | Mander |
| 8,010,508 B2 | 8/2011 | Audet |
| 8,010,892 B2 | 8/2011 | Audet |
| 8,099,680 B1 | 1/2012 | Kolde |
| 2001/0025288 A1 | 9/2001 | Yanase |
| 2001/0034766 A1 | 10/2001 | Morimoto |
| 2002/0033848 A1 | 3/2002 | Sclammarello |
| 2002/0035563 A1 | 3/2002 | Suda |
| 2002/0056129 A1 | 5/2002 | Blackketter |
| 2002/0070958 A1 | 6/2002 | Yeo |
| 2002/0078440 A1 | 6/2002 | Feinberg |
| 2002/0087530 A1 | 7/2002 | Smith |
| 2002/0096831 A1 | 7/2002 | Nakayama |
| 2002/0101458 A1 | 8/2002 | SanGiovanni |
| 2002/0152474 A1 | 10/2002 | Dudkiewicz |
| 2003/0001898 A1 | 1/2003 | Bernhardson |
| 2003/0046693 A1 | 3/2003 | Billmaier |
| 2003/0046694 A1 | 3/2003 | Istvan |
| 2003/0046695 A1 | 3/2003 | Billmaier |
| 2003/0052900 A1 | 3/2003 | Card |
| 2003/0090524 A1 | 5/2003 | Segerberg |
| 2003/0093260 A1 | 5/2003 | Dagtas |
| 2003/0093792 A1 | 5/2003 | Labeeb |
| 2003/0120681 A1 | 6/2003 | Baclawski |
| 2003/0120737 A1 | 6/2003 | Lytle |
| 2003/0132971 A1 | 7/2003 | Billmaier |
| 2003/0149939 A1 | 8/2003 | Hubel |
| 2003/0163468 A1 | 8/2003 | Freeman |
| 2003/0167902 A1 | 9/2003 | Hiner |
| 2003/0190950 A1 | 10/2003 | Matsumoto |
| 2003/0237047 A1 | 12/2003 | Borson |
| 2004/0024738 A1 | 2/2004 | Yamane |
| 2004/0054968 A1 | 3/2004 | Savage |
| 2004/0064473 A1 | 4/2004 | Thomas |
| 2004/0090439 A1 | 5/2004 | Dillner |
| 2004/0111401 A1 | 6/2004 | Chang |
| 2004/0125143 A1 | 7/2004 | Deaton |
| 2004/0128277 A1 | 7/2004 | Mander |
| 2004/0128377 A1 | 7/2004 | Sadaghiany |
| 2004/0139143 A1 | 7/2004 | Canakapalli |
| 2004/0150657 A1 | 8/2004 | Wittenburg |
| 2004/0233238 A1 | 11/2004 | Lahdesmaki |
| 2004/0233239 A1 | 11/2004 | Lahdesmaki |
| 2004/0263519 A1 | 12/2004 | Andrews |
| 2005/0060667 A1 | 3/2005 | Robins |
| 2005/0091596 A1* | 4/2005 | Anthony et al. ............... 715/712 |
| 2005/0108253 A1* | 5/2005 | Metsatahti et al. ........... 707/100 |
| 2005/0187943 A1* | 8/2005 | Finke-Anlauff et al. ..... 707/100 |
| 2006/0136466 A1 | 6/2006 | Weiner |
| 2006/0242178 A1 | 10/2006 | Butterfield |
| 2006/0248129 A1 | 11/2006 | Carnes |
| 2006/0259511 A1 | 11/2006 | Boerries |
| 2007/0005576 A1 | 1/2007 | Cutrell |
| 2007/0007884 A1 | 1/2007 | Iwanaga |
| 2007/0055782 A1* | 3/2007 | Wright et al. ................. 709/227 |
| 2007/0061855 A1 | 3/2007 | Serita |
| 2007/0067290 A1 | 3/2007 | Makela |
| 2007/0156654 A1 | 7/2007 | Ravinarayanan |
| 2007/0171224 A1 | 7/2007 | MacPherson |
| 2007/0204218 A1 | 8/2007 | Weber |
| 2007/0214169 A1* | 9/2007 | Audet et al. .................. 707/102 |
| 2007/0216694 A1 | 9/2007 | Audet |
| 2007/0239676 A1 | 10/2007 | Stonehocker |
| 2007/0271508 A1 | 11/2007 | Audet |
| 2007/0272508 A1 | 11/2007 | Toya |
| 2007/0288247 A1* | 12/2007 | Mackay ........................... 705/1 |
| 2008/0000126 A1 | 1/2008 | Teza |
| 2008/0019371 A1 | 1/2008 | Anschutz |
| 2008/0022199 A1 | 1/2008 | Sako |
| 2008/0058106 A1 | 3/2008 | Audet |
| 2008/0071822 A1 | 3/2008 | Audet |
| 2008/0072169 A1 | 3/2008 | Audet |
| 2008/0092038 A1 | 4/2008 | Audet |
| 2008/0133579 A1* | 6/2008 | Lim ............................. 707/102 |
| 2008/0134013 A1 | 6/2008 | Audet |
| 2008/0134022 A1 | 6/2008 | Audet |
| 2008/0141115 A1 | 6/2008 | Audet |
| 2008/0243778 A1 | 10/2008 | Behnen |
| 2008/0270361 A1 | 10/2008 | Meyer |
| 2008/0295016 A1 | 11/2008 | Audet |
| 2008/0299989 A1 | 12/2008 | King |
| 2009/0019371 A1 | 1/2009 | Audet |
| 2009/0048981 A1 | 2/2009 | Millan |
| 2009/0055413 A1 | 2/2009 | Audet |
| 2009/0055726 A1 | 2/2009 | Audet |
| 2009/0055729 A1 | 2/2009 | Audet |
| 2009/0055763 A1 | 2/2009 | Audet |
| 2009/0055776 A1 | 2/2009 | Audet |
| 2009/0063552 A1 | 3/2009 | Jones |
| 2009/0070662 A1 | 3/2009 | Audet |
| 2009/0083260 A1 | 3/2009 | Artom |
| 2009/0228788 A1 | 9/2009 | Audet |
| 2009/0287693 A1 | 11/2009 | Audet |
| 2009/0288006 A1 | 11/2009 | Audet |
| 2010/0082427 A1 | 4/2010 | Burgener |
| 2010/0082653 A1 | 4/2010 | Nair |
| 2010/0094890 A1 | 4/2010 | Bokor |
| 2010/0145976 A1 | 6/2010 | Higgins |
| 2010/0169823 A1 | 7/2010 | Audet |
| 2010/0185509 A1 | 7/2010 | Higgins |
| 2010/0325132 A1 | 12/2010 | Liu |
| 2010/0325134 A1 | 12/2010 | Galfond |

(56) References Cited

U.S. PATENT DOCUMENTS

| | | |
|---|---|---|
| 2010/0332512 A1 | 12/2010 | Shpits |
| 2010/0333031 A1 | 12/2010 | Castelli |
| 2011/0078166 A1 | 3/2011 | Oliver |
| 2011/0307814 A1 | 12/2011 | Audet |
| 2012/0159320 A1 | 6/2012 | Audet |
| 2012/0198385 A1 | 8/2012 | Audet |
| 2012/0198389 A1 | 8/2012 | Audet |
| 2012/0249581 A1 | 10/2012 | Cassistat |
| 2012/0260204 A1 | 10/2012 | Audet |
| 2013/0080880 A1 | 3/2013 | Cassistat |
| 2013/0080888 A1 | 3/2013 | Audet |

FOREIGN PATENT DOCUMENTS

| | | |
|---|---|---|
| JP | 08-016612 | 1/1996 |
| JP | 09-016809 | 1/1997 |
| JP | 09-265480 | 10/1997 |
| JP | 09-288659 | 11/1997 |
| JP | 10-143414 | 5/1998 |
| JP | 10-149432 | 6/1998 |
| JP | 10-275222 | 10/1998 |
| JP | 11-120180 | 4/1999 |
| JP | 11-195028 | 7/1999 |
| JP | 11-212988 | 8/1999 |
| JP | 2000-099540 | 4/2000 |
| JP | 2000-250942 | 9/2000 |
| JP | 2000-293281 | 10/2000 |
| JP | 2000-348040 | 12/2000 |
| JP | 2001-005822 | 1/2001 |
| JP | 2001-092737 | 4/2001 |
| JP | 2001-101227 | 4/2001 |
| JP | 2001-167288 | 6/2001 |
| JP | 2001-243244 | 9/2001 |
| JP | 2001-282816 | 10/2001 |
| JP | 2001-331514 | 11/2001 |
| JP | 2001-337762 | 12/2001 |
| JP | 2001-337953 | 12/2001 |
| JP | 2002-056411 | 2/2002 |
| WO | WO 01/22194 | 3/2001 |
| WO | WO 01/63378 | 8/2001 |
| WO | WO 01/98881 | 12/2001 |
| WO | WO 03/032199 | 4/2003 |
| WO | WO 2005/045756 | 5/2005 |
| WO | WO 2005/083595 | 9/2005 |
| WO | WO 2007/095997 | 8/2007 |
| WO | WO 2008/030779 | 3/2008 |

OTHER PUBLICATIONS

Haystack Project; David R. Karger, Stephen J. Garland, Karun Bakshi, David Huynh, Nicholas Matsakis, Dennis Quan, Vineet Sinha, Jaime Teevan, Yuan Shen, Punyashloka Biswal, Artem Gleyzer, Ryan Manuel, Alexandre P. Poliakov, Amanda Smith, Lynn A. Stein, Eytan Adar, Mark Asdoorian, Robert Aspell, Wendy Chien, Gabriel Cunningham, Jonathan Derryberry, Adam Holt, Joshua Kramer, Percy Liang, Ilya Lisansky, Aidan Low, Enrique A. Muñoz Torres, Mark Rosen, Kai Shih, Svetlana Shnitser, Ben Walter, Marina Zhurakhinskaya; Massachsetts Institute of Technology; http://web.archive.org/web/20070415053620/http://haystack.lcs.mit.edu/ ; http://groups.csail.mit.edu/haystack/ ; http://en.wikipedia.org/wiki/Haystack_%28MIT_project%29.

Chandler Project; Grant Baillie, Jeffrey Harris, Sheila Mooney, Katie Capps Parlante, Jared Rhine, Mimi Yin, Eugene Kim, Alex Russell, Andre Mueninghoff, Al Cho, Aleks Totic, Alec Flett, Andi Vajda, Andy Hertzfeld, Aparna Kadakia, Bobby Rullo, Brendan O'Connor, Brian Douglas Skinner, Brian Kirsch, Brian Moseley, Bryan Stearns, Chao Lam, Chris Haumesser, David Surovell, Donn Denman, Ducky Sherwood, Ed Bindl, Edward Chao, Heikki Toivonen, Jed Burgess, John Anderson, John Townsend, Jürgen Botz, Lisa Dusseault, Lori Motko, Lou Montulli, Mark Jaffe, Matthew Eernisse, Michael Toy, Mike Taylor, Mitch Kapor, Morgen Sagen, Pieter Hartsook, Philippe Bossut, Priscilla Chung, Robin Dunn, Randy Letness, Rys McCusker, Stuart Parmenter, Suzette Tauber, Ted Leung, Travis Vachon, Vinubalaji Gopal ; Open Source Applications Foundation ; http://chandlerproject.org/

Emacs Org-Mode; Carsten, Bastien Guerry, Eric Shulte, Dan Davison, John Wiegley, Sebastian Rose, Nicolas Goaziou, Achim Gratz, Nick Dokos, Russel Adams, Suvayu Ali, Luis Anaya, Thomas Baumann, Michael Brand, Christophe Bataillon, Alex Bochannek, Jan BÃ¶cker, Brad Bozarth, Tom Breton, Charles Cave, Pavel Chalmoviansky, Gregory Chernov, Sacha Chua, Toby S. Cubitt, Baoqiu Cui, Eddward DeVilla, Nick Dokos, Kees Dullemond, Thomas S. Dye, Christian Egli, David Emery, Nic Ferrier, Miguel A. Figueroa-Villanueva, John Foerch, Raimar Finken, Mikael Fornius, Austin Frank, Eric Fraga, Barry Gidden, Niels Giesen, Nicolas Goaziou, Kai Grossjohann, Brian Gough, Bernt Hansen, Manuel Hermenegildo, Phil Jackson, Scott Jaderholm, Matt Jones, Tokuya Kameshima, Jonathan Leech-Pepin, Shidai Liu, Matt Lundin, David Maus, Jason F. McBrayer, Max Mikhanosha, Dmitri Minaev, Stefan Monnier, Richard Moreland, Rick Moynihan, Todd Neal, Greg Newman, Tim O'Callaghan, Osamu Okano, Takeshi Okano, Oliver Oppitz, Scott Otterson, Pete Phillips, Francesco Pizzolante, Martin Pohlack, T.V. Raman, Matthias Rempe, Paul Rivier, Kevin Rogers, Frank Ruell, Jason Riedy, Philip Rooke, Christian Schlauer, Christopher Schmidt, Paul Sexton, Tom Shannon, Ilya Shlyakhter, Stathis Sideris, Daniel Sinder, Dale Smith, James TD Smith, Adam Spiers, Ulf Stegemann, Andy Stewart, David O'Toole, Jambunathan K, Sebastien Vauban, Stefan Vollmar, Jürgen Vollmer, Samuel Wales, Chris Wallace, David Wainberg, Carsten Wimmer, Roland Winkler, Piotr Zielinski; http://orgmode.org/.

* cited by examiner

| Altitude | Precision | Attributes |
|---|---|---|
| + | - | Continent |
| | | Country |
| | | Province |
| | | Township |
| | | City |
| | | Street |
| | | House |
| - | + | Individual |

| Altitude + | ← | | | | Altitude - |
|---|---|---|---|---|---|
| | | Attributes | | | |
| Continents | Countries | Provinces / States | Cities | Highways | Streets |
| | | | | | |
| America | Canada | Alberta | | | |
| | | British Columbia | | | |
| | | Manitoba | | | |
| | | Ontario | | | |
| | | PEI | | | |
| | | Newfoundland | | | |
| | | Terra Nova | | | |
| | | Quebec | Montreal | A-15 | |
| | | | | A-40 | |
| | | | | A-13 | |
| | | | | | |
| | | | Sherbrooke | | |
| | | | Gatineau | | |
| | | | Trois-Rivières | | |
| | | | Baie-Saint-Paul | | |
| | | | | | |
| | United States | Alabama | | | |
| | | Alaska | | | |
| | | Arizona | | | |
| | | Arkansas | | | |
| | | California | | | |
| | | | | | |
| | Mexico | | | | |
| | | | | | |
| Europe | | | | | |
| Africa | | | | | |
| ... | | | | | |

Fig.19

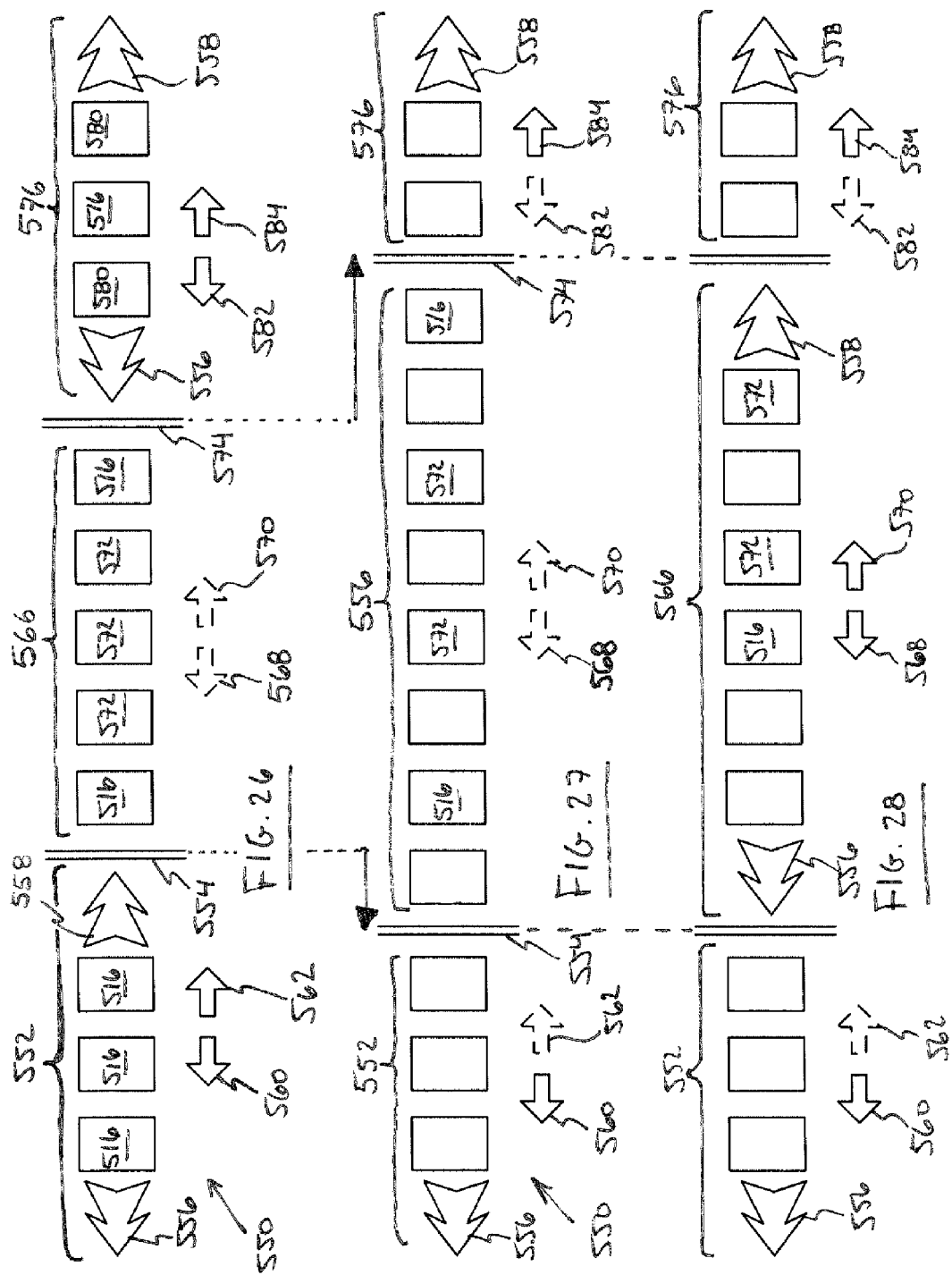

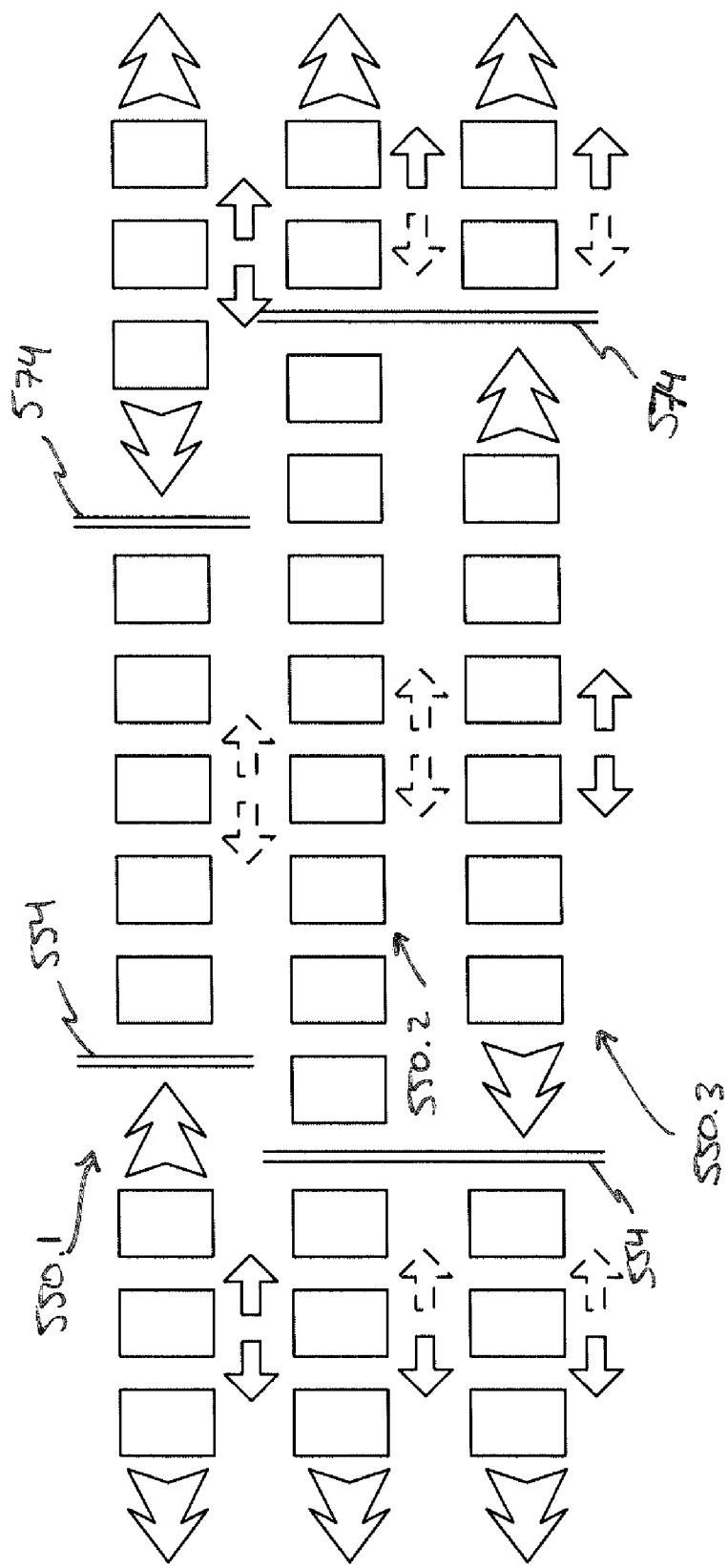

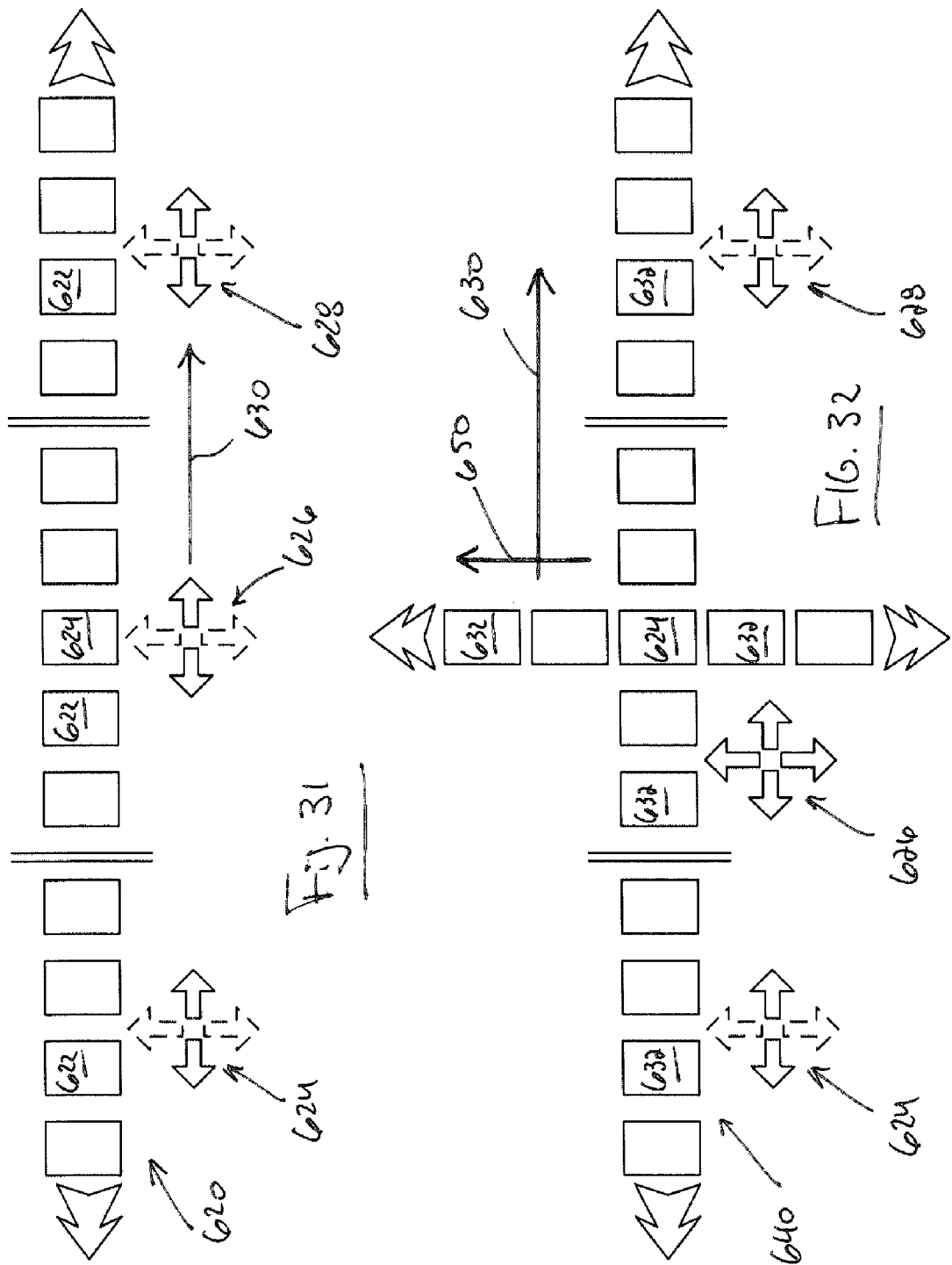

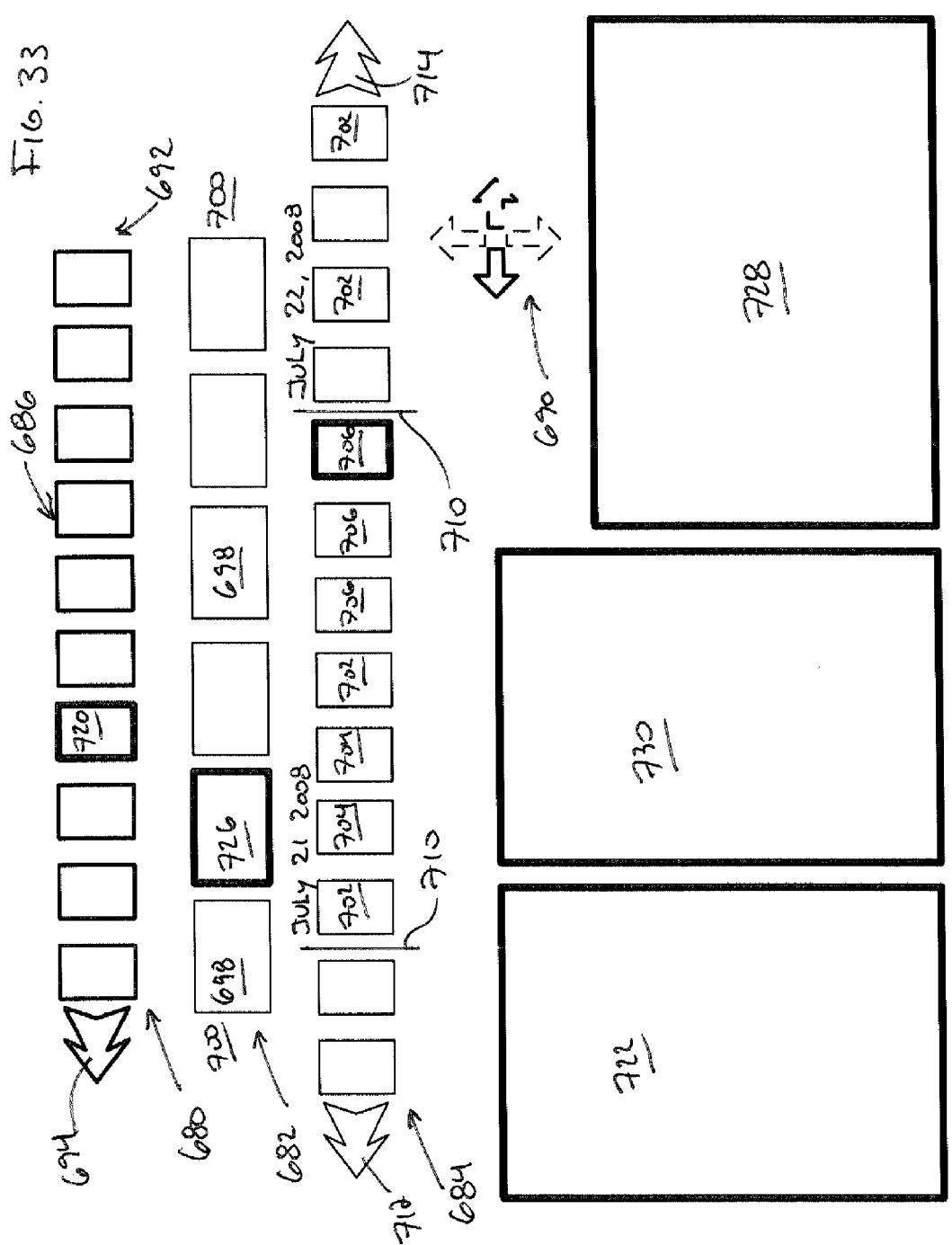

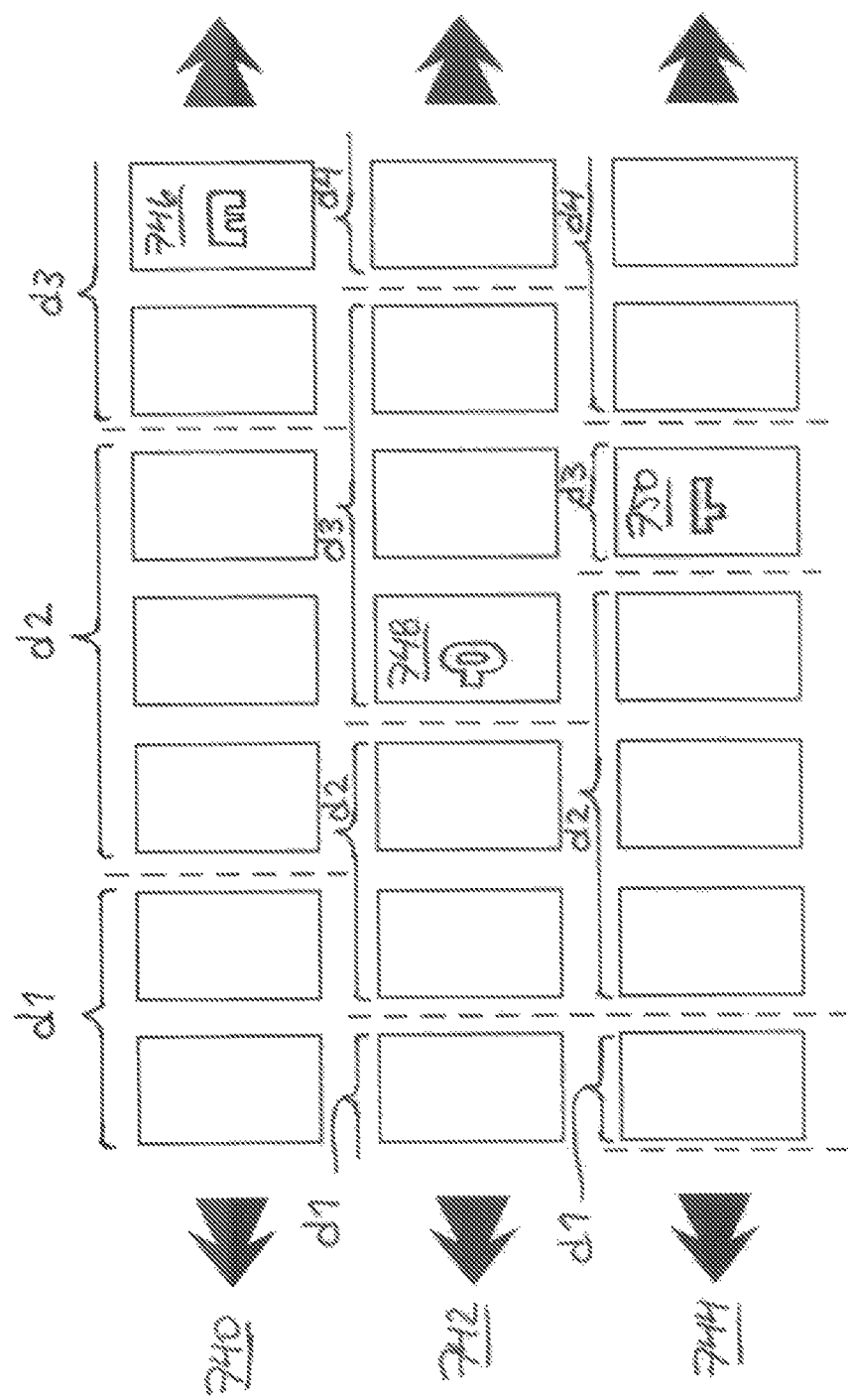

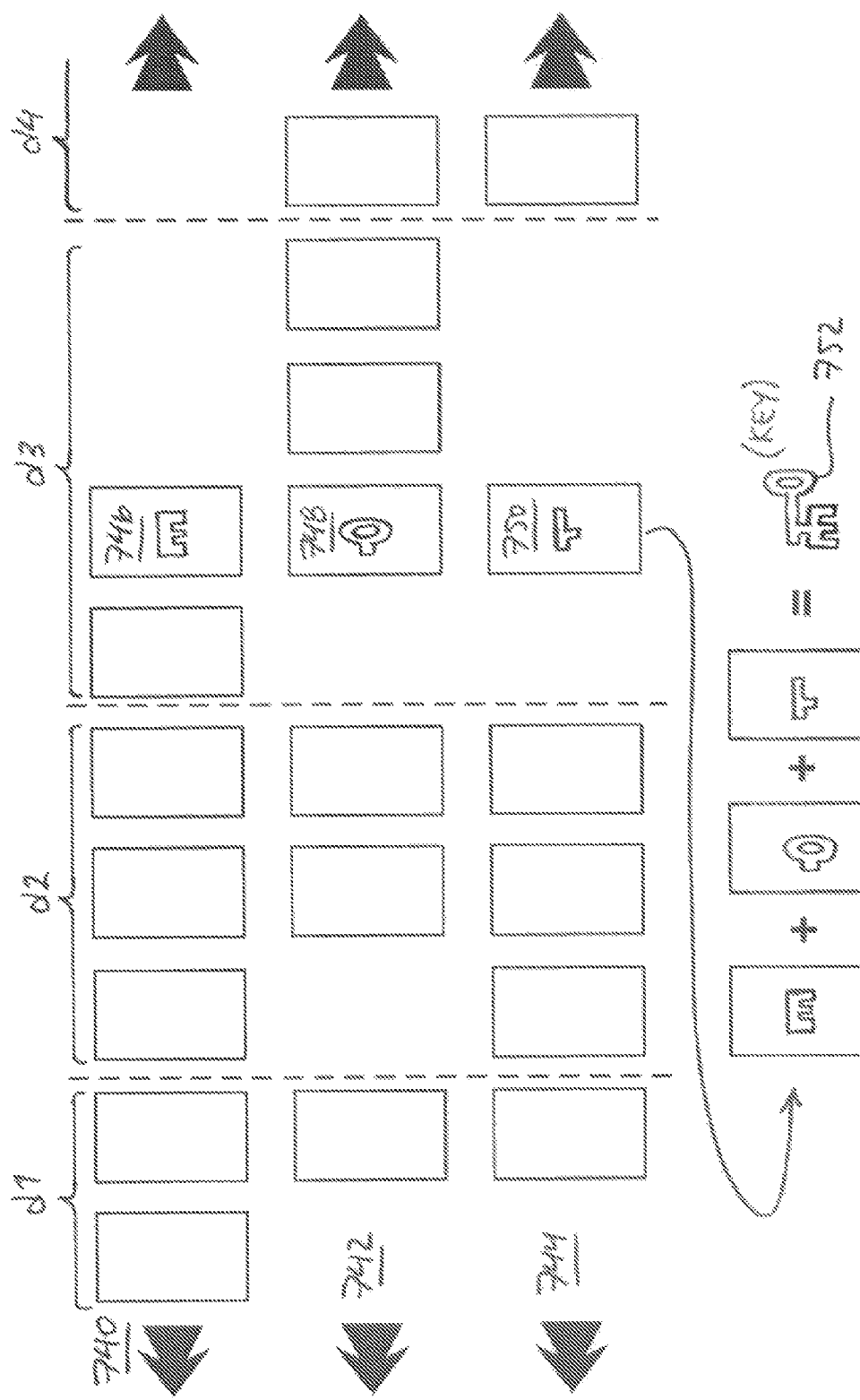

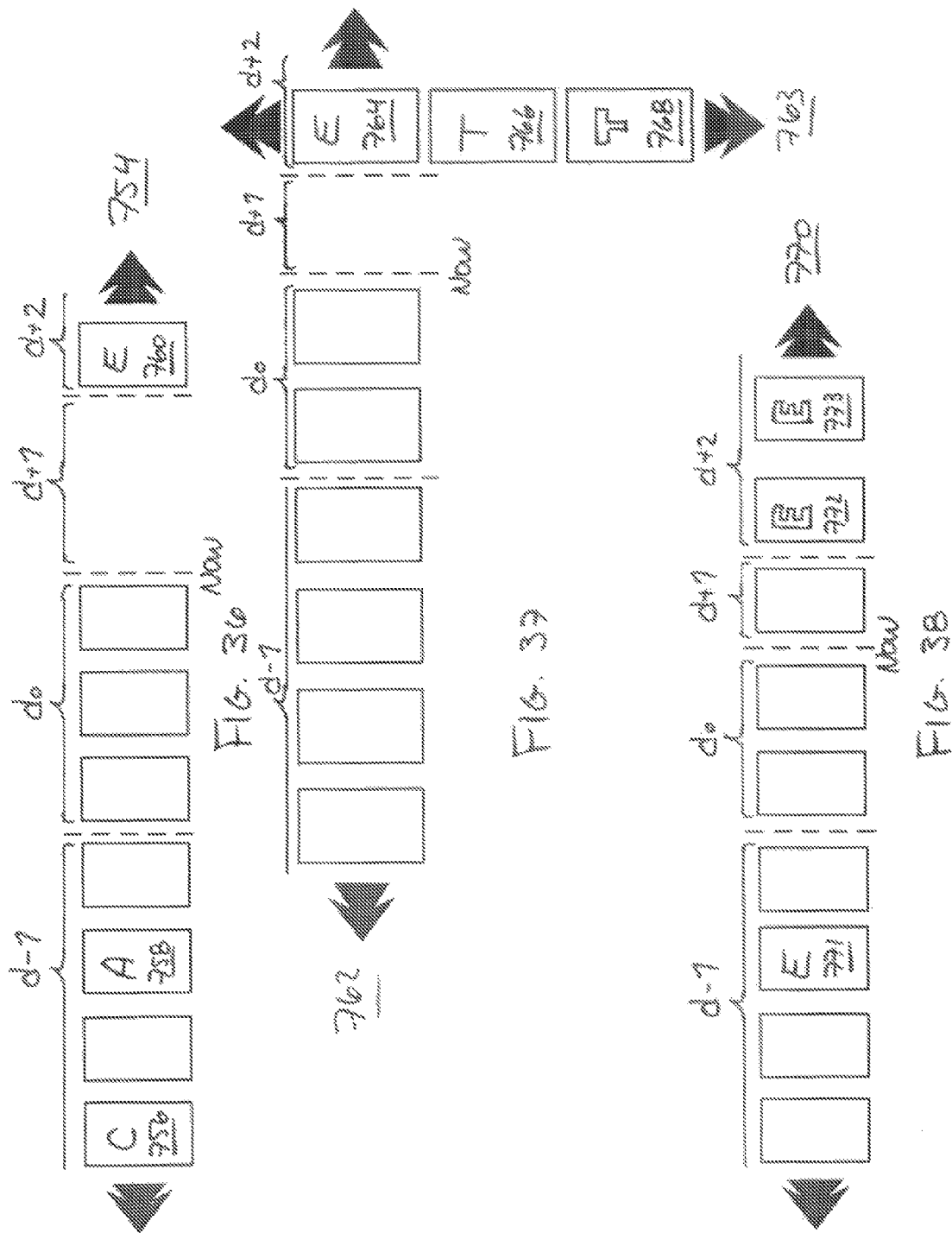

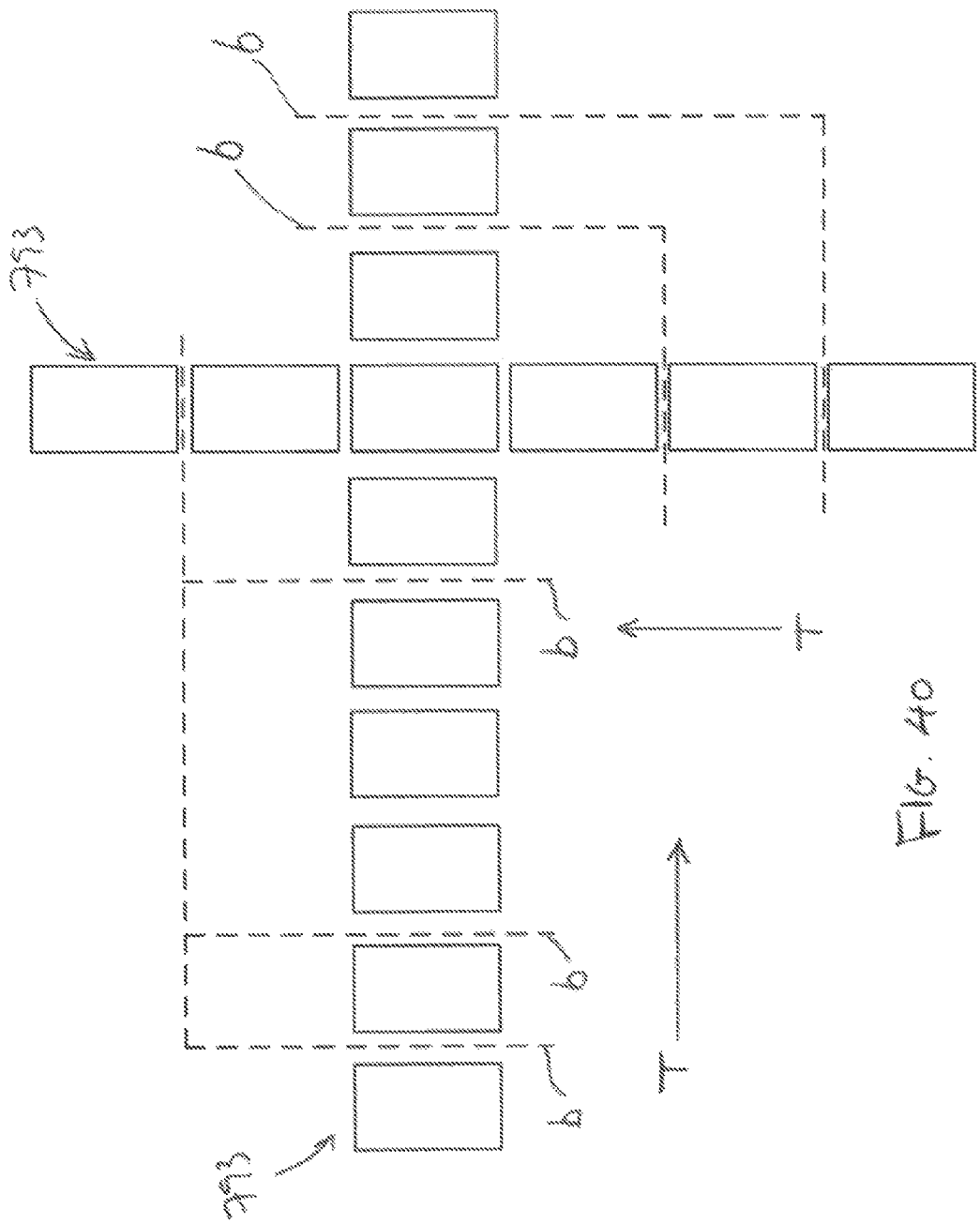

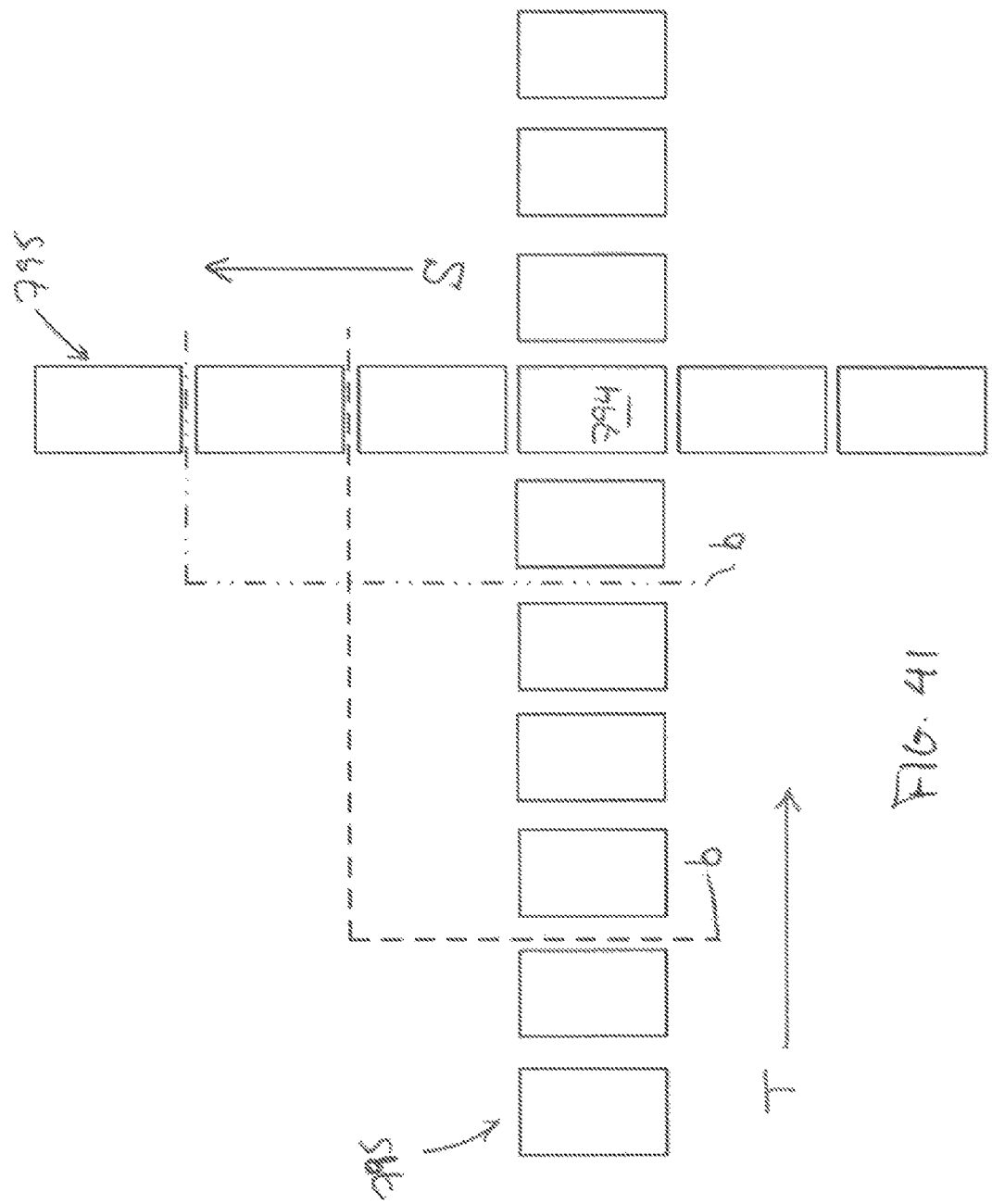

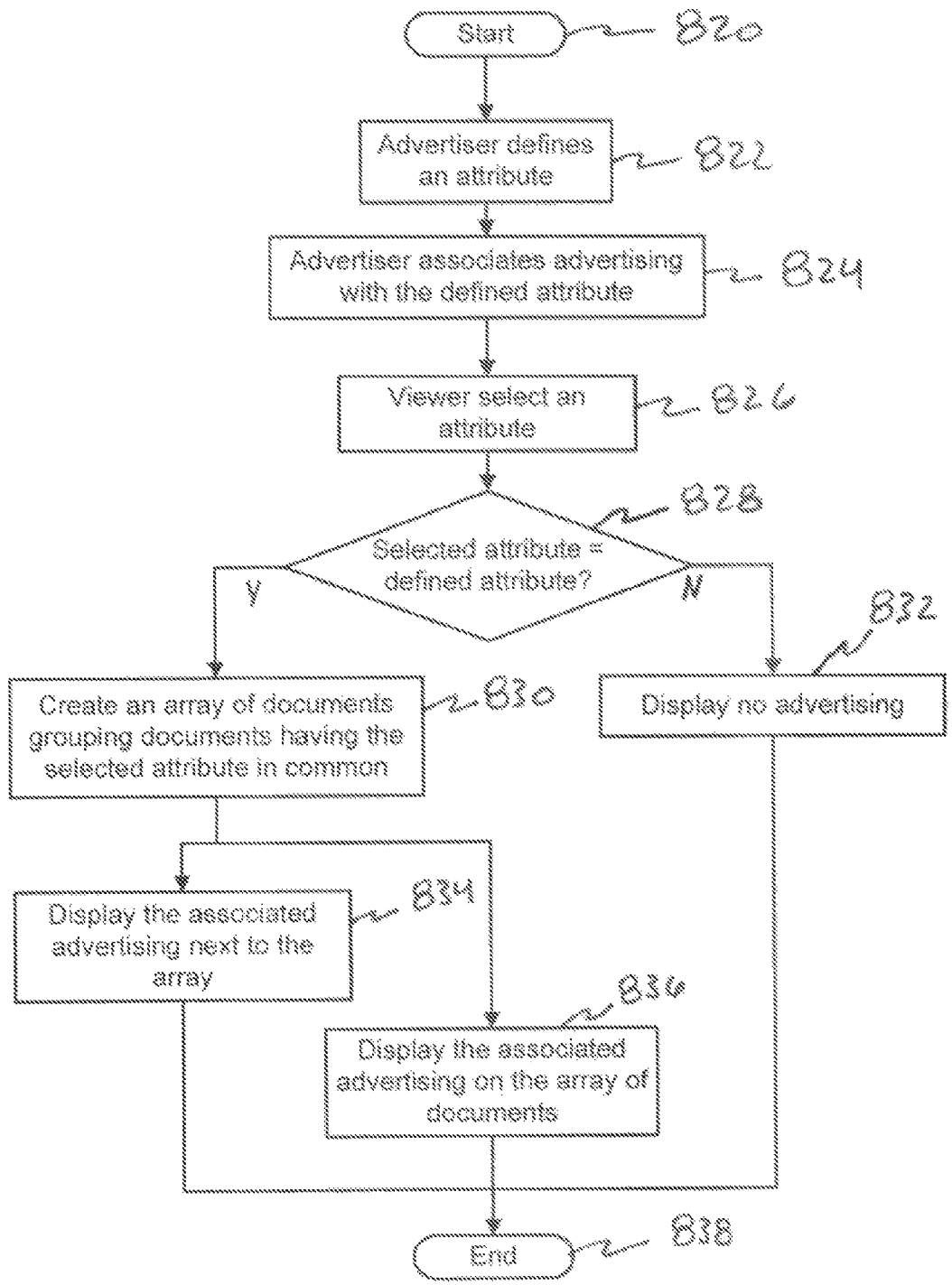

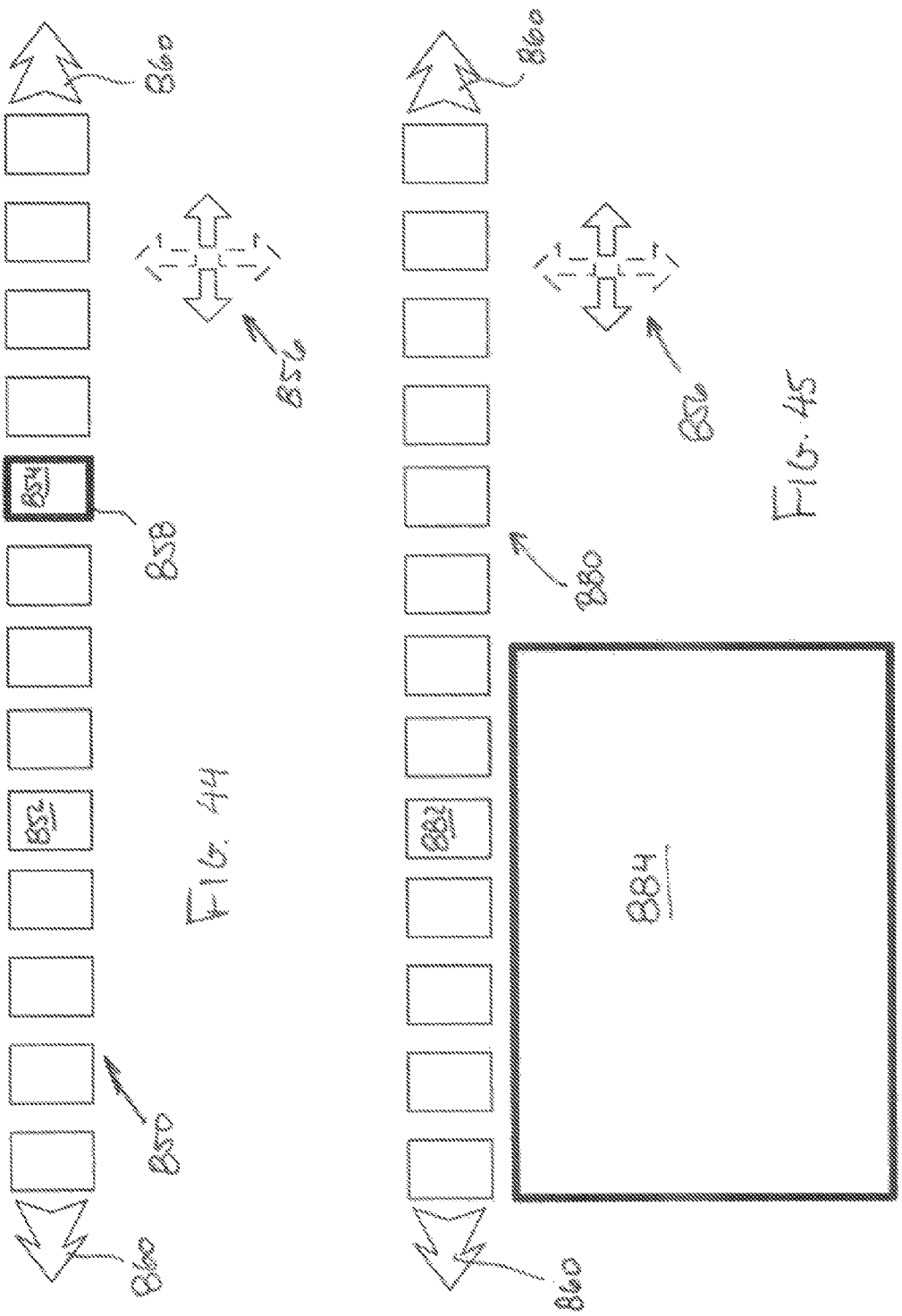

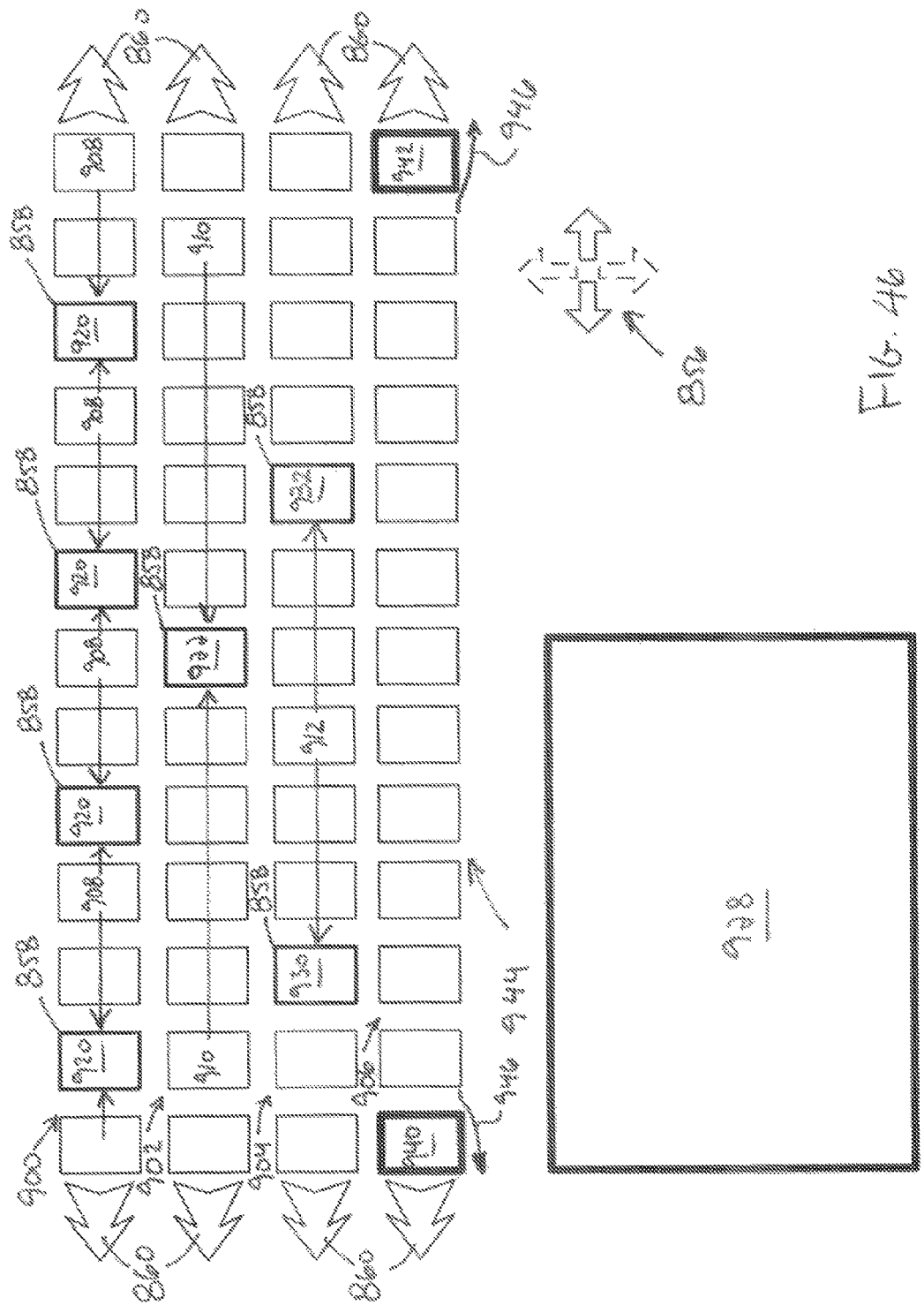

ARRAY OF DOCUMENTS WITH PAST, PRESENT AND FUTURE PORTIONS THEREOF

CROSS-REFERENCES

The present application is a continuation of, and claims priority under 35 U.S.C. 120 to, U.S. patent application Ser. No. 12/192,286, filed Aug. 15, 2008, entitled POSITION BASED MULTI-DIMENSIONAL LOCATING SYSTEM AND METHOD, which is incorporated herein by reference, and which is a nonprovisional of, and claims priority under 35 U.S.C. 119(e) to, U.S. provisional patent application No. 60/957,444, filed Aug. 22, 2007, entitled INFORMATION ELEMENTS LOCATING SYSTEM AND METHOD; U.S. provisional patent application No. 60/971,214, filed Sep. 10, 2007, entitled GEOGRAPHICAL LOCATING SYSTEM AND METHOD; and from U.S. provisional patent application No. 61/034,625, filed Mar. 7, 2008, entitled INTERFACE. All the previously cited documents are incorporated herein by reference. Any publication of and any patent issuing from the foregoing U.S. patent applications is hereby incorporated herein by reference including United States patent application publication No.: US 2007/0214169 A1, published Sep. 13, 2007, entitled MULTI-DIMENSIONAL LOCATING SYSTEM AND METHOD and United States patent application publication No.: US 2007/0271508 A1, published Nov. 22, 2007, entitled MULTI-DIMENSIONAL LOCATING SYSTEM AND METHOD. Furthermore, the disclosures of the priority provisional applications are contained in the Appendix hereto, which is incorporated herein by reference.

BACKGROUND OF THE INVENTION

1. Field of the Invention

This invention relates generally to computer systems and more specifically to a method, a system and an interface that facilitates localization and organization of user-selectable elements. More precisely, the present invention relates to a method for managing arrays of user-selectable elements in association with a geographical or a celestial position; separating user-selectable elements in portions of time; and displaying advertising.

b 2. Description of the Related Art

With the always-increasing amount of information one has to deal with on a daily basis it becomes harder to manage the information on an item-by-item basis. An alternative information management system adapted to organize large amount of information would be beneficial to the user.

United States Patent Application Publication No.: US 2007/0214169 A1, published on Sep. 13, 2007 discloses a Multi-dimensional locating system and method (title). The patent application discloses ways for managing and displaying vectors of documents and other computer-readable files. A vector of documents that groups a plurality of documents along a predetermined order, inter alia, is taught.

United States Patent Application Publication No.: US 2007/0271508 A1, published on Nov. 22, 2007 discloses a Multi-dimensional locating system and method (title). A plurality of vectors of documents and other computer-readable files sharing a common timeline is disclosed.

With the possibility of displaying vectors of documents and other information elements it is desirable to associate arrays of user-selectable elements and/or user-selectable elements with a position/location.

It is also desirable to separate documents and other information elements on an information element vector in accordance with the past, the present and the future.

It is desirable to display advertising in relation with the selected attribute(s) associated with an information element vector to more precisely direct the advertising or the message to a receptive audience.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

This invention generally refers to user-selectable elements that include computer-readable files like documents and multimedia assets. User-selectable elements can alternatively be referred to menu icons or thumbnails that are associated to an attribute, a category or a tag and arranged as explained below. In order to lighten the reading of the present specification, the term "document" is generally used without intending to limit the scope of the present patent application only to documents. unless positively specified, but rather to include, inter alia, the above-mentioned user-selectable elements.

Therefore, an aspect of the present invention provides an array of documents related to a position/location.

An aspect of the present invention provides a plurality of arrays of documents related to a position/location, each array being adapted to group documents having a commonality therebetween.

An additional aspect of the present invention provides an array of documents related to a position, each array being adapted to group documents having a commonality, the commonality being graphically represented and associated with the array of documents to which it relates, the graphical representation being adapted to be selectable.

An object of the present invention provides a means to draw a relation between an array of documents and a geographical map and/or a celestial map.

One aspect of the present invention provides a graphical link between an array of documents and a position/location on a map.

One other aspect of the present invention provides a graphical link between a document on an array of documents and a position on a map.

Another aspect of the present invention provides a query determining the documents to be displayed on an array of documents, the query being adapted to change in consideration of the altitude of a map.

One other aspect of the present invention provides a choice of attributes that is associated with an altitude from which a map is visualized.

An aspect of the present invention provides a plurality of attributes, the plurality of attributes having respective associations with an altitude, the altitude being material into the determination of the attributes that are available to a user to select.

Another aspect of the present invention provides a choice of documents displayed on an array of documents that are selected, at least in part, on an azimuth.

One aspect of the present invention provides a choice of documents displayed on an array of documents that are selected, at least in part, on a declination.

An aspect of the present invention provides a dynamic link between an array of documents and a position on a map, a movement of the subject position on the map influencing which documents are displayed on the array of documents.

Another aspect of the present invention provides one or more tangible machine-readable media having machine-executable instructions encoded thereon which, when executed by a data processing system, cause the data processing system to perform a method comprising: receiving instructions providing data about a position; and displaying an array of user-selectable elements, the array of user-selectable elements being adapted to group user-selectable elements related to the position.

An aspect of the present invention provides an arrangement of documents in accordance with a timeline defining the past, the present and the future.

One other aspect of the present invention provides an arrangement of documents on an array of documents along a timeline defining the past, the present and the future.

Another aspect of the present invention provides independent scrolling capability for each of a past, present and future portion of an array of documents.

An aspect of the present invention provides an array of documents defining a first portion displaying documents related to the past, a second portion displaying documents, and or computer programs, related to the present and a third portion displaying documents or scheduled elements related to the future.

One other aspect of the present invention provides an array of documents that displays documents related to the past on a first linear distribution, documents related to the present on a second linear distribution and documents related to the future on a third linear distribution. The linear distributions being displayable adjacent to each other.

One aspect of the present invention provides a means to magnify a document from an array of documents.

Another aspect of the present invention provides a single means for scrolling through documents disposed on an array of documents among other arrays of documents. The desired array of document being adapted to be selected prior to being actively scrolled through.

One other additional aspect of the present invention provides one or more tangible machine-readable media having encoded machine-executable instructions adapted to provide a method for displaying arrays of user-selectable elements, the method comprising: displaying an array of user-selectable elements, the array of user-selectable elements defining a past portion, a present portion and a future portion.

An aspect of the present invention provides a tool for managing information that is adapted to display documents in a fashion that allows a user to draw links therebetween.

One aspect of the present invention provides a mechanism to display advertising in association with an array of documents based on attributes used to determine which documents are displayed on the array of documents.

Another aspect of the present invention provides advertising in association with an array of documents based on the selection of commonality that is material in the selection of the documents on the array.

An aspect of the present invention provides a mechanism that displays advertising at predetermined intervals therebetween on an array of documents.

One other aspect of the present invention provides an advertiser to determine attributes and associate the determined attributes with advertisings and correlate the determined attribute with the selection of attribute(s) made by a user to display the associated advertising(s).

Another aspect of the present invention provides one or more tangible machine-readable media having encoded machine-executable instructions adapted to provide a method for displaying arrays of user-selectable elements comprising: associating an advertising with an attribute; receiving instructions about the selection of the attribute; displaying an array of user-selectable elements, the array of user-selectable elements grouping user-selectable element having the attribute in common; and displaying the advertising.

These and other advantages and features of the present invention will become apparent from the following description and the attached drawings.

BRIEF DESCRIPTION OF THE DRAWINGS

Referring now to the drawings which form a part of this original disclosure:

FIG. 19 is an alternate illustrative table of the relation between the altitude and the precision of attributes;

FIG. 26 illustrates an array of documents including a past portion, a present portion and a future portion, each portion associated with their respective navigation means;

FIG. 27 alternatively illustrates an array of documents including a past portion, a present portion and a future portion, each portion being associated with their respective navigation means;

FIG. 28 also alternatively illustrates an array of documents including a past portion, a present portion and a future portion, each portion being associated with their respective navigation means;

FIG. 29 illustrates a series of arrays of documents including a past portion, a present portion and a future portion, each portion being associated with their respective navigation means;

FIG. 31 illustrates an array of documents with bi-dimensional navigation means;

FIG. 32 illustrates two intersecting arrays of documents with bi-dimensional navigation means;

FIG. 33 illustrates an array of documents separating the past portion, the present portion and the future portion on distinct rows and further magnifying selected documents;

FIG. 34 is a schematic illustration of three arrays of documents juxtaposed one to the other;

FIG. 35 is a schematic illustration of the three arrays of FIG. 34 using a different distribution;

FIG. 36 is a schematic illustration of an array of documents;

FIG. 37 is a schematic illustration of two arrays of documents;

FIG. 38 is a schematic illustration of an array of documents;

FIG. 39 is a schematic illustration of three arrays of documents;

FIG. 40 is a schematic illustration of two intersecting arrays of documents;

FIG. 41 is a schematic illustration of two intersecting arrays of documents;

FIG. 43 is an alternate flow chart of advertising associated with attributes and displayed when the attribute is selected in conjunction with an array of documents;

FIG. 44 is an illustrative array of documents displaying an advertising;

FIG. 45 is an alternate illustrative array of documents displaying an advertising; and FIG. 46 is an alternate illustrative array of documents displaying advertising.

DESCRIPTION OF EMBODIMENT(S) OF THE INVENTION

Figure 1:
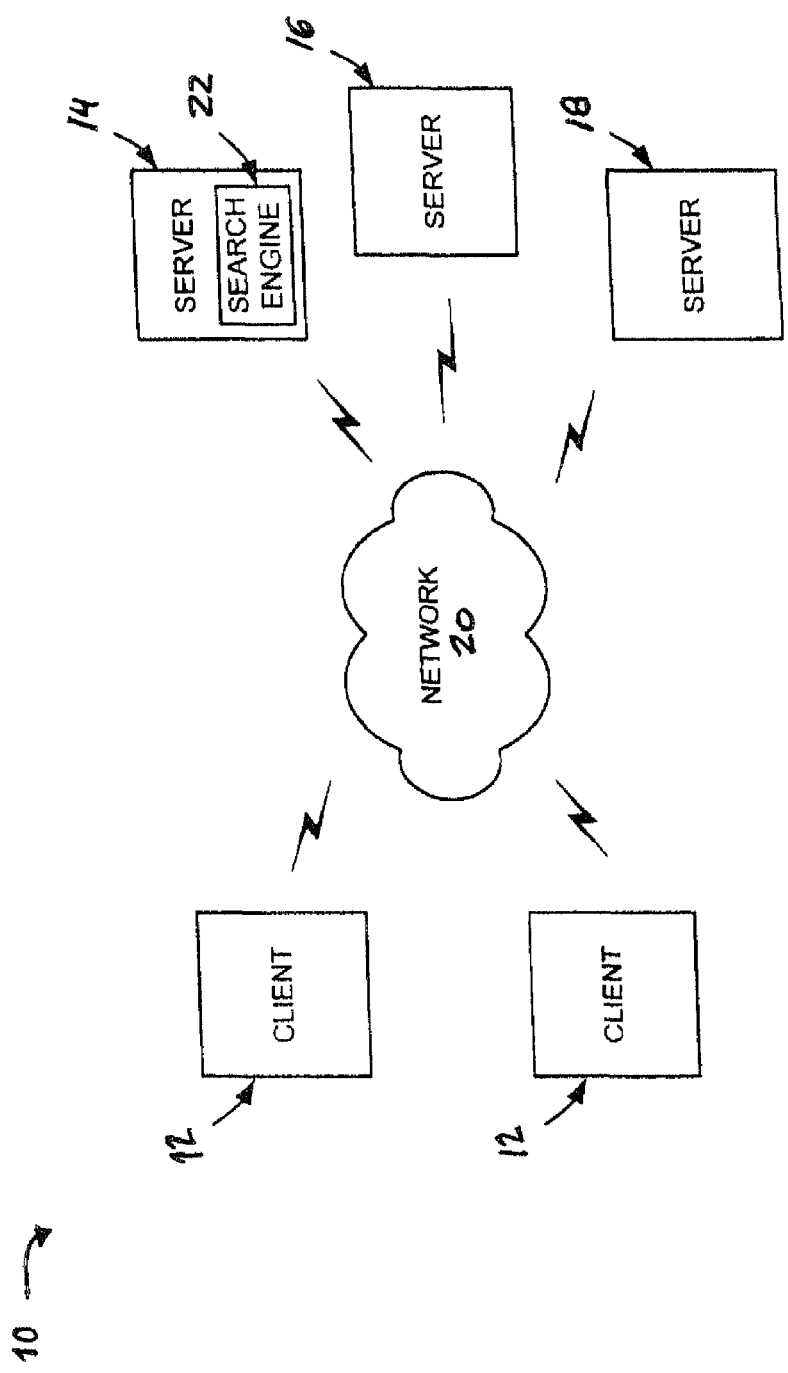
FIG. 1 is a schematic view of a computer network.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

The features provided in this specification mainly relates to basic principles for managing arrays of documents in relation with geographical position and/or celestial position; separating user-selectable elements in portions of time; and displaying advertising. This specification also covers computer software and machine-readable code/instructions adapted to manage an array of documents with a related geographical position; adapted to separate user-selectable elements in portions of time; and also adapted to display advertising. These code/instructions are preferably stored on a machine-readable medium to be read and acted upon to with a computer or a machine having the appropriate code/instructions reading capability.

Exemplary Network

FIG. 1 illustrates an exemplary network 10 in which a system and method, consistent with the present invention, may be implemented. The network 10 may include multiple client devices 12 connected to multiple servers 14, 16, 18 via a network 20. The network 20 may include a local area network (LAN), a wide area network (WAN), a telephone network, such as the Public Switched Telephone Network (PSTN), an intranet, the Internet, Wi-Fi, WiMAX or a combination of networks. Two client devices 12 and three servers 14, 16, 18 have been illustrated as connected to network 20 for simplicity. In practice, there may be more or less client devices and servers. Also, in some instances, a client device may perform the functions of a server and a server may perform the functions of a client device.

The client devices 12 may include devices, such as mainframes, minicomputers, personal computers, laptops, personal digital assistants, telephones, or the like, capable of connecting to the network 20. The client devices 12 may transmit data over the network 20 or receive data from the network 20 via a wired, wireless, or optical connection.

The servers 14, 16, 18 may include one or more types of computer systems, such as a mainframe, minicomputer, or personal computer, capable of connecting to the network 20 to enable servers 14, 16, 18 to communicate with the client devices 12. In alternative implementations, the servers 14, 16, 18 may include mechanisms for directly connecting to one or more client devices 12. The servers 14, 16, 18 may transmit data over network 14 or receive data from the network 20 via a wired, wireless, or optical connection.

In an implementation consistent with the present invention, the server 14 may include a search engine 22 usable by the client devices 12. The servers 14 may store documents, such as web pages, accessible by the client devices 12.

Figure 2:
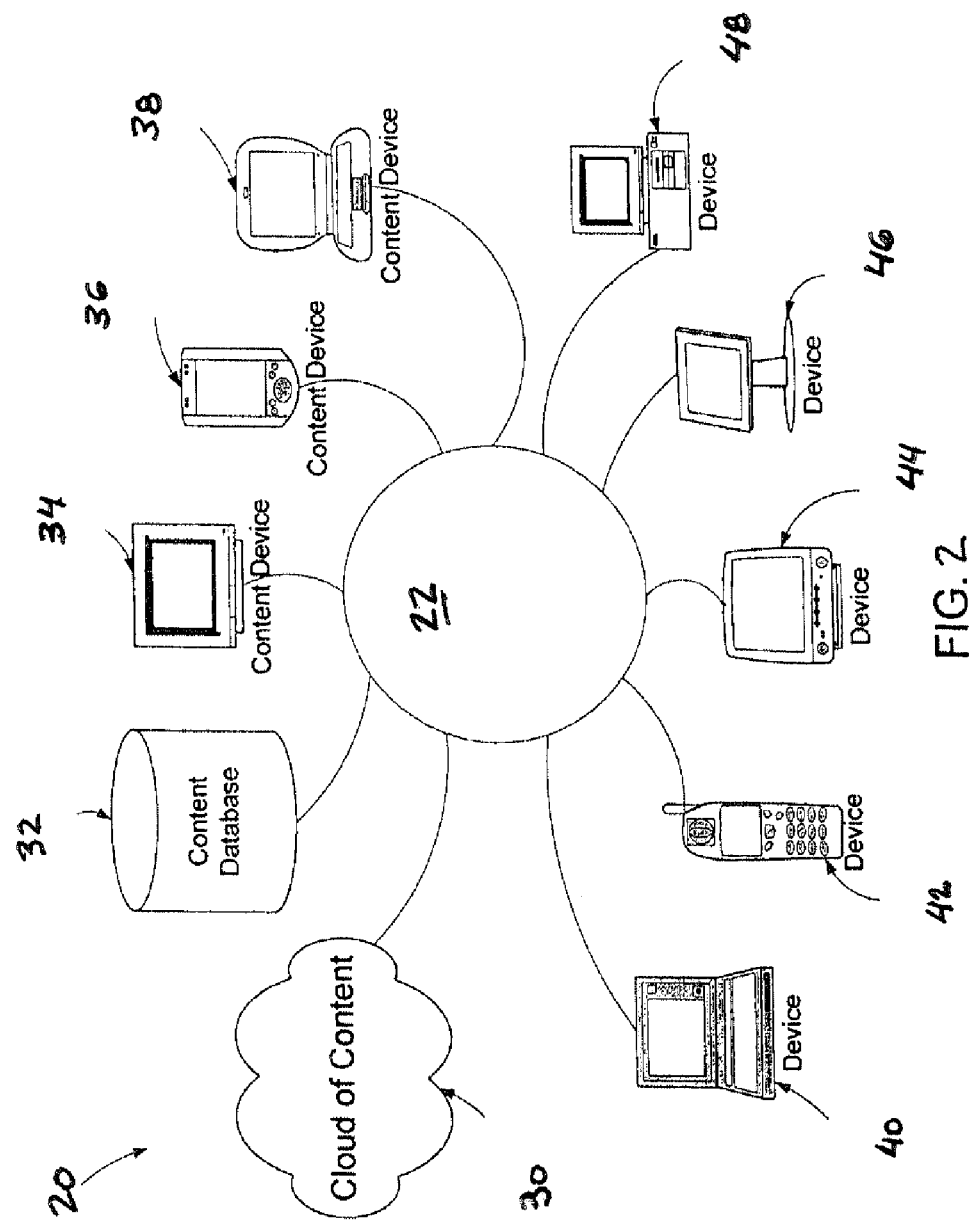
FIG. 2 is another alternate schematic view of a computer network.

With reference to FIG. 2, a network 20 includes the content cloud 30, a content database 32, content devices 34-38, and devices 40-48. The network mediator 22 enables the network devices 32-38 to communicate with each other without pre-configuring each device.

The content cloud 30 represent a content source such as the Internet, where content exists at various locations across the globe. The content includes multimedia content such as audio and video. The mediator 22 allows the content cloud to provide content to devices 40-48.

The content database 32 is a storage device that maintains content. The content database 32 may be a stand-alone device on an external communication network. The mediator 22 communicates with the content database 32 to access and retrieve content.

The content devices 34-38 include intelligent devices, such as, for example, personal computers, laptops, cell phones and personal digital assistants. The content devices 32-38 are capable or storing content information.

The devices 40-48 are intelligent devices that receive content from a content source 30-38. However, the devices 30-38 can also operate as servers to distribute content to other client devices.

Exemplary Client Architecture

Figure 3:
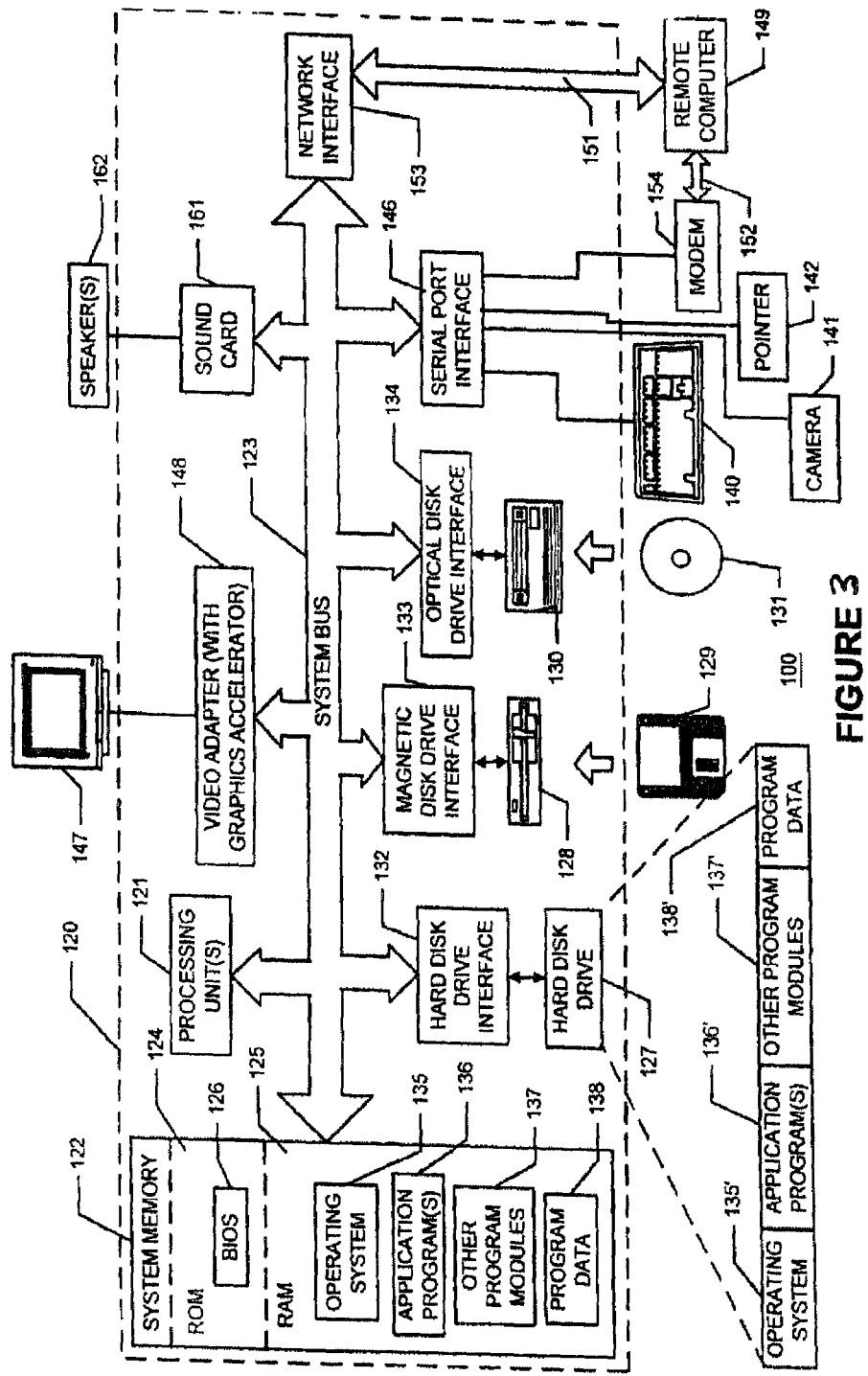
FIG. 3 is a schematic view of a computer system.

FIG. 3 and the following discussion provide a brief, general description of an exemplary apparatus in which at least some aspects of the present invention may be implemented. The present invention will be described in the general context of computer-executable instructions, such as program modules, being executed by a personal computer. However, the methods of the present invention may be effected by other apparatus. Program modules may include routines, programs, objects, components, data structures, applets, WEB 2.0 type of evolved networked centered applications, etc. that perform a task(s) or implement particular abstract data types. Moreover, those skilled in the art will appreciate that at least some aspects of the present invention may be practiced with other configurations, including hand-held devices, multiprocessor systems, microprocessor-based or programmable consumer electronics, network computers, minicomputers, set top boxes, mainframe computers, gaming console and the like. At least some aspects of the present invention may also be practiced in distributed computing environments where tasks are performed by remote processing devices linked through a communications network. In a distributed computing environment, program modules may be located in local and/or remote memory storage devices.

With reference to FIG. 3, an exemplary apparatus 100 for implementing at least some aspects of the present invention includes a general purpose computing device in the form of a conventional personal computer 120. The personal computer 120 may include a processing unit 121, a system memory 122, and a system bus 123 that couples various system components, including the system memory 122, to the processing unit 121. The system bus 123 may be any of several types of bus structures including a memory bus or memory controller, a peripheral bus, and a local bus using any of a variety of bus architectures. The system memory may include read only memory (ROM) 124 and/or random access memory (RAM) 125. A basic input/output system 126 (BIOS), containing basic routines that help to transfer information between elements within the personal computer 120, such as during start-up, may be stored in ROM 124. The personal computer 120 may also include a hard disk drive 127 for reading from and writing to a hard disk, (not shown), a magnetic disk drive 128 for reading from or writing to a (e.g., removable) magnetic disk 129, and an optical disk drive 130 for reading from or writing to a removable (magneto) optical disk 131 such as a compact disk or other (magneto) optical media. The hard disk drive 127, magnetic disk drive 128, and (magneto) optical disk drive 130 may be coupled with the system bus 123 by a hard disk drive interface 132, a magnetic disk drive interface 133, and a (magneto) optical drive interface 134, respectively. The drives and their associated storage media provide nonvolatile (or persistent) storage of machine readable instructions, data structures, program modules and other data for the personal computer 120. Although the exemplary environment described herein employs a hard disk, a removable magnetic disk 129 and a removable optical disk 131, those skilled in the art will appreciate that other types of storage media, such as magnetic cassettes, flash memory cards, digital video disks, Bernoulli cartridges, random access memories (RAMs), read only memories (ROM), and the like, may be used instead of, or in addition to, the storage devices introduced above.

A number of program modules may be stored on the hard disk 127, magnetic disk 129, (magneto) optical disk 131, ROM 124 or RAM 125, such as an operating system 135 (for example, Windows® NT.R™ 4.0, sold by Microsoft® Corporation of Redmond, Wash.), one or more application programs 136, other program modules 137 (such as "Alice", which is a research system developed by the User Interface Group at Carnegie Mellon University available at www.Alice.org, OpenGL from Silicon Graphics Inc. of Mountain View Calif., or Direct 3D from Microsoft Corp. of Bellevue Wash.), and/or program data 138 for example.

A user may enter commands and information into the personal computer 120 through input devices, such as a keyboard 140, a camera 141 and pointing device 142 for example. Other input devices (not shown) such as a microphone, joystick, game pad, satellite dish, scanner, a touch sensitive screen, accelerometers adapted to sense movements of the user or movements of a device, or the like may also be included. These and other input devices are often connected to the processing unit 121 through a serial port interface 146 coupled to the system bus. However, input devices may be connected by other interfaces, such as a parallel port, a game port, blue tooth connection or a universal serial bus (USB). For example, since the bandwidth of the camera 141 may be too great for the serial port, the video camera 141 may be coupled with the system bus 123 via a video capture card (not shown). The video monitor 147 or other type of display device may also be connected to the system bus 123 via an interface, such as a video adapter 148 for example. The video adapter 148 may include a graphics accelerator. One or more speaker 162 may be connected to the system bus 123 via a sound card 161 (e.g., a wave table synthesizer such as product number AWE64 Gold Card from Creative® Labs of Milpitas, Calif.). In addition to the monitor 147 and speaker(s) 162, the personal computer 120 may include other peripheral output devices (not shown), such as a printer for example. As an alternative or an addition to the video monitor 147, a stereo video output device, such as a head mounted display or LCD shutter glasses for example, could be used.

The personal computer 120 may operate in a networked environment which defines logical connections to one or more remote computers, such as a remote computer 149. The remote computer 149 may be another personal computer, a server, a router, a network PC, a peer device or other common network node, and may include many or all of the elements described above relative to the personal computer 120, although only a memory storage device has been illustrated in FIG. 1. The logical connections depicted in FIG. 2 include a local area network (LAN) 14 and a wide area network (WAN) 152, an intranet and the Internet.

When used in a LAN, the personal computer 120 may be connected to the LAN 14 through a network interface adapter (or "NIC") 153. When used in a WAN, such as the Internet, the personal computer 120 may include a modem 154 or other means for establishing communications over the wide area network 152 (e.g. Wi-Fi, WinMax). The modem 154, which may be internal or external, may be connected to the system bus 123 via the serial port interface 146. In a networked environment, at least some of the program modules depicted relative to the personal computer 120 may be stored in the remote memory storage device. The network connections shown are exemplary and other means of establishing a communications link between the computers may be used.

The Interface

An interface program providing an interface for managing documents is installed on a machine e.g. a computer system. The interface can be programmed using various programming languages e.g. C++, Java or other suitable programming languages. Programming of these languages is well known in the art and is adapted to be readable to provide executable instructions to the hardware system. The interface might run through the operating system and the hardware of the computer system or, alternatively, through a network based system. The interface is adapted to manage documents, computer files, pictures, multimedia content, applications (i.e. computer programs), menu elements and other user-selectable elements in a comprehensive fashion. From now on, and throughout this patent application, we refer to the term "documents" to lighten the text although no rights are declined in respect to other types of content unless otherwise specified.

Documents are stored on a machine readable medium and can be retrieved when needed by the interface program. The documents are disposed in an array layout providing a visually comprehensive display arrangement of the documents. The array can, illustratively, among other possibilities, be based on a selection of attribute(s), tag(s), category(ies), a chronological order, a statistical order or an order representing an increasing file size. Combinations of the above-listed possible choices are possible if desired to reduce the number of documents on the array. The array thus helps the viewer to infer additional meaning from the distribution of the documents.

An array is adapted to accommodate a single type of documents, more than one type of documents or a mix of documents, computer files, multimedia content and user-selectable menu elements. Documents might overlap to squeeze more documents on the space available on a display. Magnification of selected documents on an array can be made to increase the level of details of the selected documents.

Using an array of documents helps to meaningfully and intuitively display a group of documents. An array of documents can be embodied as being a substantially linear distribution of documents adapted to dispose each document to be displayed on a line or on a curved line. The display of the array of documents might be made in accordance with a predetermined order (e.g. chronologically), or not. A linear distribution of documents can sort documents on a timeline. Another illustrative embodiment is a group of juxtaposed linear distribution of documents grouped together to form an array referring to a matrix of documents. A circular array of documents is also considered to be within the scope of the present disclosure.

The display of documents on an array of documents allows to contextually manage documents as a flow or an ongoing suite of documents instead of dealing with each document independently. By getting away from the managing each document independently it becomes possible to efficiently deal with a significantly higher number of documents and still keep the documents in a structured order.

Each array of documents groups documents in accordance with, for example, a selected tag, a category, keywords, or an attribute that is commonly shared among the documents of the array of documents. The term attribute will consistently be used throughout the instant specification to lighten the reading of the text and will include the other commonality described therein unless otherwise specified. The selection of one or more attributes determines which documents will be displayed on the array of documents. If no specific attribute is selected, then, the array of documents displays all documents. That is, all documents on the same array of documents are associated with the selected set of attributes. In addition a timeline can be used to determine the order of the suite of documents on the array of documents. In the case of a matrix of documents, then, one axis of the matrix can represent a timeline while the other axis represents another criterion like, for example, the type of computer files each document relates to.

The attributes of a document can be selected to create another array of documents. The attribute of a document from the newly created array of documents can be selected to create an additional array of documents and so on so forth. The user can "navigate" along the arrays of documents in accordance with their metadata, or categorization, to visualize the documents. Navigation tools are provided with the interface to allow navigation through various arrays of documents, when a plurality of arrays is enabled, and through the documents of a single array of documents.

When only a portion of the array is visible, a play of zoom, pan and navigation along the array allows a viewer to change the document(s) that is(are) displayed on the display. A small display area could display only one document from the array of documents while the remaining documents from the array of documents are not displayed but remain nonetheless at their "virtual" position on the array and ready to be displayed if the array is scrolled to show other documents. In other words, if we consider a mobile platform like a mobile phone having a small display, the small display area might allow to efficiently display only one document at the time. However, the displayed document being part of an array of documents, the other documents on the array of documents remain displayable in accordance with their respective position on the array of documents when the array is scrolled/navigated.

Global Positioning

Figure 4:
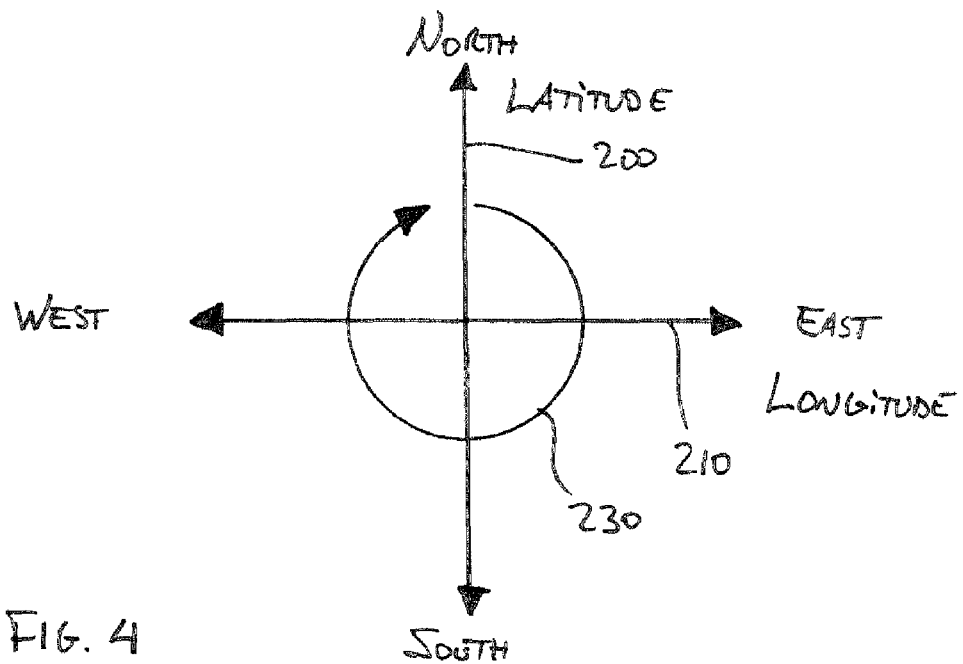
FIG. 4 is a schematic view of geographical coordinates.
Figure 5:
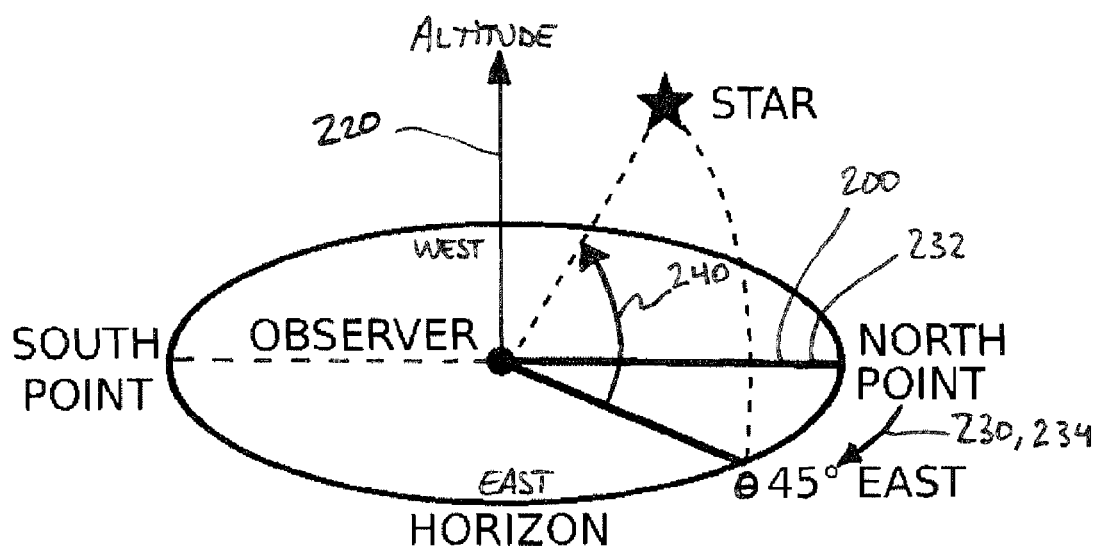
FIG. 5 is a schematic view of coordinates with the azimuth and the declination.

A geographic coordinate system enables every location on the earth to be specified, using mainly a spherical coordinate system. As illustrated on FIGS. 4 and 5, there are three coordinates: latitude 200, longitude 210 and geodesic height (or altitude 220). Latitude 200 (abbreviation: Lat. or ($\phi$) pronounced phi) is the angle from a point on the earth's surface and the equatorial plane, measured from the centre of the sphere. Lines joining points of the same latitude 200 are called parallels, and they trace concentric circles on the surface of the earth, parallel to the equator. The north pole 90° N; the south pole 90° S. The 0° parallel of latitude is designated the equator. The equator is the fundamental plane of all geographic coordinate systems. The equator divides the globe into the Northern and Southern Hemispheres.

Longitude 210 (abbreviation: Long. or ($\lambda$) pronounced lambda) is the angle east or west of north—south line between the two geographical poles, which passes through an arbitrary point. Lines joining points of the same longitude are called meridians. All meridians are halves of great circles, and are not parallel. They converge at the north and south poles.

The line passing through the (former) Royal Observatory, Greenwich (near London in the UK) has been chosen as the international zero-longitude reference line, the Prime Meridian. Places to east are in the eastern hemisphere, and places to the west in the western hemisphere. The antipodal meridian of Greenwich is both 180° W and 180° E. The choice of Greenwich is arbitrary, and in other cultures and times in history other locations have been used as the prime meridian.

By combining these two angles, the horizontal position of any location on Earth can be specified. For example, Baie-Saint-Paul (in the province of Québec, Canada), a well know place for painters and artists, also known for being the cradle of Cirque du Soleil™ that was formerly known as "Les échassiers de Baie-Saint-Paul", has a latitude of 47°26'22.33" North, and a longitude of 70° 29'32.00" West. So, a vector drawn from the center of the earth to a point 47° 26'22.33" North of the equator and 70°29'32.00" of Greenwich will pass through Baie-Saint-Paul. The coordinates provided above are more precise than required and could be less precise and still provide proper positioning.

Azimuth 230 is a mathematical concept defined as the angle, usually measured in degrees (°), between a reference plane 232 and a point. This concept is used in many practical applications including navigation, astronomy, mapping, mining and artillery. The word azimuth is derived from the Arabic 'as-sumūt' which means the ways, referring to the ways or directions a person faces. In navigation, the reference plane is typically true north and is considered 0° azimuth. Moving clockwise 234, a point due east would have an azimuth of 90°, south 180°, and west 270°. Some navigation systems use south as the reference plane. However, any direction can serve as the plane of reference, as long as it is clearly defined for everyone using that system.

If instead of measuring from and along the horizon the angles are measured from and along the celestial equator, the angles are called declination 240 and right ascension (hour angle).

In the horizontal coordinate system, used in celestial navigation and satellite dish installation, azimuth 230 is one of the two coordinates. The other is altitude, sometimes called elevation above the horizon.

In three-dimensional polar coordinate systems, including cylindrical coordinates and spherical coordinates, the azimuth 230 of a point is the angle between the positive x-axis and the projection of the vector onto the xy-plane (the component of the vector in the xy-plane). In cylindrical coordinates, theta θ is almost universally used to represent the azimuth 230 in mathematical applications, whereas physical applications may denote the azimuth 230 using the symbol phi, φ. Although there are several conventions in spherical coordinates, the azimuth 230 is usually denoted by either theta, θ or phi, φ.

Arrays Associated with a Position

What follows is a series of exemplary flow charts illustrating various possible suites of actions that are embodied in the present invention. These flow charts are neither exhaustive nor limitative of the possible variations provided by the present invention. A skilled person in the art of information management, in consideration of the present specification and in light of other related priority documents, might see other alternate suites of actions, other possible variations, like changing the order of the steps that are not described in the shape of flow charts, remain nonetheless within the scope of the present invention.

Figure 6:
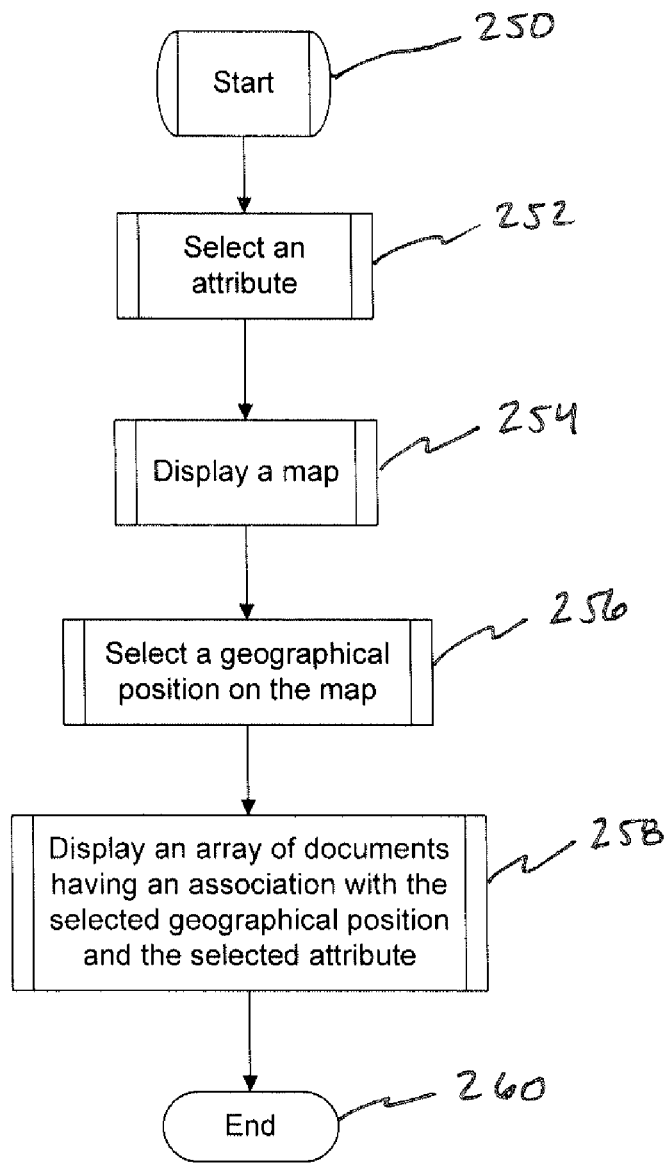
FIG. 6 is a flow chart illustrating various steps adapted to retrieve documents related to a geographical position and displays the retrieved documents on an array of documents.

The process shown on FIG. 6 is a very basic illustrative process. Other variations will be presented in FIG. 7 through FIG. 15.

Turning now to FIG. 6 illustrating an exemplary flow chart of the display of an array of documents based on a geographical position. It is understood that each document has previously been associated with a geographical position. The sequence starts 250 with the selection of an attribute 252. Then, a map is displayed 254 and a position on the map is selected 256. The selected position 256 and the selected attribute 252 are used to determine which documents will be displayed on the array of documents. Finally the array of documents is displayed 258 and the sequence ends 260. In the flow chart displayed on FIG. 6 the selection of the attribute 252 has been placed before the display of a map 254 and the selection of the geographical position on the map 256 and could have been inverted without departing from the scope of the present invention. Alternatively, the display of a map 254 and the selection of the geographical position on the map 256 could have been made before the selection of the attribute 252. These are examples; other ways to order documents on an array of documents will surely become apparent to a skilled reader and still remain within the reach of the present invention.

Figure 7:
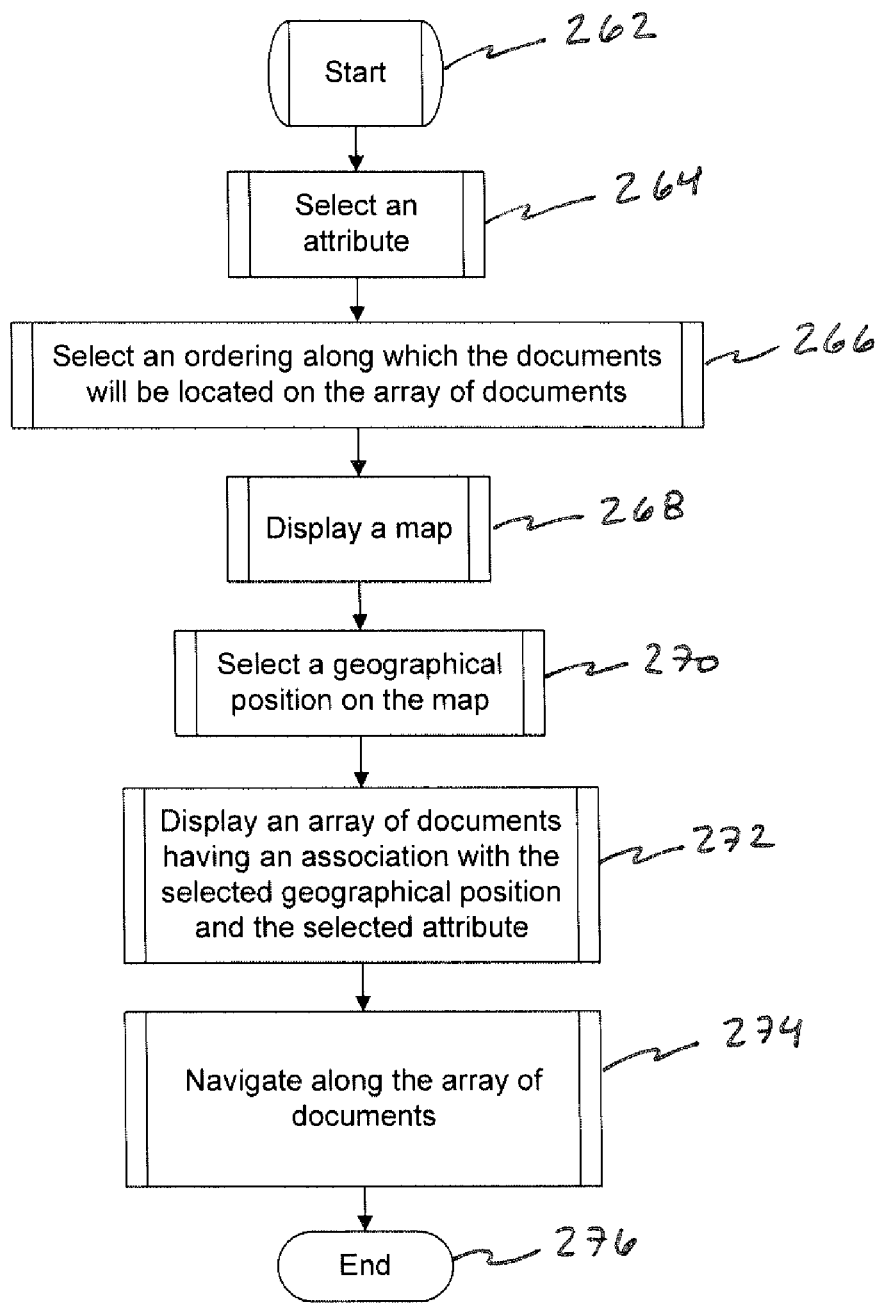
FIG. 7 is an alternate flow chart illustrating various steps adapted to retrieve documents related to a geographical position and displays the retrieved documents on an array of documents.

Referring now to FIG. 7 that illustrates an alternate sequence that begins 262 with the selection of an attribute 264 and is followed by the determination of the ordering along which documents will be disposed on the array of documents 266. The ordering can be in accordance with a chronological order, from the most recently used to the less recently used document, or disposed in alphabetical order. Still on FIG. 7, a map is displayed 268 and a position is selected on the map 270 either by, inter alia, clicking directly on the map, selecting a specific location from a list of location or entering a geographical coordinate. An array of documents having an association with the selected geographical position and the selected attribute is displayed 272. Navigation can be enabled along the suite of documents displayed on the array of documents 274 before the sequence ends 276.

Figure 8:
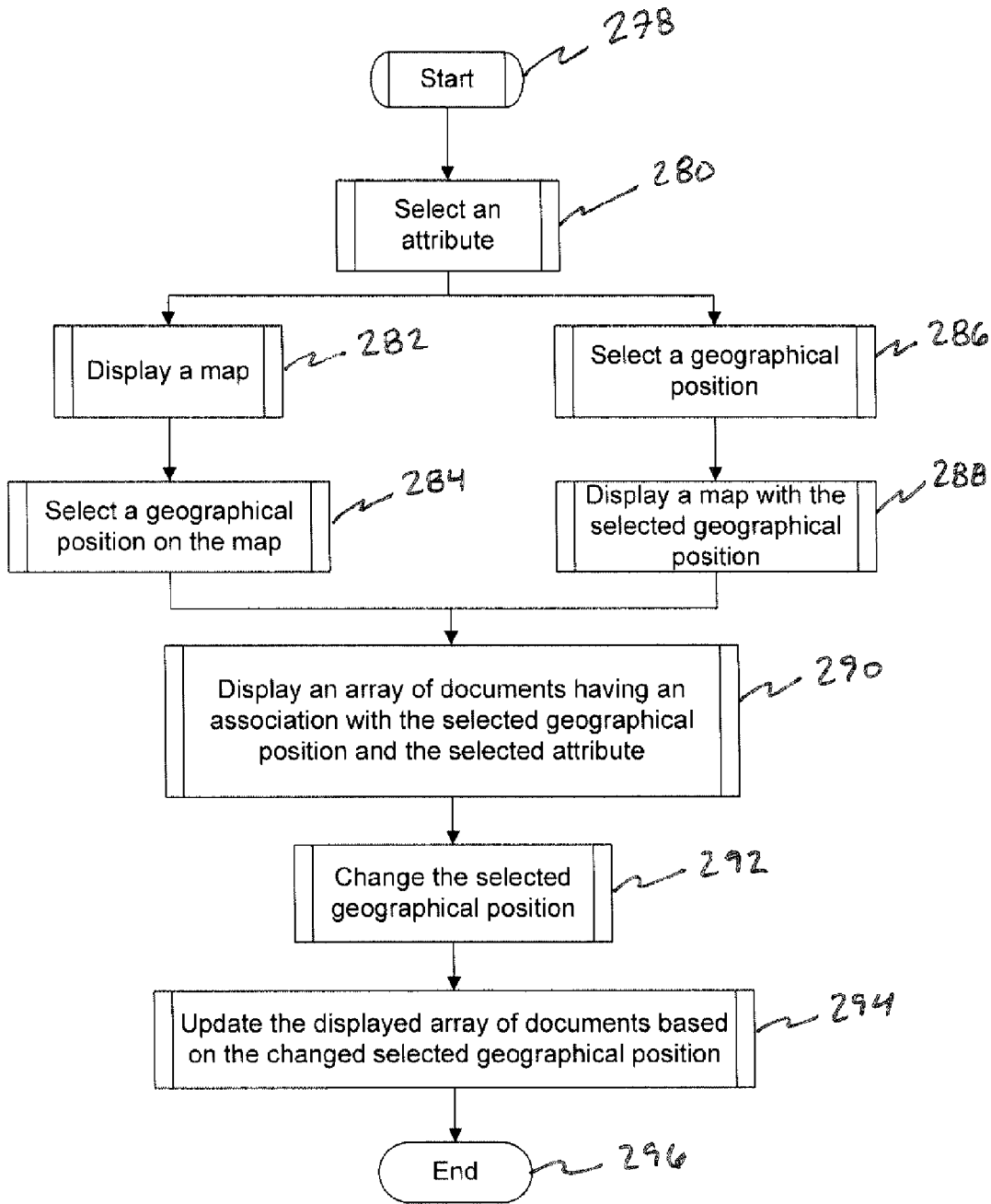
FIG. 8 is an alternate flow chart illustrating various steps adapted to retrieve documents related to a geographical position and displays the retrieved documents on an array of documents.

FIG. 8 illustrates an alternate sequence starting 278 with the selection of an attribute 280 followed by either the display of a map 282 and the selection of a geographical position on the map 284, or, the selection of the geographical position 286 and the display of a map with the selected geographical position 288. An array of documents including documents having an association with the selected geographical position and the selected attribute is displayed 290. Once the array is displayed the geographical position is changed 292 for a different geographical location and the array that is displayed is updated in accordance with the change that was made 294. The array will update the documents displayed thereon in accordance with the new geographical position. And finally the sequence ends 296.

The array is updatable in accordance to a change in a parameter used in the query that determines which document should be displayed on the array. The update of the array can be instantaneous and the new version of the array just replaces the previous version. Alternatively the update of the array can be progressive by using animations showing which documents remain on the array and showing new documents accessing their respective positions on the array such that a viewer could appreciate the changes.

Figure 9:
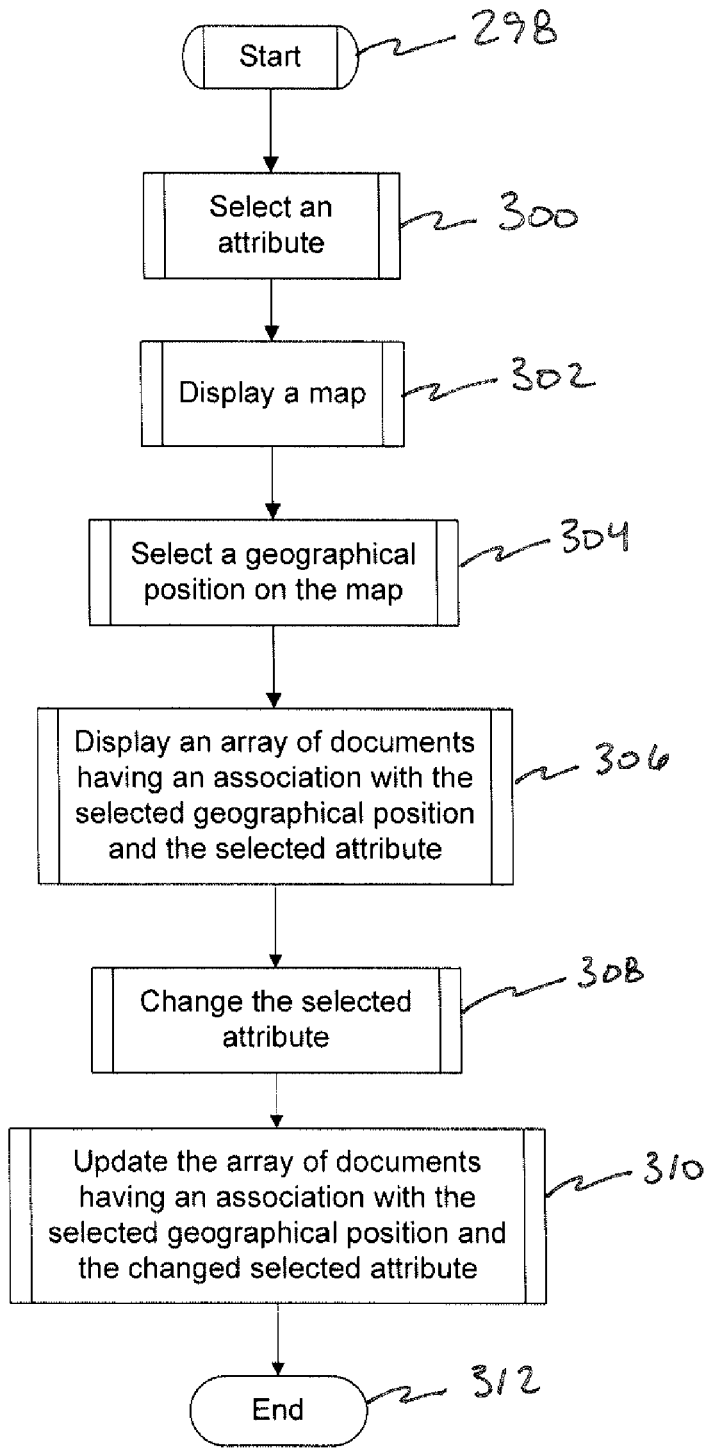
FIG. 9 is an alternate flow chart illustrating various steps adapted to retrieve documents related to a geographical position and displays the retrieved documents on an array of documents.

Another alternate sequence is illustrated on FIG. 9 and starts 298 with the selection of an attribute 300 and the display of a map 302 from which a geographical position can be selected 304 or identified in relation therewith. An array of documents having an association with the selected geographical position and the selected attribute is displayed 306. Subsequently, the selected attribute is changed 308 and the array is updated in accordance with the newly selected attribute 310 to make sure the array presents an accurate group of documents, all associated with the right attribute and the selected geographical position, before the sequence ends.

Figure 10:
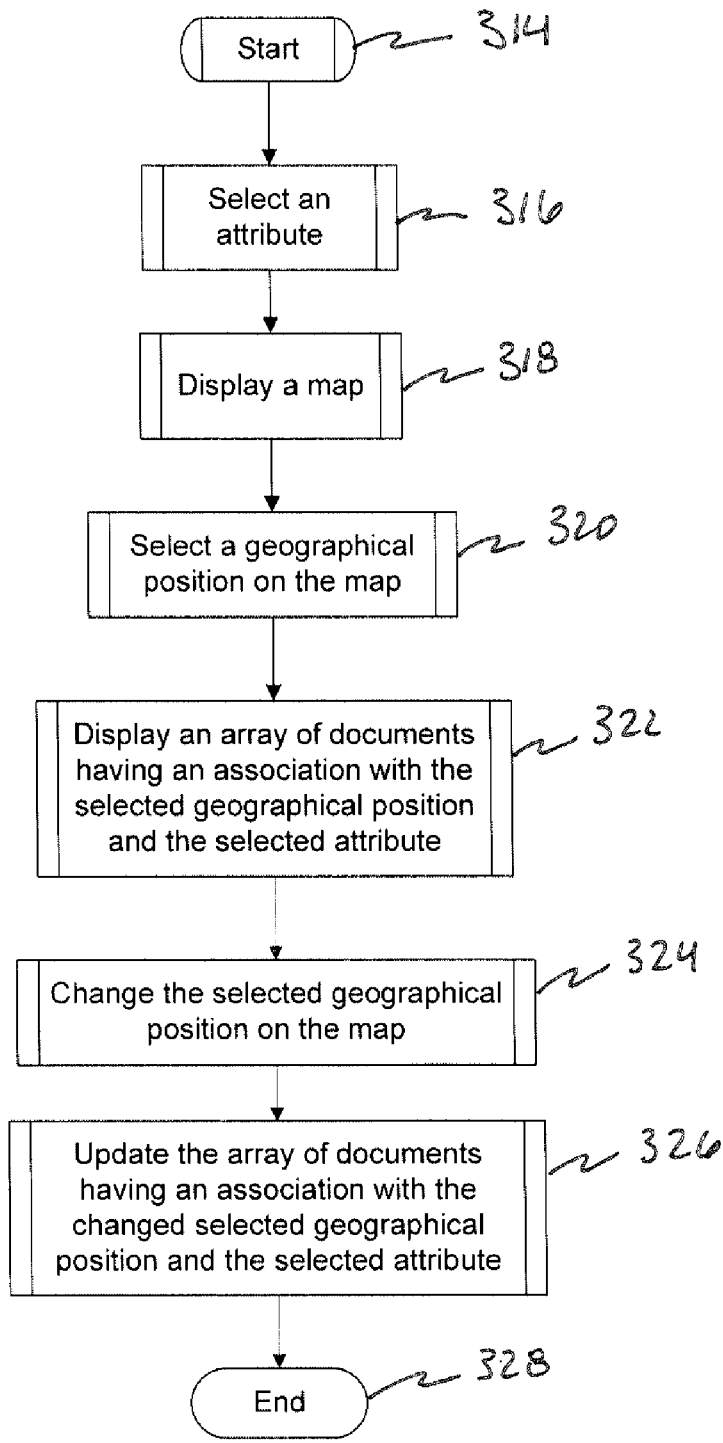
FIG. 10 is an alternate flow chart illustrating various steps adapted to retrieve documents related to a geographical position and displays the retrieved documents on an array of documents.

Turning now to FIG. 10 where is illustrated an alternate sequence beginning 314 with the selection of one or a combination of attributes 316 followed by the display of a map 318 and the selection of a position on the map 320. Based on the selected attribute(s) and the selected position on the map, a group of document is displayed in the shape of an array of documents 322. This time a change in the selected geographical position on the map is performed 324 and subsequently the array of documents is updated in accordance with the change in the selected geographical position so that the documents associated with the array of documents are all relevant to the newly selected geographical position and the selected attribute 326 before the sequence ends 328.

Figure 11:
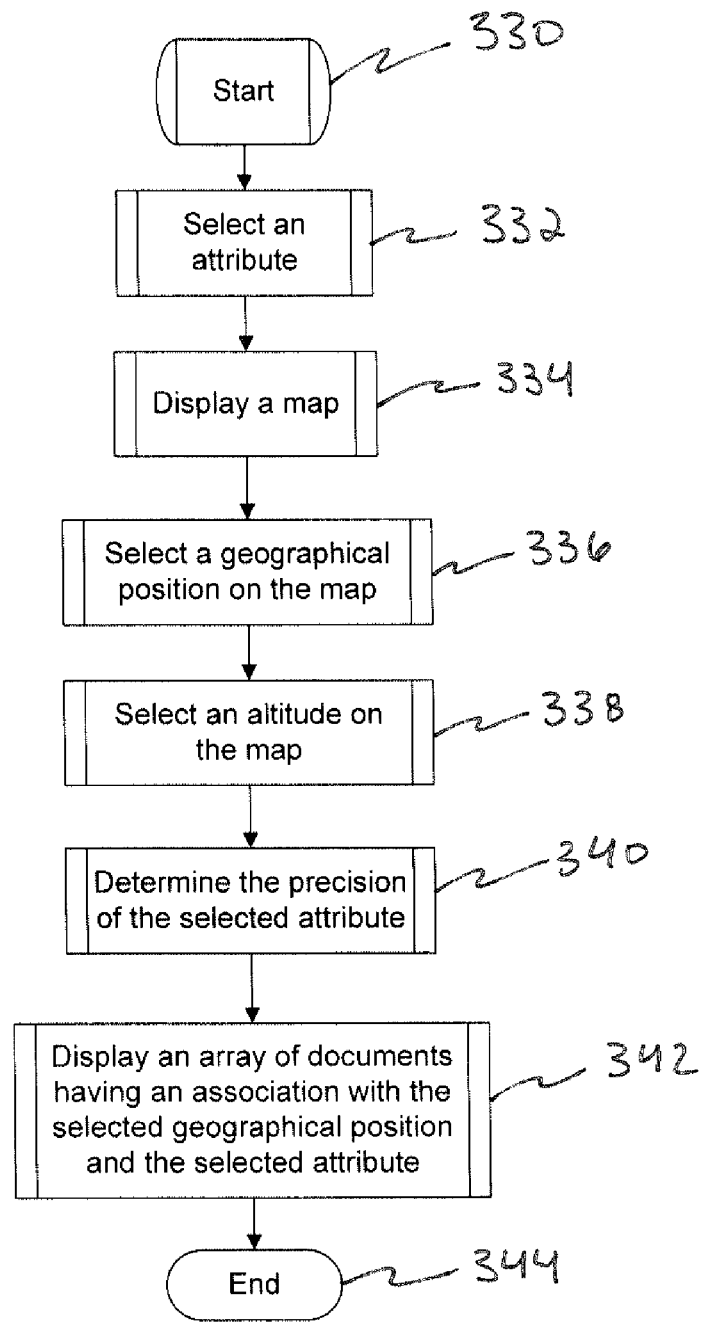
FIG. 11 is an alternate flow chart illustrating various steps adapted to retrieve documents related to a geographical position and displays the retrieved documents on an array of documents.

On FIG. 11 is displayed an alternate sequence starting 330 with the selection of one or a combination of attribute(s) 332 and the display of a map 334 and the selection of a geographical position on the map 334 and the selection of an altitude 338 from which the map is viewed (or the adjustment of the height from which the map is seen to set a desired level of details on the map). Once the altitude is set 338, the precision of the attribute is determined in accordance with the altitude selected 340. In other words the altitude has an influence on the attributes. If the altitude is high the available attributes will, for example, be rather general to correspond with the level of details provided by the set altitude as opposed to precise attributes rendered available when the altitude is low and more details for the map are available to a viewer. In this situation the attribute has already been selected and the level of details of the selected attribute is determined by the altitude, and the sequence ends 344.

Figure 12:
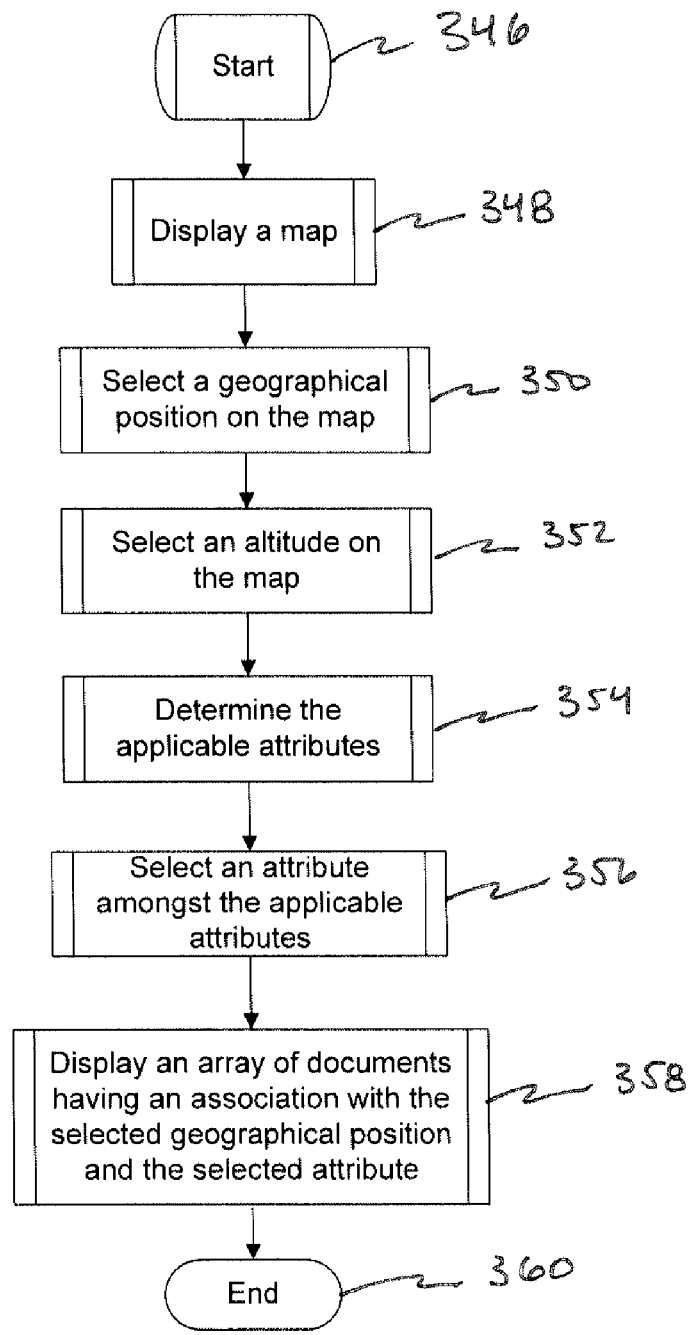
FIG. 12 is an alternate flow chart illustrating various steps adapted to retrieve documents related to a geographical position and displays the retrieved documents on an array of documents.

Another exemplary sequence is illustrated on FIG. 12 and starts 346 with the display of a map 348 and the selection of a position on the map 350. An altitude from which the map is viewed is set 352. The attribute is selected 356 after the altitude has been taken into account to determine which attributes 354 are rendered available to a user. The selection of attributes is decided, at least in part, on the basis of the altitude. The array of documents having an association with the selected geographical position and the selected attribute is displayed 358 before the sequence ends 360. In this sequence the attributes that can be selected by a user have been determined by the altitude prior to the selection of the attributes.

Figure 13:
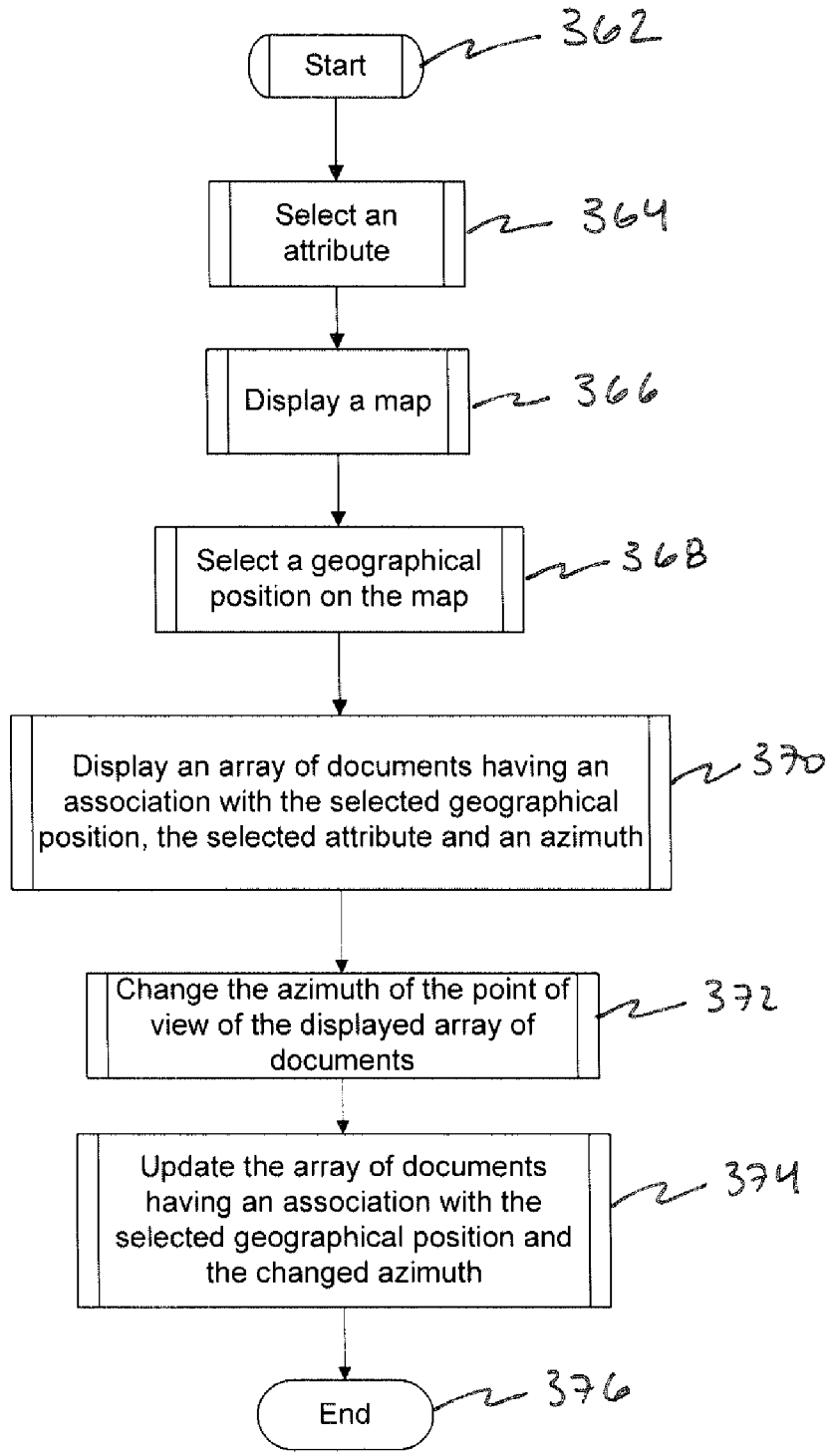
FIG. 13 is an alternate flow chart illustrating various steps adapted to retrieve documents related to a geographical position and displays the retrieved documents on an array of documents.

One additional sequence is illustrated on FIG. 13 and starts 362 with the selection of an attribute 364, the display of a map 366 and the selection of a geographical position on the map 368. An array is displayed showing documents having an association with the selected geographical position. The selected attribute and an azimuth 370 establishes the angle on the map by which the documents displayed on the array will be selected. For instance a direction (as indicated on a compass bearing, or azimuth) will have a significant impact on the point of view from which pictures are taken thus filtering all the pictures taken from/of a geographical position and keeping only the pictures taken with the right azimuth (angle). The azimuth can be changed 372 and the documents displayed on the array are updated in accordance with the new parameters 374 before the sequence ends 376.

Figure 14:
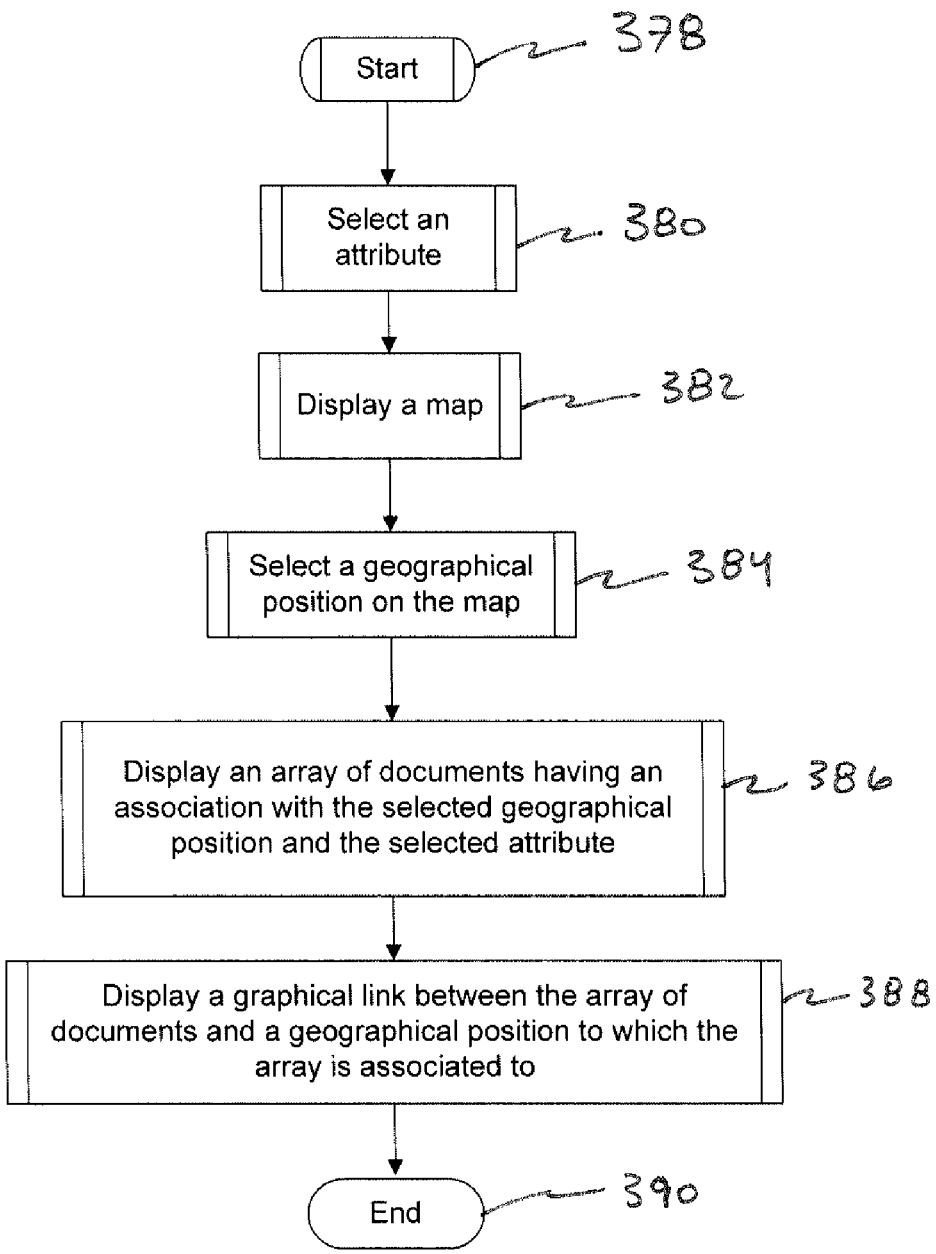
FIG. 14 is an alternate flow chart illustrating various steps adapted to retrieve documents related to a geographical position and displays the retrieved documents on an array of documents.

FIG. 14 illustrates a sequence that starts 378 with the selection of an attribute 380, the display of a map 382 and the selection of a position on the map 384. An array is displayed showing documents related to the selected map position and the selected attribute 386. Additionally, graphical links between the array of documents and a geographical position to which the array is associated to is drawn to emphasis the link between the array and the position 388 on the map before the sequence ends 390. The link between the array and the map is even more useful when there is a plurality of array simultaneously displayed. The link emphasises which array is associated with which position on the map.

Figure 15:
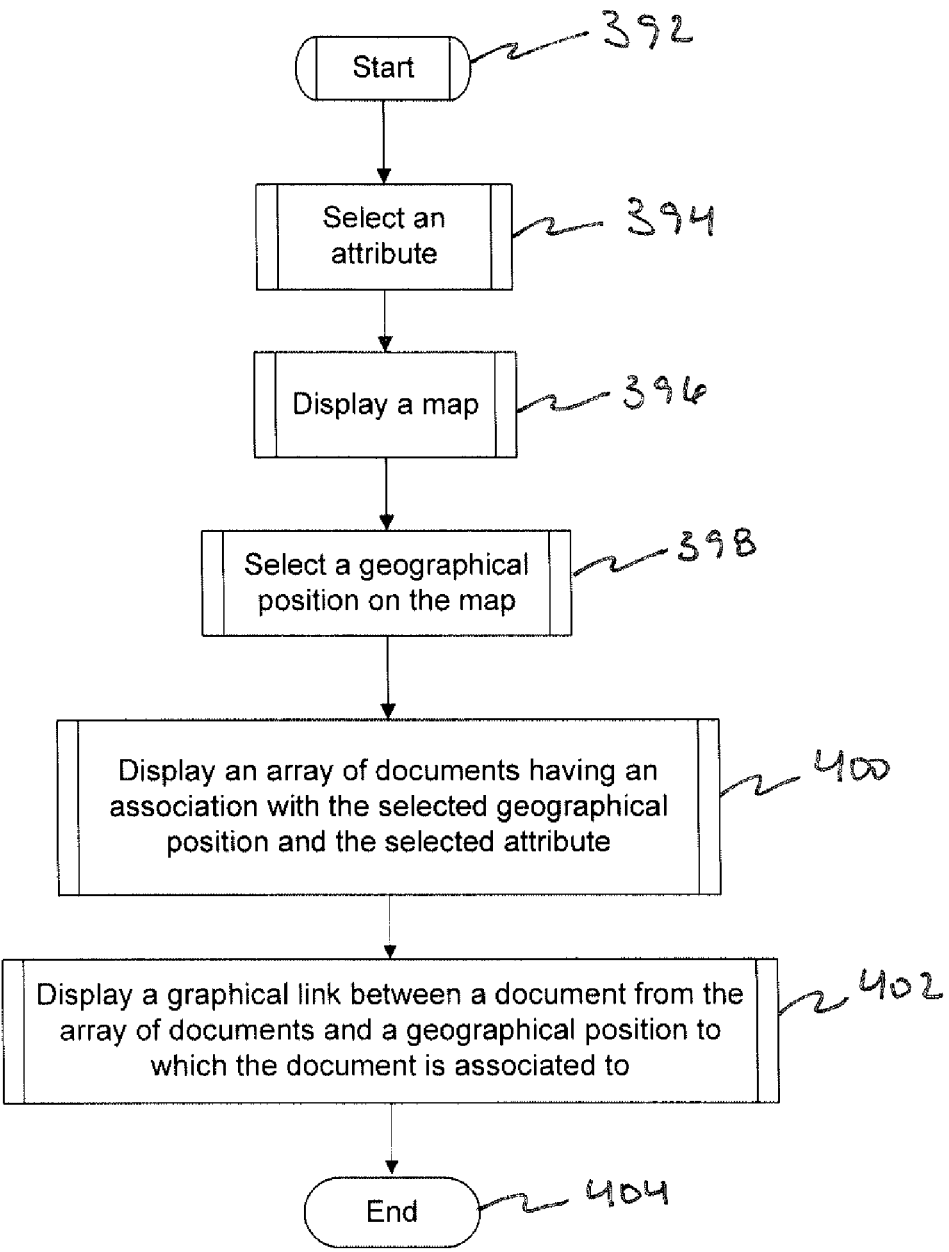
FIG. 15 is an alternate flow chart illustrating various steps adapted to retrieve documents related to a geographical position and displays the retrieved documents on an array of documents.

FIG. 15 illustrates an alternate sequence that starts 392 with the selection of an attribute 394, the display of a map 396 and the selection of a position on the map 398. An array is displayed displaying documents related to the selected position and attribute 400. Additionally, graphical links between documents and geographical position(s) to which the documents are associated to is drawn to emphasis the link between the documents and the position 402 before the sequence ends 404. The link between an array and its related map position/location is even more useful when there is a plurality of array simultaneously displayed.

The foregoing illustrative flow charts of FIG. 6 through FIG. 15 are generally disclosing sequences using a geographical position to retrieve documents that are associated with the selected position/location. In contrast, the array or the documents displayed on an array can be used to retrieve geographical locations. In the latter case, once an array of documents is enabled, a series of links can be generated to show the association between a document (or the array itself) and a geographical position on the map. A separate set of flow charts illustrating the latter case has been omitted to reduce the number of figures but is nonetheless considered, when taken in conjunction with other elements disclosed herein, to remain within the realm of the present invention.

The links between the array and/or the documents can be displayed in accordance with time. Let's use an example to illustrate the relation between documents, time and positions. A person in a bus has sent many e-mails and SMS one after the other on her/his way home. The sequence, in time and in geographical position, can be illustrated by an array including all e-mails and SMS from the person. Links between each document and their related geographical positions can be drawn in sequence to show where each document is originating from (or has been sent from).

Figure 16:
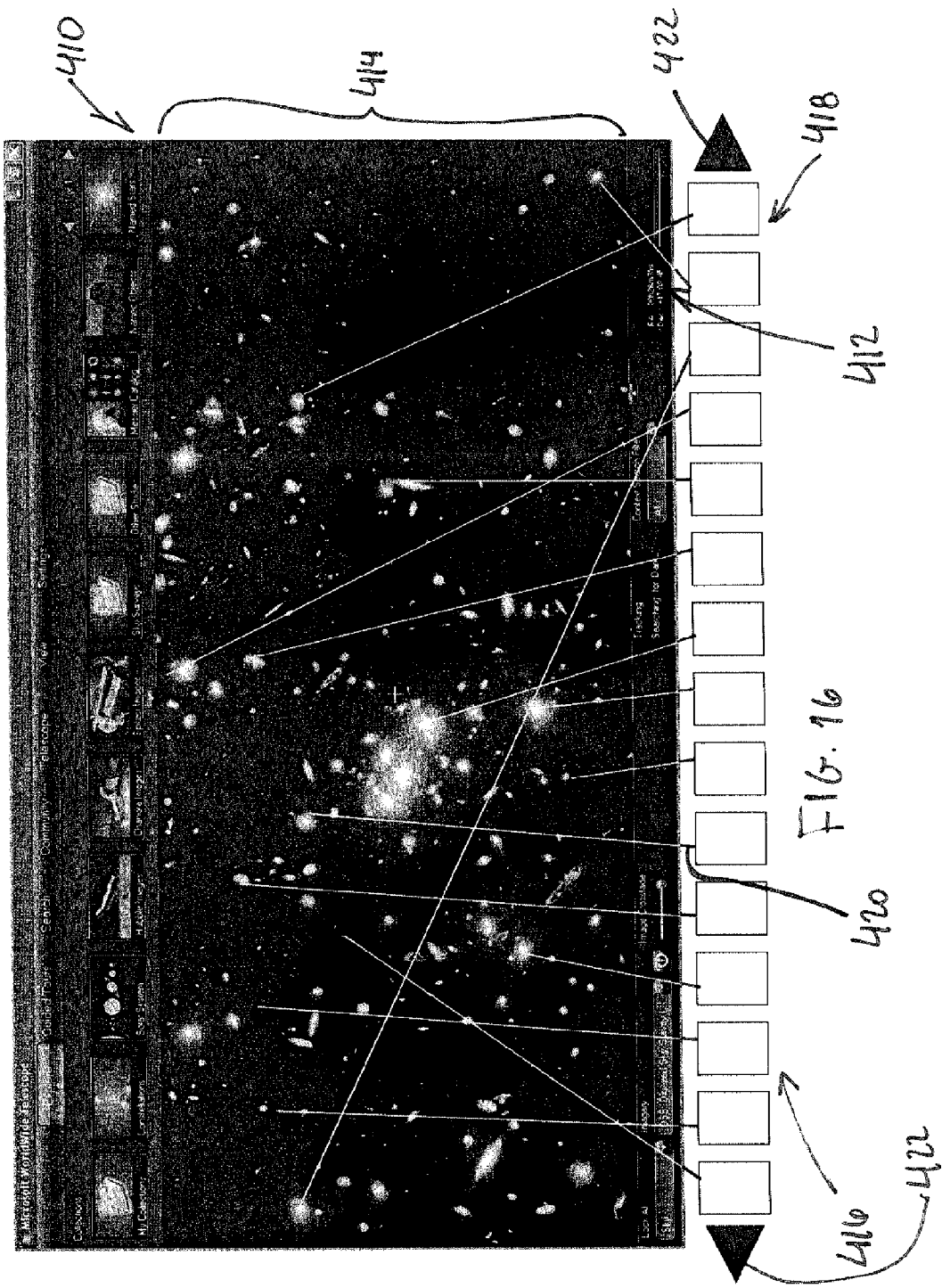
FIG. 16 illustrates an array of documents in association with a celestial map.

The same principles are applicable to a map of the sky 410 as illustrated on FIG. 16. In this case, all geographical positions referred to in this specification would be replaced by celestial positions 412. The appropriate set of coordinates would be used (e.g. RA: 00h26m35s; Dec: +17:09:45; Alt: 02:27:35; Az: 13:57:33). The map of the sky 410 illustrates a portion of the sky 414. Each document 416 on the array of documents 418 are displayed bellow the map 410 but could be superposed to the map 410. Each document 416 is linked with the actual celestial position it relates to using a link 420. The array 418 is provided with arrows 422 on each side of the array 418 to scroll additional documents that are outside the display zone between the arrows 422.

Planet March can be selected on a map of the sky and the attribute "water" can be selected from the available list of attributes. An array of documents is thus produced displaying documents related to water on March. The attribute might illustratively be narrowed by selecting "NASA" and "Report" and "PDF" to get only the reports from the NASA in PDF format on the array.

Figures 17, 18:
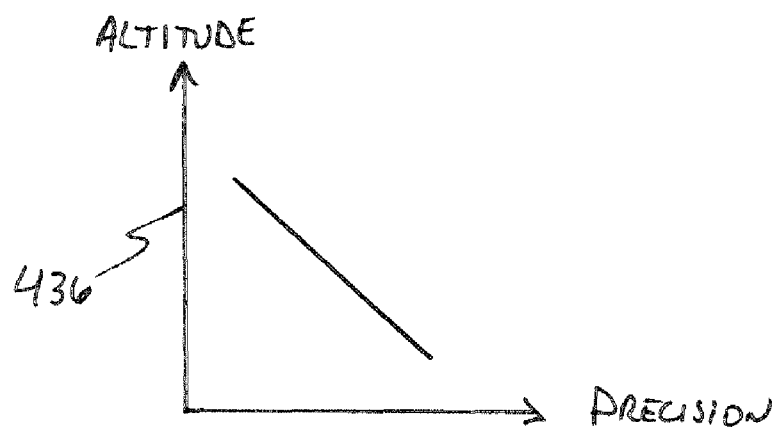
FIG. 17 is a graph of the relation between the altitude and the precision of attributes.
FIG. 18 is an illustrative table of the relation between the altitude and the precision of attributes.

Referring now to FIG. 17 through FIG. 19. FIGS. 17 and 18 show the type of relationship the altitude 436 can have with the precision of the attribute. Similarly, FIG. 19 illustrates, inter alia, a table 430 including a list of attributes 432 classified in columns under their related attribute family 434. In the example of FIG. 19, the family of attribute relates to a series of attributes about geography e.g. continents; countries; provinces; cities; highways and finally, the more detailed attribute "streets". The family of attribute 434 is associated with an altitude 436. All the attributes are not always available to be selected in accordance with the altitude. Depending on the actual altitude from which the map is viewed, only a number of attribute is available. If the altitude is high, the map will be shown from far and only general information will be viewed from the map. The attribute will be available in accordance with the level of altitude and will not offer attributes that are more precise than the actual level of altitude. If would be pointless to offer to select the attribute "street" if the entire planet Earth is displayed and the level of details does not provide any information about "street".

The attributes can be offered to the user in accordance with the level of altitude provided by the map but other attributes might also be accessible if the user precisely knows what is desired. The "by default" displayed attributes can be determined in accordance with the level of zoom but selection of other attributes remains possible. All attributes are not necessarily available in relation with a position on a map if there is no document associated with the attribute for the subject location on the map. Although a wider choice of attributes not necessarily already associated with the position is available when associating attributes with a document.

Figure 20:
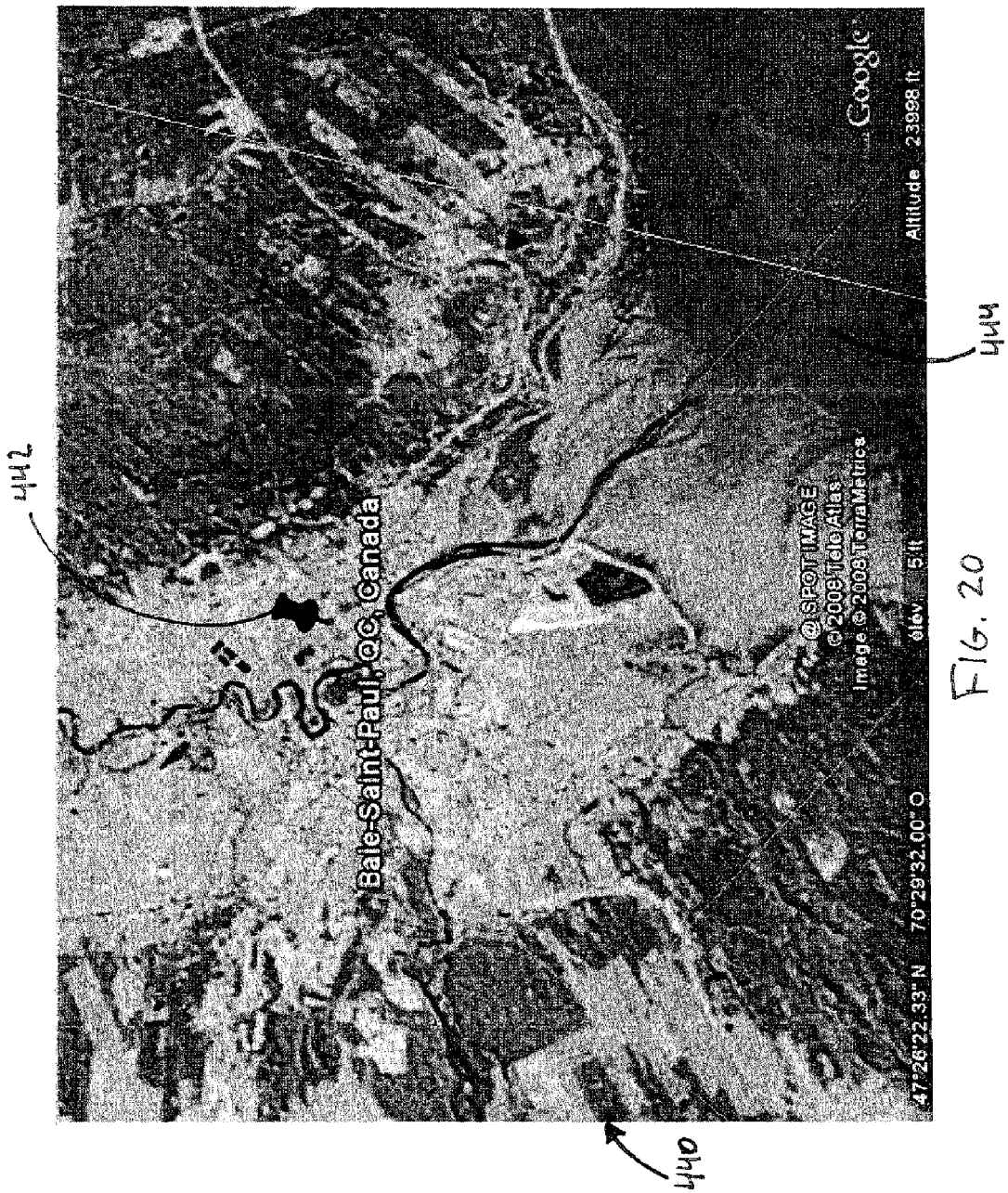
FIG. 20 is an illustrative geographical map of Baie-Saint-Paul, Quebec, Canada.

FIG. 20 is a conventional map 440 provided by a map provider through the internet. The city of Baie-Saint-Paul is pinpointed 442 next to the St-Laurence river 444. The geographical position and the altitude are also provided with the map.

On FIG. 21, an array of documents 450 is illustrated next to a smaller image of the conventional map 440 of Baie-Saint-Paul on FIG. 21. The array of documents 450 disposes documents 452 along a chronological timeline 454. The array of documents 450 is connected to the map 440 with an array link 456 positioning the array 450 on the map 440. Otherwise, each document 458 has its own related document link 460 drawing a link between the document 458 and its related position on the map 440.

Dynamic Position Association

Figure 21:
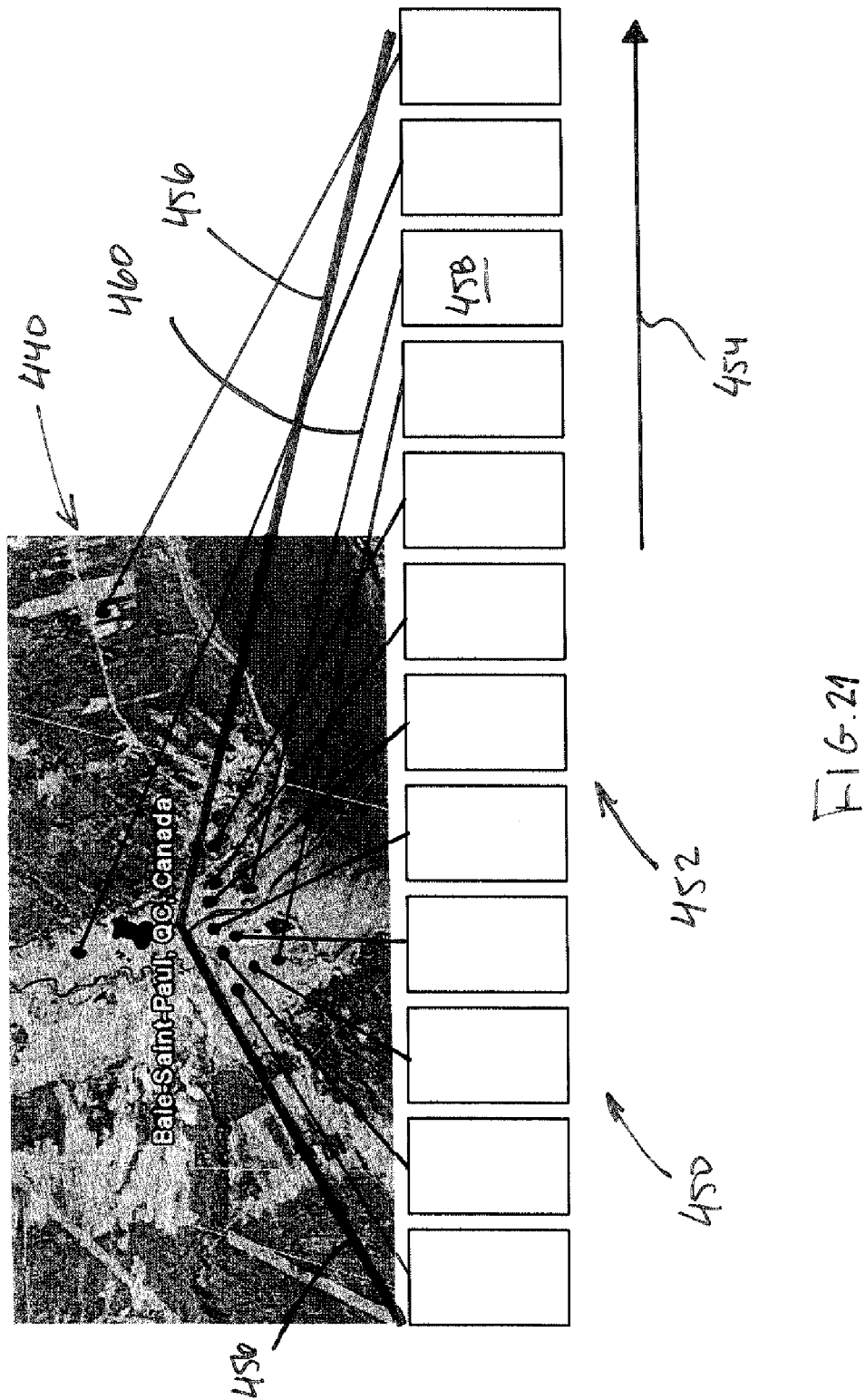
FIG. 21 illustrates an array of documents and its related documents graphically associated with the geographical map of FIG. 20.

Still referring to FIG. 21 the position on the map can move and provides a dynamic array of documents. Lets take an example to illustrate the concept. You are moving in a car in Baie-Saint-Paul looking for a restaurant. You set the position of the moving car as the reference position for the array and select "restaurant" as attribute to determine which documents, in the present example documents are likely to be internet pages, will be displayed on the array of document. At the same time the car moves the next available restaurant appears on the array such that the array of documents dynamically displays the internet pages (or the menu if the attribute "restaurant" and "menu" are selected) of restaurants on the trajectory of the moving car. A heads-up delay can be selected to display the information on the array, lets say one kilometer, before the car reaches the position of the restaurant. If the car changes direction, then, the documents on the array are adjusted consequently; the latest displayed can remain on the array while the queued of restaurants to come next will be modified in accordance with the new trajectory. The same principle is applicable from a desktop computer by dragging or pinpointing various positions on the map and obtaining a dynamically updated array of documents.

Figure 22:
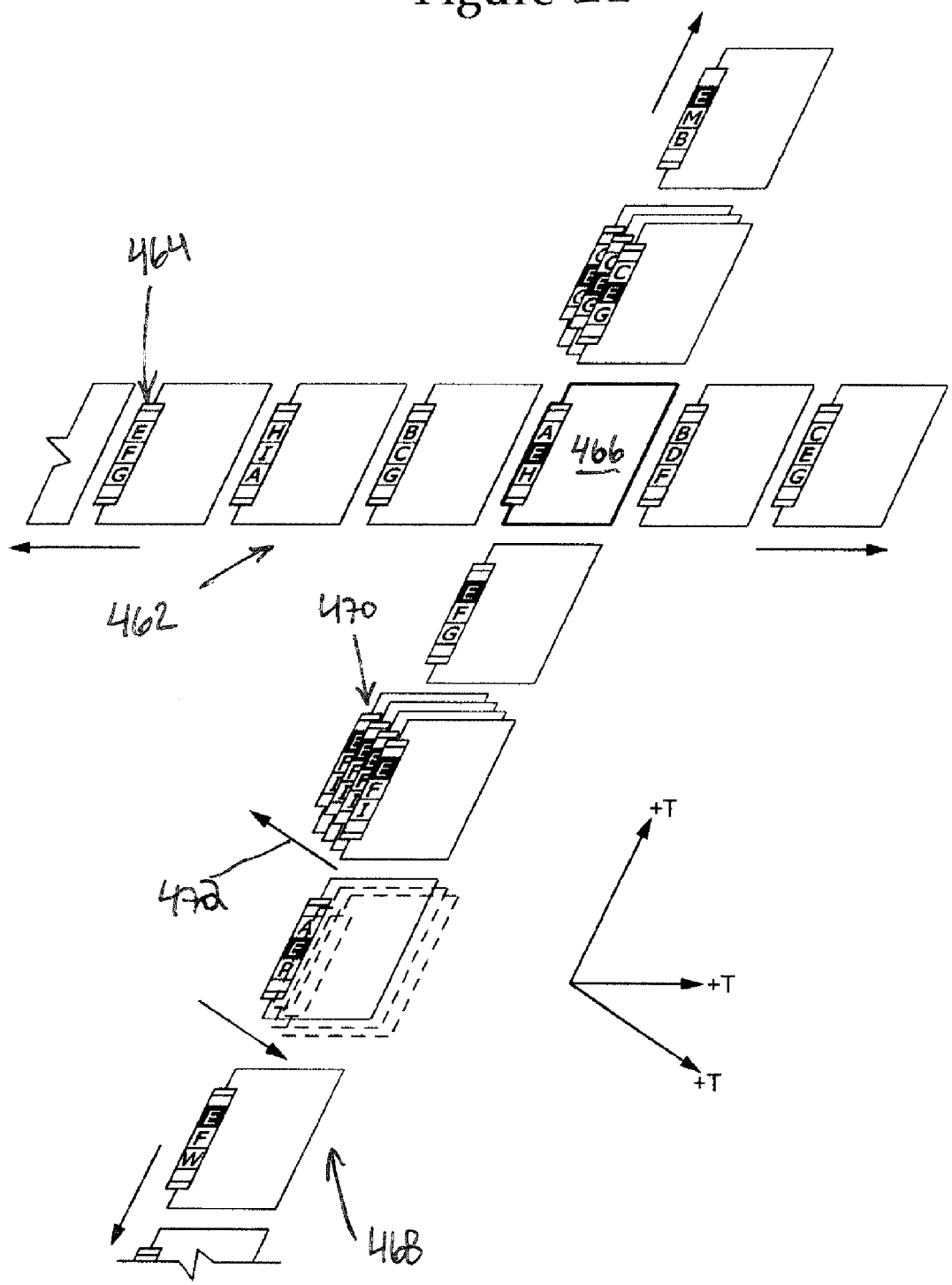
FIG. 22 is an illustration of two intersecting arrays of documents falling from the selection of attribute "E"

FIG. 22 shows a first array of documents 462 where every document is illustrated with a set of attributes 464 (represented by capital letters) respectively associated therewith. The intersecting document 466 has the attribute "E" associated therewith. A selection of the attribute "E" from document 466 is used in the displaying of a second intersecting array of documents 468. It can be appreciated that all documents part of array 468 have the attribute "E" in common (as indicated on a dark background). The intersecting array 468 also shows versions 470 of a document disposed in an exemplary array using a chronological order 472. Each array of documents 462, 468 can be navigated along.

The documents of FIG. 22 have their respective associated attributes graphically associated therewith. Each attribute is selectable by a user to build a query for determining which documents will be part of the other array used to present the results from the query. The attributes could also be shown in a table or a menu disposed next to, in the neighbourhood of, on in graphical connection with their related documents and be presented in a fashion adapted to be acted upon by a user.

Figure 23:
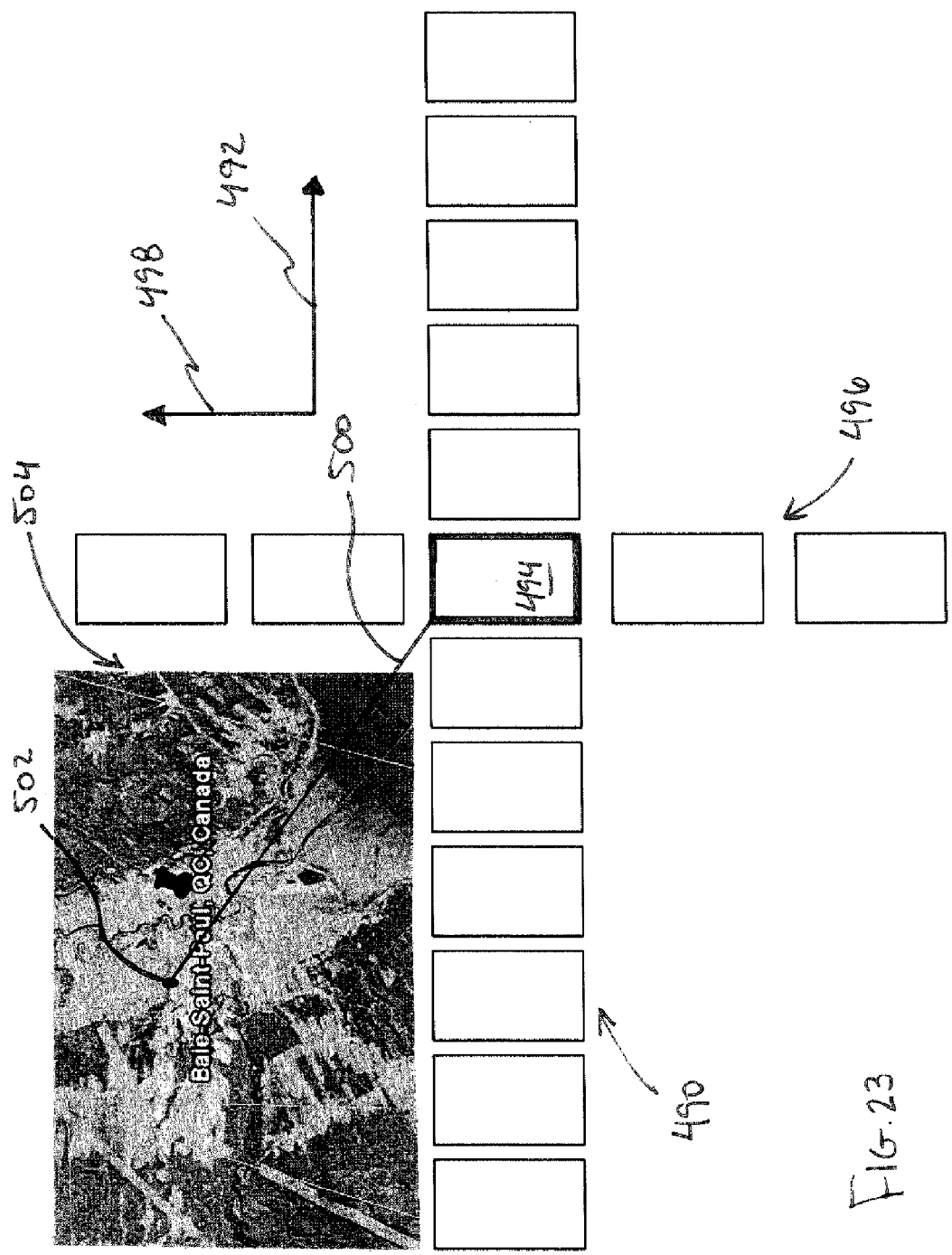
FIG. 23 illustrates two intersecting arrays of documents and a related document graphically associated with the geographical map of FIG. 20.

Focussing on FIG. 23 it is possible to appreciate a first array of documents 490 where documents are disposed in accordance with an ordering represented by arrow 492. One document 494 from the first array of documents 490 is an intersecting location for a second intersecting array of documents 496 where documents are disposed in accordance with an ordering represented by arrow 498. The intersecting document 494 is the only document from which is drawn a link 500 to an associated geographical position 502 illustrated on a map 504 of suburban Baie-Saint-Paul.

Figure 24:
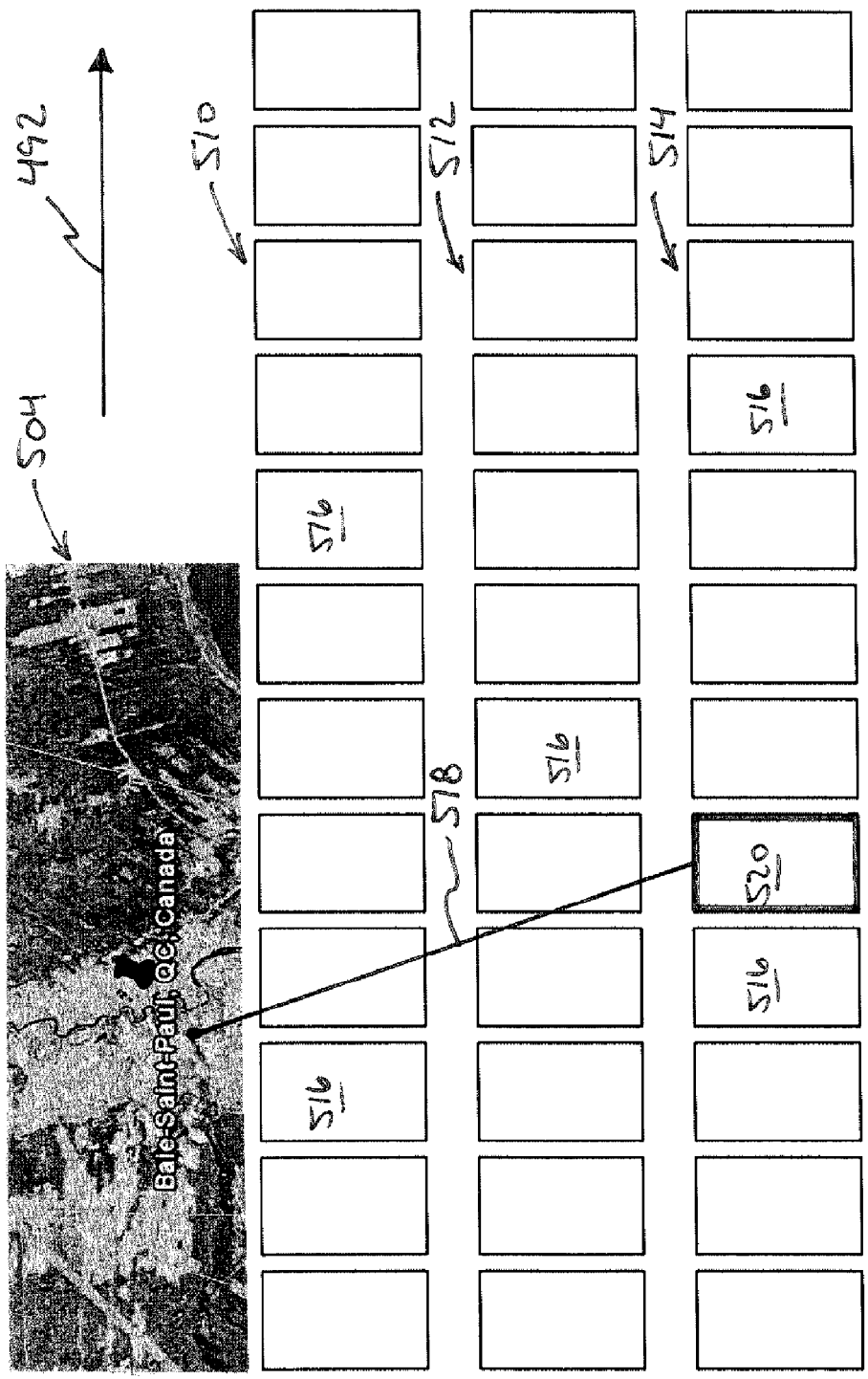
FIG. 24 illustrates an alternate array of documents and a related document graphically associated with the geographical map of FIG. 20.

Turning now to FIG. 24 illustrating the same map 504 of suburban Baie-Saint-Paul with a plurality of arrays of documents 510, 512, 514 disposed along an ordering represented by arrow 492. Each one of the arrays of documents 510, 512, 514 are grouping documents 516 in accordance with a specific query. The query might be based, inter alia, upon a selection of an attribute, a combination of attributes or in respect with a geographical position. Each array 510, 512, 514, and/or each documents contained in the arrays 510, 512, 514 could be linked to the map 504 if so is the desire of the viewer. Some or all links could be seen simultaneously. Conversely, only the link 518 associated with a selected document 520 could be displayed to prevent displaying too many links at the same time and thus prevent confusion.

Figure 25:
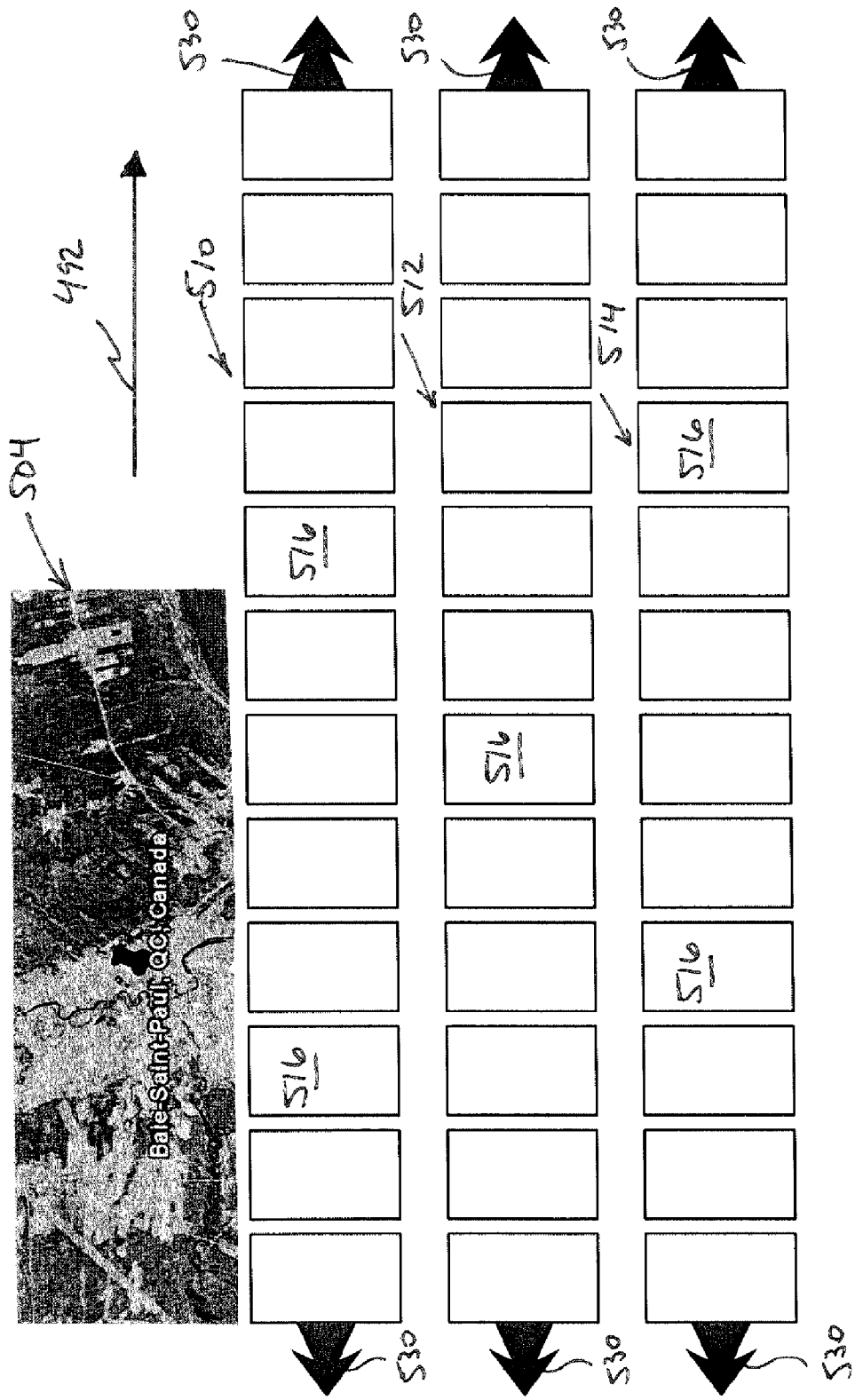
FIG. 25 illustrates the alternate array of documents of FIG. 24 where each row of the array can be individually scrolled or navigated.

FIG. 25 is quite similar to FIG. 24 but it illustrates that each array of documents 510, 512, 514 can be longitudinally displaced independently from one another with their associated navigation arrows 530.

Array of Documents with Past-Present-Future

Referring to FIG. 26, an array of documents 550 includes a series of documents 516 before the present separation mark 554, on the past portion 552 of the array 550. Additional documents on the array of documents, not displayed, are identified by continuing arrows 556, 558, disposed on both sides of the displayed documents 552. A selection of a past navigation arrows 560, 562, will displace the displayed documents in the direction of the selected navigation arrow 560, 562 so that other documents 516 become visible.

Five documents 516 or applications 572 are displayed on the present portion 556 of the array 550. The present navigation arrows 568, 570 are not in a selectable state because there is no other document 516, or application 572, that are not already displayed on the present portion 556 of the array of documents. The future portion 576 of the array 550, separated by the future separation mark 574, displays three documents 516, or agenda items 580, having an occurrence in the future. Additional documents 516 or agenda items 580 are available as indicated by continuing arrows 556, 558. Future navigation arrows 582, 584 are available to move along documents and agenda items on the future portion of the array 550.

Turning to FIG. 27, the present separation mark 554 and the future separation mark 574 are moveable to define the space allowed for each portion (i.e. past, present, future) of the array 550. The present portion 566 is now wide enough to accommodate eight documents 516 and/or running applications 572. The width of the past portion 552 and the future portion 576 has been modified accordingly since the width of the exemplary display (in this case the sheet) remains the same. It can also be noted that the most recent documents 516 from the past portion 552 are displayed since the continuing arrow 558 has disappeared and only continuing arrow 556 remains to navigate the other remaining documents. Accordingly, past navigation arrow 560 is active while arrow 562 is not active. The continuing arrows 556 and 558 could also be utilized for navigating the array and navigation arrows 560, 562 could be eliminated.

Referring to FIG. 28, the number of documents 516 and/or applications 572 in the present portion 556 has increased and there is not enough room to display all the documents. Continuing arrows 556, 558 are now displayed thus indicating there is more information available on each side of the present portion 556. Meanwhile, the present navigation arrows 568, 570 are active thus ready to move the information along the present portion 556 of the array 550.

FIGS. 26 through 29 illustrate the display of only one array 550 at the time. FIG. 29 illustrates a case where the distinct arrays 550.1, 550.2 and 550.3 are juxtaposed to each other on the same display. It can be appreciated that the present separation mark 554 and the future separation mark 574 are combined across many arrays.

Figure 30:
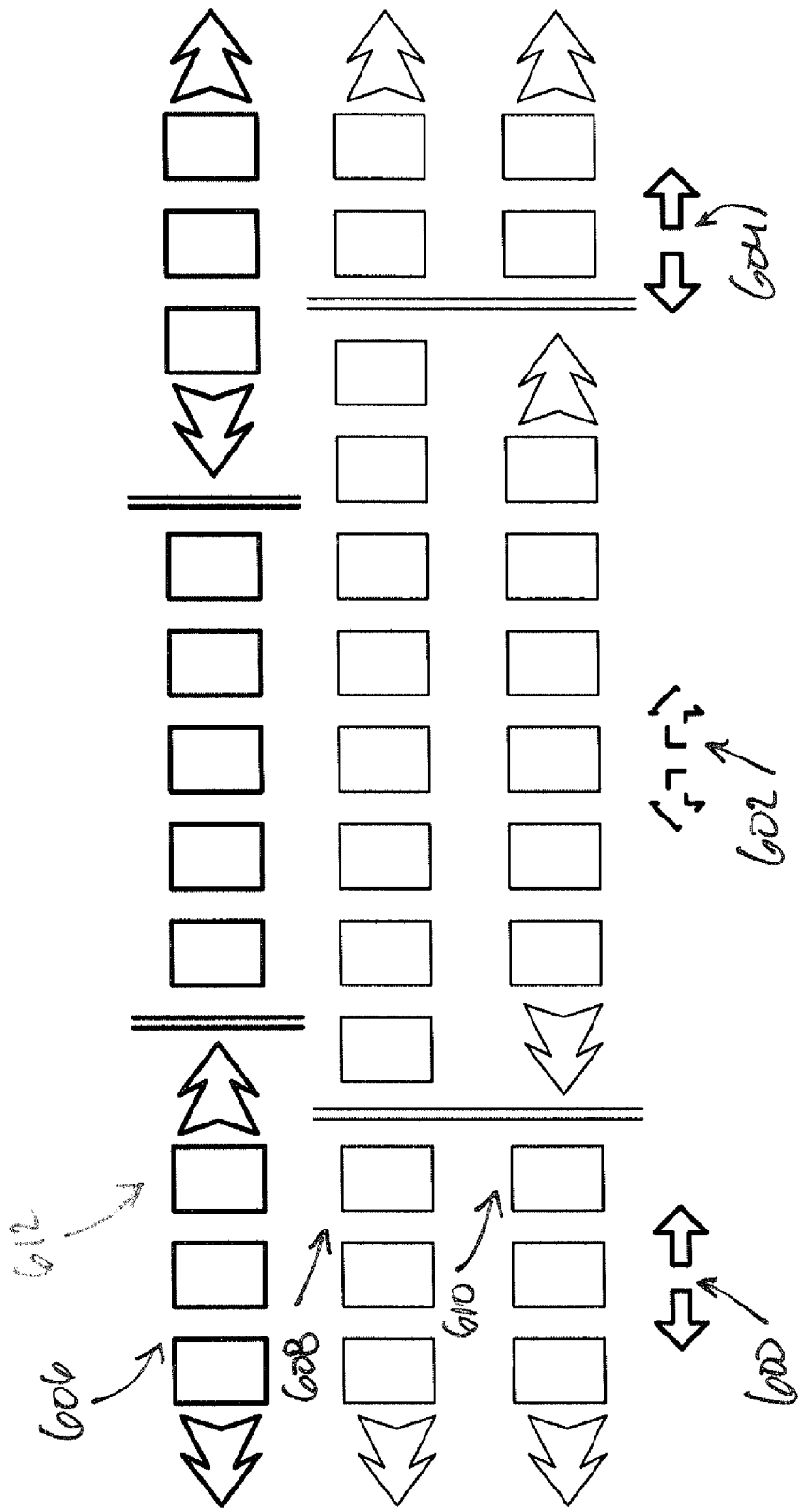
FIG. 30 illustrates a series of arrays of documents including a past portion, a present portion and a future portion, associated with a single set of navigation means.
Figure 3N:
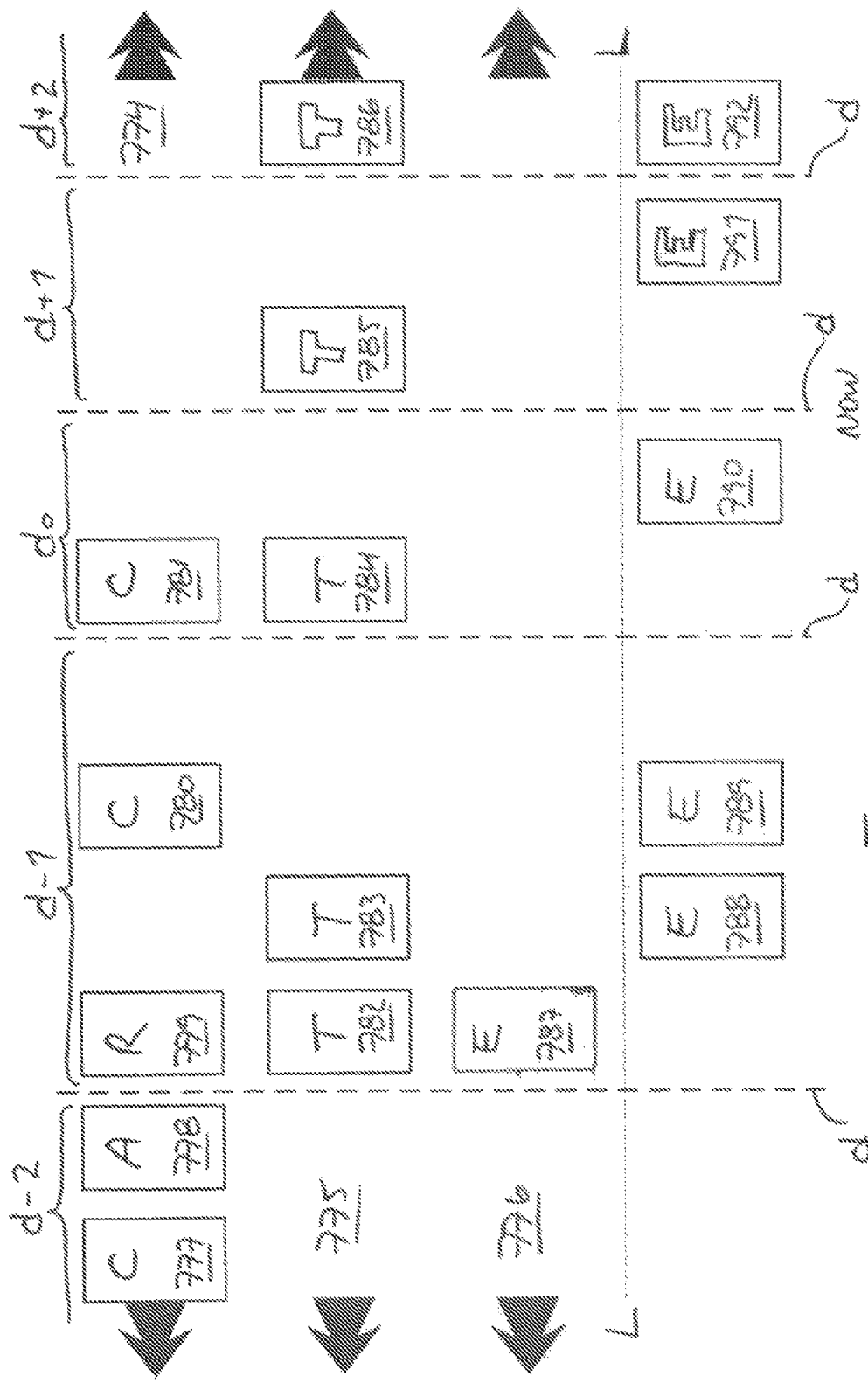

A set of three juxtaposed arrays of documents in FIG. 30 shares a single set of navigation arrows 600, 602, 604. One array 606 is selected and appears in darker lines 612 to visually distinguish the selected array 606 from the other non-selected arrays 608, 610. Navigation arrows 600, 602, 604 will affect the selected array 606 to navigate through the documents disposed on array 606. The other documents on non-selected arrays 602, 604 are not moving with the navigation arrows 600, 602, 604.

Switching now to FIG. 31 that illustrates an array of documents 620 that displays a plurality of documents 622 accompanied by navigation arrows 624, 626, 628 that are adapted to navigate on more than one axis. Array 620 offers documents displayed on a single axis 630. Conversely, array 640 displays a plurality of documents 632 along the first axis 630 and along a non-parallel axis 650. In the present situation, documents disposed along axis 650 are intersecting the documents disposed along axis 630 at document 624. As explained earlier in the description the intersecting document 624 has a commonality with the documents displayed along axis 650. When documents are displayed on more than one axis 630, 650 the navigation arrows 624, 626, 628 are enabled in many directions in accordance with the axes 630, 650.

FIG. 33 illustrates the past portion 680, the present portion 682 and the future portion 684 of an array of documents in accordance with the present invention. As opposed to what has been previously described, the different portions 680, 682, 684 are disposed juxtaposed one to the other. The past portion 680 is the selected portion as illustrated with the darker color 686 and is therefore associated with the navigation arrows 690. The past portion 680 is displaying the most recent documents as indicated by the missing continuing arrow on the right side 692 although other non-displayed documents remains to be seen from the left side as indicated by continuing arrow 694. The present portion 682 displays all the documents/applications 698 as indicated by the omission of continuing arrows 700 on each side. The agenda is quite full though and the future portion 684 is crowded with documents to review 702, people to contact 704, and meetings 706. The focus is presently put on Jul. 21, 2008 (assuming today is before Jul. 21, 2008) defined between two time separators 710. Again, the continuing arrows 712, 714 on each side of the future portion 684 indicate that there are non-displayed information of both sides of the future portion 684.

Still on FIG. 33, on the past portion 680, one document 720 has been selected and magnified in display area 722. Similarly, the present portion 682 has a selected application 726 magnified at display area 728 (notice the landscape orientation of the application 726 tailored to fit the size of a display). Finally, meeting 706 from the future portion 684 is magnified at display area 730.

Project Management

Studies have shown that new ideas are actually build-ups of other elements of information linked together by the human brain. It is also through a similar mechanism that conclusions are reached in a police enquiry for instance. Data that is, at a first glance, irrelevant by itself may prove valuable when put in perspective with other data.

FIG. 34 shows three arrays of information, 740, 742 and 744 that could be from three different sources or from a single source that has been sorted through different sets of attributes. d1, d2, d3 and d4 are days, separated by vertical dotted lines. All three arrays of documents are shown with no variation of spacing due to different length of times between documents. In that context documents 746, 748, 750 show no particular sense. FIG. 35 shows the same documents, with their arrays showing variations in elapsed time between documents. Furthermore, the three arrays are aligned to one another by sharing common vertical dotted lines, thus showing any given day's documents next to the ones from another array. In such a context, the same three documents 746, 748, 750 can more easily be linked together and lead to a "conclusion": 752. This simplified example shows the usefulness of positioning multiple arrays of documents in a manner to promote the establishment of links. Here, the parallel has been made through a common (intrinsic) ordering (time) but other ones could be used.

The influence of actions, events and contacts in knowledge level increase is significant. An important source of information acquisition (through contacts) in the workplace are meetings. Meeting summary (minutes) received after a given meeting can be considered as regular document for instance. On the other hand, a meeting that still hasn't been held cannot be considered as a document in its own right; it is still in the future, thus still "virtual" even though a convocation notice and an agenda may have been received for it. FIG. 36 shows a typical array of documents 754 spanning over four days, d−1, d0, d+1 and d+2, where d0 is the present day. A convocation C 756 and an agenda A 758 have been received on the previous day (d−1) for a meeting to be held three days later (d+2). Because it is in the future, the meeting itself appears as a "ghost" document E 760 ideally showing different visual characteristics not illustrated on FIG. 36) displayed in the future on day d+2. Because one usually wishes to prepare for a given meeting, he or she will assign tasks (or actions) to him or herself in preparation for the event. FIG. 37 shows such a foreseen event E 764 as a "ghost" document with an array of information 762. Two tasks 766, 768 are linked to that event and appear as an automatically generated second array 763. One of the tasks 766, 768 may be completed 766 and shows different visual characteristics for a non-completed task 768. In a similar fashion, and following a similar logic, an event in the past may have different visual characteristics from one that still has to occur. FIG. 38 shows such a situation where three documents from an array of documents 770 are event representations, where document 771 is an event from the day before (d−1) and documents 772 and 773 are yet to happen events, due to take place two days later (d+2).

FIG. 39 shows three arrays of documents 774, 775, 776 in parallel and sharing common day "borders" d. The first array 774 shows all event-related documents: convocations C 777, 780, 781, agenda A 778 and reference material R 779. The second array 775 shows all event-related tasks T where tasks 782, 783, 784 are completed tasks and tasks T 785, 786 are yet to be completed. This second array 775 is actually a linear, time based, representation of a "to do" list. The third array 776 shows, in a fashion similar to FIG. 37, all events E over time, 787, 788, 789, 790, 791, and 792, respectively. Position of event 787 above horizontal line L indicates en event (or a meeting) called for by the user as opposed to events where the user has been invited (788, 789, 790, 791, and 792). In a similar fashion, the second array 775 could also be horizontally split and distinguish self-assigned tasks from tasks requested by someone else. A "due date" could also be considered as a virtual future event.

Dissimilar rules of sorting. To further increase the likelihood of establishing links, a user may chose to generate a second array where the sorting is done through a different attribute. FIG. 40 shows a typical 2 array of documents 793 displaying documents where time T is the sorting attribute for both axes. In such case, the period borders "b" never crosses each other. FIG. 41 shows a 2 arrays of documents 795 where time T is the sorting attribute for the main (horizontal) array while a statistical value S is the sorting attribute for the second array. For instance it may be the number of common attributes with the intersection element 794. In such cases it becomes possible for period borders "b" to cross each other.

Targeting Audiences and Displaying Advertising

The disposition of documents on an array of documents provides a cognitive advantage because it disposes and displays documents in a meaningful way. An array of documents can group a plurality of documents together on the basis of a commonality. The commonality is represented in the present embodiment by an attribute. Thus, the array of documents meaningfully displays a group of documents having at least the same attribute in common. Because an attribute is selected to filter which documents will be part of an array of document it becomes possible to help to better target the advertising to be displayed along with the array of documents. A user who has selected an attribute is more likely to have an interest into advertising directed to this particular attribute. Using the selected characterization attributes is therefore desirable to focus advertisings on a more precise audience.

For example, an advertiser chooses a set of characterization attributes, related to his/her product/service, that are more likely to be selected by users that are potentially good customers for the product/service to be sold. Each time a user selects an attribute the advertising(s) from the advertiser who have pre-selected this attribute are displayed. The advertisings are preferably displayed either among the documents along the array created in accordance with the to the selected attribute by the user or at any other place on a display. The user can click on the advertising and, for example, be directed to the website of the advertiser. The product could also be bought directly by clicking on the advertising.

Advertising made this way takes into consideration the user's interests and behaviors to avoid over exposing or bothering the user with too many misdirected advertisings. The computer tool takes into consideration the time logged in, the number of documents viewed, the speed of navigation on the array, the number of attributes selected, the number of displayed arrays, keywords documents visible on the display, user's preference settings, the day of the week and the time of the day among other helpful data helping to adjust the user's exposure to advertising. The user might also decide what type of advertising he/she wants and how it will be presented. The user can decide to receive numerous adds in exchange of other advantages. The user can also decide not to see any advertising at all.

The advertiser is billed (electronically or not) according to a function including the number of times his/her advertising has been shown. An additional fee is charged to the advertised if the user clicked the advertising. All money transfer can be made electronically illustratively using Paypal™, credit cards or by any other electronic money transfer.

The advertising can be a picture, an image, a movie clip, an animation a selectable means or any other graphical or multimedia file known in the communication industry. The advertising is associated with related attributes. This association will influence when the advertising is displayed and along with which array of documents. Because the advertising is displayed in correlation with attributes selected by viewers it increases the precision of the advertising display by directing the advertising to only viewers who have shown interest into a specific attribute.

Figure 42:
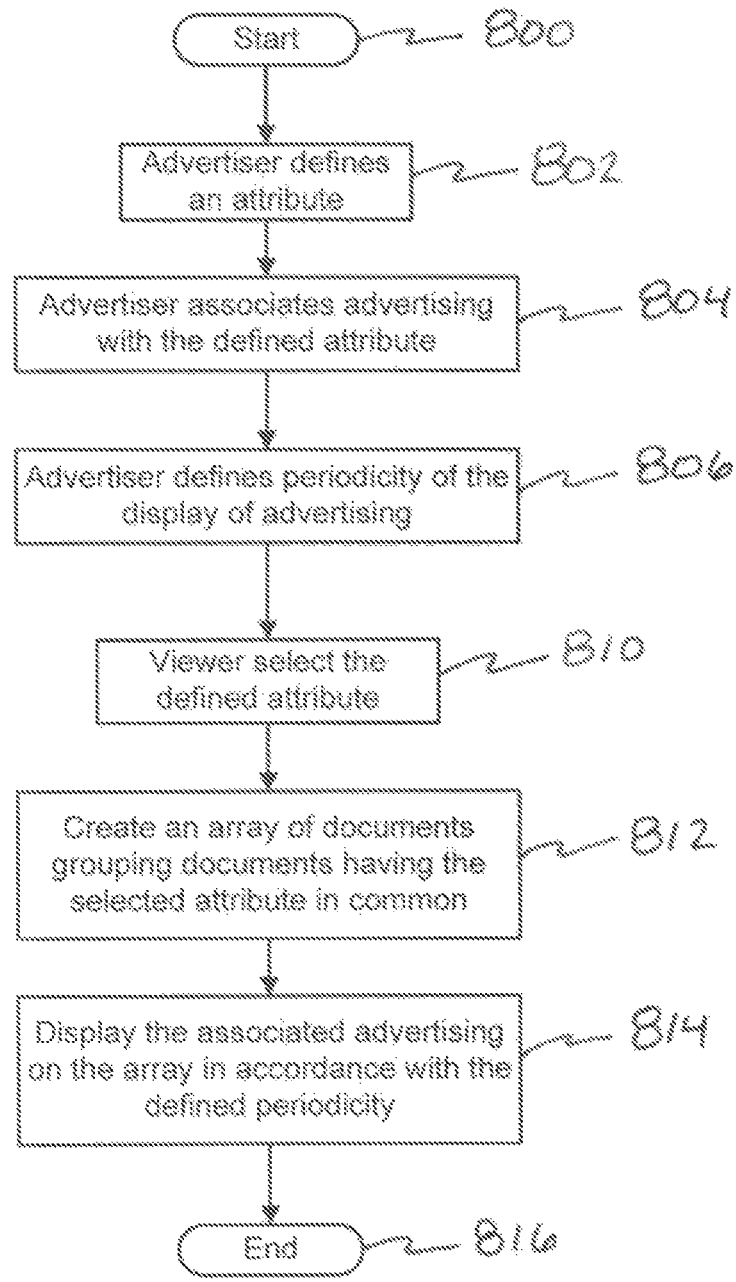
FIG. 42 is a flow chart of advertising associated with attributes and displayed when the attribute is selected in conjunction with an array of documents.

FIG. 42 is an exemplary flow chart that illustrates one possible way to influence the display of advertising in cooperation with an array of documents. The sequence begins 800 with the definition of an attribute 802 if it does not already exists. The advertiser associates the advertising with the defined attribute 804 and optionally decides what periodicity is to be used for the display of the advertising 806. Next, a viewer selects the defined attribute 810—normally among a wider choice of attributes. An array of documents is created 812 to group relevant documents having the selected attribute in common. The array thus created is displayed with the advertising thereon 814 in accordance with the defined periodicity before the sequence ends 816.

An alternate sequence is illustrated on FIG. 43 where the sequence starts 820 with an advertiser that defines an attribute 822 and associates the defined attribute 824 with the advertising 824. A viewer, or a potential client, selects an attribute in a quest for filtering documents of interest 826. If the selected attribute is not the defined attribute 828 then the advertising is not displayed along with the documents 832. Conversely, if the selected attribute is similar to the defined attribute 828 the array is created and groups the documents having the selected attribute in common 830 and the advertising is displayed either next to the array 834 or on the array 836 before the sequence ends 838.

Turning now to FIG. 44, an array of documents 850 is illustrated with a series of documents 852 and an advertising 854 identified with a bold frame 858. Navigation means 856 and means for identifying continuing documents 860 are also depicted on FIG. 36. Alternatively, as illustrated in FIG. 45, another array of documents 880 is illustrated with a series of documents 882 and an advertising 884 disposed along with the array 880. The advertising 884 identified with a bold frame 858 on an area that suits the size of the advertising. Navigation means 856 and means for identifying continuing documents 860 are also depicted on this figure.

The attribute that is defined by the advertiser is correlated with synonyms and groups of other attributes related to the defined attribute. This correlation allows a user to select an attribute that is different than the attribute defined by the advertiser and, if there is correlation between the selected attribute and the defined attribute, to display the advertising.

An alternate illustrative embodiment is depicted on FIG. 46. Four arrays of documents 900, 902, 904, 906 are juxtaposed one next to the other and form a matrix like arrangement. Each array 900, 902, 904, 906 is provided with means for identifying non displayed continuing documents 860. The first array 900 groups documents sharing a commonality and displays repetitive advertisings 920 disposed at an interval of each two documents 908. The advertising 920 has been associated with the attribute representing the commonality and is displayed along with relevant documents. The second array 902 groups documents having the same attribute associated therewith. Advertising 922 has been previously associated with the same attribute and is displayed along with the documents sharing the same attribute on the array 902 grouping documents having the attribute in common. On array 902, a single advertising 922 is shown. The advertising could alternatively be displayed next to the array 902 at display area 928 or be shown both on the array 902 and on the display area 928.

Array 904 illustrates two advertisings 930, 932, from distinct advertisers. The two advertisings 930, 932 are sharing the same attribute as the attribute selected for generating the array 904. The two advertisings 930, 932 are disposed every five documents 912 and repeated in sequence every other five documents. More advertisings can be associated with the selected attribute and a rotation of all the different advertisings would occur every five documents.

Still on FIG. 38, array 906 displays two advertisings 940, 942 located on each side of the array 906. Whether the documents 944 are scrolled left or right with the navigation means 856 they remain in place just like the documents were flowing underneath as illustrated with arrow 946.

Other Potentially Claimable Subject Matter

A system for displaying arrays of user-selectable elements, the system comprising: a geographical position defining module adapted to receive instructions about a geographical position; an array defining module adapted to enable an array of user-selectable element base, at least in part, on the geographical position; and a display module adapted to display a graphical representation of the geographical position and the array of user-selectable elements.

An interface comprising: a map display area adapted to display a map in accordance with a geographical position; and an array display area adapted to display an array of user-selectable elements, the array of user-selectable elements being adapted to group user-selectable elements related to the geographical position.

A method comprising: receiving instructions providing data about a geographical position; and displaying an array of user-selectable elements, the array of user-selectable elements being adapted to group user-selectable elements related to the geographical position.

One or more tangible machine-readable media having encoded machine-executable instructions adapted to provide a method for displaying arrays of user-selectable elements, the method comprising: displaying an array of user-selectable elements, the array of user-selectable elements defining a past portion, a present portion and a future portion.

The one or more tangible machine-readable media having encoded machine-executable instructions adapted to provide the method for displaying arrays of user-selectable elements of a preceding claim, wherein at least some of the user-selectable elements are documents.

The one or more tangible machine-readable media having encoded machine-executable instructions adapted to provide the method for displaying arrays of user-selectable elements of preceding claim, wherein at least some of the user-selectable elements are multimedia assets.

The one or more tangible machine-readable media having encoded machine-executable instructions adapted to provide the method for displaying arrays of user-selectable elements of a preceding claim, wherein at least some of the user-selectable elements are menu items.

The one or more tangible machine-readable media having encoded machine-executable instructions adapted to provide the method for displaying arrays of user-selectable elements of a preceding claim, wherein the array of user-selectable elements is a substantially linear distribution of user-selectable elements.

The one or more tangible machine-readable media having encoded machine-executable instructions adapted to provide the method for displaying arrays of user-selectable elements of a preceding claim, wherein at least one of the portion has an adjustable width.

The one or more tangible machine-readable media having encoded machine-executable instructions adapted to provide the method for displaying arrays of user-selectable elements of a preceding claim, wherein at least one of the portions is provided with a continuity identifier indicating additional user-selectable elements are not visible.

The one or more tangible machine-readable media having encoded machine-executable instructions adapted to provide the method for displaying arrays of user-selectable elements of a preceding claim, wherein scrolling is adapted to be performed in a single portion at the time.

The one or more tangible machine-readable media having encoded machine-executable instructions adapted to provide the method for displaying arrays of user-selectable elements of a preceding claim, wherein at least one of the portions has a navigation tool associated therewith.

The one or more tangible machine-readable media having encoded machine-executable instructions adapted to provide the method for displaying arrays of user-selectable elements of a preceding claim, wherein the portions are adapted to be independently selected to associate a navigation tool therewith.

The one or more tangible machine-readable media having encoded machine-executable instructions adapted to provide the method for displaying arrays of user-selectable elements of a preceding claim, wherein the portions are separated.

The one or more tangible machine-readable media having encoded machine-executable instructions adapted to provide the method for displaying arrays of user-selectable elements of a preceding claim, wherein the array of user-selectable elements is a plurality of arrays of user-selectable elements.

The one or more tangible machine-readable media having encoded machine-executable instructions adapted to provide the method for displaying arrays of user-selectable elements of a preceding claim, wherein the plurality of arrays of user-selectable elements is stackable.

The one or more tangible machine-readable media having encoded machine-executable instructions adapted to provide the method for displaying arrays of user-selectable elements of a preceding claim, wherein each array from the plurality of arrays of user-selectable elements is independently selectable.

The one or more tangible machine-readable media having encoded machine-executable instructions adapted to provide the method for displaying arrays of user-selectable elements of a preceding claim, wherein at least one array of user-selectable elements is displayable at an angle from another array of user-selectable elements.

The one or more tangible machine-readable media having encoded machine-executable instructions adapted to provide the method for displaying arrays of user-selectable elements of a preceding claim, comprising a navigation tool adapted to scroll through user-selectable elements that are displayed at various angles from each other.

The one or more tangible machine-readable media having encoded machine-executable instructions adapted to provide the method for displaying arrays of user-selectable elements of a preceding claim wherein at least two portions are adapted to be superposed one next to the other.

The one or more tangible machine-readable media having encoded machine-executable instructions adapted to provide the method for displaying arrays of user-selectable elements of a preceding claim, wherein user-selectable elements are adapted to be magnified.

A system adapted to provide a method for displaying arrays of user-selectable elements, the system comprising: a display module adapted to display an array of user-selectable elements; a memory module adapted to store data about the array of user-selectable elements; a processing module adapted to enable a method, the method comprising: displaying the array of user-selectable elements, the array of user-selectable elements defining a past portion, a present portion and a future portion.

An interface comprising: a display area adapted to display an array of user-selectable elements defining a past portion, a present portion and a future portion.

A method comprising: displaying an array of user-selectable elements, the array of user-selectable elements defining a past portion, a present portion and a future portion.

One or more tangible machine-readable media having encoded machine-executable instructions adapted to provide a method for displaying arrays of user-selectable elements, the method comprising: associating an advertising with an attribute; receiving instructions about the selection of the attribute; displaying an array of user-selectable elements, the array of user-selectable elements grouping user-selectable element having the attribute in common; and displaying the advertising.

The one or more tangible machine-readable media having encoded machine-executable instructions adapted to provide the method for displaying arrays of user-selectable elements of a preceding claim, wherein at least some of the user-selectable elements are documents.

The one or more tangible machine-readable media having encoded machine-executable instructions adapted to provide the method for displaying arrays of user-selectable elements of a preceding claim, wherein at least some of the user-selectable elements are multimedia assets.

The one or more tangible machine-readable media having encoded machine-executable instructions adapted to provide the method for displaying arrays of user-selectable elements of a preceding claim, wherein at least some of the user-selectable elements are menu items.

The one or more tangible machine-readable media having encoded machine-executable instructions adapted to provide the method for displaying arrays of user-selectable elements of a preceding claim, wherein the array of user-selectable elements is a substantially linear distribution of user-selectable elements.

The one or more tangible machine-readable media having encoded machine-executable instructions adapted to provide the method for displaying arrays of user-selectable elements of a preceding claim, wherein the advertising is disposed next to the array of user-selectable elements.

The one or more tangible machine-readable media having encoded machine-executable instructions adapted to provide the method for displaying arrays of user-selectable elements of a preceding claim, wherein the advertising is disposed on the array of user-selectable elements.

The one or more tangible machine-readable media having encoded machine-executable instructions adapted to provide the method for displaying arrays of user-selectable elements of a preceding claim, wherein the advertising is disposed on the array of user-selectable elements.

The one or more tangible machine-readable media having encoded machine-executable instructions adapted to provide the method for displaying arrays of user-selectable elements of a preceding claim, wherein the advertising is repetitively disposed on the array of user-selectable elements at an interval therebetween.

The one or more tangible machine-readable media having encoded machine-executable instructions adapted to provide the method for displaying arrays of user-selectable elements of a preceding claim, wherein the advertising is a plurality of advertising and are disposed on the array of user-selectable elements at an interval therebetween.

The one or more tangible machine-readable media having encoded machine-executable instructions adapted to provide the method for displaying arrays of user-selectable elements of a preceding claim, wherein the advertising is a plurality of advertising and are disposed on the array of user-selectable elements at an interval therebetween.

The one or more tangible machine-readable media having encoded machine-executable instructions adapted to provide the method for displaying arrays of user-selectable elements of a preceding claim, wherein the advertising is not simultaneously displayed with the array of user-selectable elements.

A system adapted to provide a method for displaying arrays of user-selectable elements, the system comprising: associating an advertising with an attribute; receiving instructions about the selection of the attribute; displaying an array of user-selectable elements, the array of user-selectable elements grouping user-selectable element having the attribute in common; and displaying the advertising.

An interface comprising: a display area adapted to display an array of user-selectable elements and an advertising.

A method comprising: displaying an array of user-selectable elements, the array of user-selectable elements defining a past portion, a present portion and a future portion.

The description and the drawings that are presented above are meant to be illustrative of the present invention. They are not meant to be limiting of the scope of the present invention. Modifications to the embodiments described may be made without departing from the present invention, the scope of which is defined by the following claims:

What is claimed is:

1. A non-transitory computer-readable medium having stored thereon computer-executable instructions that, when executed by a processor of a computer system, provide a method of displaying an array of user-selectable icons including a plurality of time portions thereof, the method comprising:

(a) displaying the array of user-selectable icons, each user-selectable icon having a first attribute related to time and a second attribute associated with a selected commonality among the displayed user-selectable icons, wherein each respective user-selectable icon of the array of user-selectable icons is grouped into one of three different displayed portions of the array based on the first attribute of the respective user-selectable icon, the three different displayed portions comprising (i) a past portion adapted to display one or more user-selectable icons, generally associated with a past term interaction, grouped therein, wherein the first attribute of each such user-selectable icon is associated with a past time relative to a temporal reference point adapted to locate the past portion along a timeline;

(ii) a present portion adjacent to the past portion and adapted to display one or more user-selectable icons, generally associated with a short term interaction, grouped therein, wherein the first attribute of each such user-selectable icon is associated with a present time relative to the temporal reference point adapted to locate the present portion along the timeline; and (iii) a future portion adjacent to the present portion and adapted to display one or more user-selectable icons, generally associated with an expected future interaction, grouped therein, wherein the first attribute of each such user-selectable icon is associated with a future time relative to the temporal reference point adapted to locate the future portion along the timeline;

(b) wherein, when each respective portion of the three portions of the array comprises at least one user-selectable icon, the displaying of the array of user-selectable icons comprises, for each respective portion, (i) displaying one or more user-selectable icons of the respective portion; and (ii) when not all user-selectable icons of the respective portion are being displayed, changing the user-selectable icons of the respective portion that are being displayed in response to user input received via a navigation tool;

(iii) wherein the changing of user-selectable icons displayed in a portion of the array does not change any user-selectable icon displayed in each of the other two portions of the array, (c) wherein the three different displayed portions of the array are disposed in a substantially linear arrangement along a common axis of the timeline.

2. The non-transitory computer-readable medium of claim 1, wherein the changing of the user-selectable icons of a portion that are being displayed is in response to scrolling by a user.

3. The non-transitory computer-readable medium of claim 1, wherein the past portion is distinguished from the present portion along the timeline with a first mark and wherein the present portion is distinguished from the future portion along the timeline with a second mark.

4. The non-transitory computer-readable medium of claim 3, wherein the marks are movable such that the respective areas of display of the three portions are adjustable.

5. The non-transitory computer-readable medium of claim 1, wherein, when each respective portion of the three portions of the array comprises at least one user-selectable icon associated with a document.

6. The non-transitory computer-readable medium of claim 1, wherein, when each respective portion of the three portions of the array comprises at least one user-selectable icon, each respective portion of the three portions of the array comprises an axis along which one or more displayed user-selectable icons are positioned, the three axes being adapted to be shared with another array of user-selectable icons located in spaced parallel relation to each other.

7. The non-transitory computer-readable medium of claim 1, wherein the displaying of the array of user-selectable icons is adapted to collectively display another array of user-selectable icons orthogonally located in respect with the array of user-selectable icons on a basis of a common user-selectable icon.

8. The non-transitory computer-readable medium of claim 1, wherein at least one of the portions is configured to display an identifier for indicating that at least one user-selectable icon into that portion is not being displayed.

9. The non-transitory computer-readable medium of claim 1, wherein the method provided by the computer-executable instructions when executed by the processor of the computer system further comprises (a) displaying a second array of user-selectable icons, each user-selectable icon of the second array having a third attribute related to time and a fourth attribute associated with a selected commonality among the displayed user-selectable icons, wherein each respective user-selectable icon of the second array of user-selectable icons is grouped into one of three different displayed portions of the second array based on the third attribute of the respective user-selectable icon, the three different displayed portions of the second array comprising (i) a past portion adapted to display one or more user-selectable icons, generally associated with a past term interaction, of the second array grouped therein, wherein the third attribute of each such user-selectable icon is associated with a past time relative to a temporal reference point of the second array adapted to locate the past portion along a second timeline;

(ii) a present portion adjacent to the past portion and adapted to display one or more user-selectable icons, generally associated with a short term interaction, of the second array grouped therein, wherein the third attribute of each such user-selectable icon is associated with a present time relative to the temporal reference point of the second array adapted to locate the present portion along the second timeline; and (iii) a future portion adjacent to the present portion and adapted to display one or more user-selectable icons, generally associated with an expected future interaction, of the second array grouped therein, wherein the third attribute of each such user-selectable icon is associated with a future time relative to the temporal reference point of the second array adapted to locate the future portion along the second timeline;

(b) wherein, when each respective portion of the three portions of the second array comprises at least one user-selectable icon, the displaying of the array of user-selectable element comprises, for each respective portion of the second array, (i) displaying one or more user-selectable icons of the respective portion of the second array; and (ii) when not all user-selectable icons of the respective portion of the second array are being displayed, changing in response to user input received via a navigation tool the user-selectable icons of the respective portion of the second array that are being displayed;

(iii) wherein the changing of user-selectable icons displayed in a portion of the second array does not change any user-selectable icon displayed in each of the other two portions of the second array, (c) wherein the three different displayed portions of the array are disposed in a substantially linear arrangement along a common axis of the second timeline.

10. A computerized system configured to display an array of user-selectable icons comprising:

(a) a processing unit configured to execute computer-executable instructions; and (b) a display configured to display, in accordance with the computer-executable instructions when executed by the processing unit, the array of user-selectable icons each having a first attribute related to time and a second attribute associated with a selected commonality among the displayed user-selectable icons;

(c) wherein the computer-executable instructions, when executed by the processing unit, provide a method of displaying the array of user-selectable icons comprising,
  (i) grouping each respective user-selectable icon of the array into one of three different displayed portions of the array based on the first attribute of the respective user-selectable icons, the three different displayed portions comprising
    (A) a past portion adapted to display one or more user-selectable icons, generally associated with a past term interaction, grouped therein, wherein the first attribute of each such user-selectable icon is associated with a past time relative to a temporal reference point adapted to locate the past portion along a timeline;
    (B) a present portion adjacent to the past portion and adapted to display one or more user-selectable icons, generally associated with a short term interaction, grouped therein, wherein the first attribute of each such user-selectable icon is associated with a present time relative to the temporal reference point adapted to locate the present portion along the timeline; and
    (C) a future portion adjacent to the present portion and adapted to display one or more user-selectable icons, generally associated with an expected future interaction, grouped therein, wherein the first attribute of each such user-selectable icon is associated with a future time relative to the temporal reference point adapted to locate the future portion along the timeline;
  (ii) wherein, when each respective portion of the three portions of the array comprises at least one user-selectable icon, the displaying of the array of user-selectable icons further comprises, for each respective portion,
    (A) displaying one or more user-selectable icons of the respective portion; and
    (B) when not all user-selectable icons of the respective portion are being displayed, changing the user-selectable icons of the respective portion that are being displayed in response to user input received via a navigation tool;
    (C) wherein the changing of user-selectable icons displayed in a portion of the array does not change any user-selectable icons displayed in each of the other two portions of the array,
  (iii) wherein the three different displayed portions of the array are disposed in a substantially linear arrangement along a common axis of the timeline.

11. The computerized system of claim 10, wherein the changing of the user-selectable icons of a portion that are being displayed is in response to scrolling by a user.

12. The computerized system of claim 10, wherein the past portion is distinguished from the present portion along the timeline with a first mark and wherein the present portion is distinguished from the future portion along the timeline with a second mark.

13. The computerized system of claim 12, wherein the marks are movable such that the respective areas of display of the three portions are adjustable.

14. The computerized system of claim 10, wherein, when each respective portion of the three portions of the array comprises at least one user-selectable icon associated with a document.

15. The computerized system of claim 10, wherein, when each respective portion of the three portions of the array comprises at least one user-selectable icon, each respective portion of the three portions of the array comprises an axis along which one or more displayed user-selectable icons are positioned, the three axes being adapted to be shared with another array of user-selectable icons located in spaced parallel relation to each other.

16. The computerized system of claim 10, wherein the displaying of the array of user-selectable icons is adapted to collectively display another array of user-selectable icons orthogonally located in respect with the array of user-selectable icons on a basis of a common icon.

17. The computerized system of claim 10, wherein at least one of the portions is configured to display an identifier for indicating that at least one user-selectable icons into that portion is not being displayed.

18. The computerized system of claim 10, wherein the displaying further comprises,
  (a) displaying a second array of user-selectable icons, each user-selectable icon of the second array having a third attribute related to time and a fourth attribute associated with a selected commonality among the displayed user-selectable icons, wherein each respective user-selectable icon of the second array of user-selectable icons is grouped into one of three different displayed portions of the second array based on the third attribute of the respective user-selectable icon, the three different displayed portions of the second array comprising
    (i) a past portion adapted to display one or more user-selectable icon of the second array grouped therein, wherein the third attribute of each such user-selectable icon is associated with a past time relative to a temporal reference point of the second array adapted to locate the past portion along a second timeline;
    (ii) a present portion adjacent to the past portion and adapted to display one or more user-selectable icons, generally associated with a short term interaction, of the second array grouped therein, wherein the third attribute of each such user-selectable icon is associated with a present time relative to the temporal reference point of the second array adapted to locate the present portion along the second timeline; and
    (iii) a future portion adjacent to the present portion and adapted to display one or more user-selectable icons, generally associated with an expected future interaction, of the second array grouped therein, wherein the third attribute of each such user-selectable icon is associated with a future time relative to the temporal reference point of the second array adapted to locate the future portion along the second timeline;
  (b) wherein, when each respective portion of the three portions of the second array comprises at least one user-selectable icon, the displaying of the array of user-selectable icons comprises, for each respective portion of the second array,
    (i) displaying one or more user-selectable icons of the respective portion of the second array; and
    (ii) when not all user-selectable elements of the respective portion of the second array are being displayed, changing in response to user input received via a navigation tool the user-selectable icons of the respective portion of the second array that are being displayed;
    (iii) wherein the changing of user-selectable icons displayed in a portion of the second array does not change any user-selectable icon displayed in each of the other two portions of the second array, (c) wherein the three different displayed portions of the array are disposed in a substantially linear arrangement along a common axis of the second timeline.

19. A method of electronically displaying for view by a user an array of user-selectable icons each having a first attribute related to time and a second attribute associated with a selected commonality among the displayed user-selectable icons, the method comprising:

(a) displaying the array of user-selectable icons on an electronic display, including grouping each respective user-selectable icon of the array of user-selectable icons into one of three different displayed portions of the array based on the first attribute of the respective user-selectable icon, the three different displayed portions comprising, (i) a past portion adapted to display one or more user-selectable icons, generally associated with a past term interaction, grouped therein, wherein the first attribute of each such user-selectable icon is associated with a past time relative to a temporal reference point adapted to locate the past portion along a timeline;

(ii) a present portion adjacent to the past portion and adapted to display one or more user-selectable icons, generally associated with a short term interaction, grouped therein, wherein the first attribute of each such user-selectable icon is associated with a present time relative to the temporal reference point adapted to locate the present portion along the timeline; and (iii) a future portion adjacent to the present portion and adapted to display one or more user-selectable icons, generally associated with an expected future interaction, grouped therein, wherein the first attribute of each such user-selectable icon is associated with a future time relative to the temporal reference point adapted to locate the future portion along the timeline;

(b) wherein, when each respective portion of the three portions of the array comprises at least one user-selectable icon, the displaying of the array of user-selectable element comprises for each respective portion, (i) displaying one or more user-selectable icons of the respective portion; and (ii) when not all user-selectable icons of the respective portion are being displayed, changing the user-selectable icons of the respective portion that are being displayed in response to user input received via a navigation tool;

(iii) wherein the changing of user-selectable icons displayed in a portion of the array does not change any user-selectable icon displayed in each of the other two portions of the array;

(c) wherein the three different displayed portions of the array are disposed in a substantially linear arrangement along a common axis of the timeline (d) wherein the method is performed by a processor executing computer-executable instructions.

20. The method of claim 19, wherein the displaying of the array of user-selectable icons is adapted to collectively display another array of user-selectable icons orthogonally located in respect with the array of user-selectable icons on a basis of a common icon.

* * * * *